(12) United States Patent
Nix

(10) Patent No.: US 11,706,025 B2
(45) Date of Patent: Jul. 18, 2023

(54) SECURE FIRMWARE TRANSFER FOR AN INTEGRATED UNIVERSAL INTEGRATED CIRCUIT CARD (IUICC)

(71) Applicant: IoT and M2M Technologies, LLC, Evanston, IL (US)

(72) Inventor: John A. Nix, Evanston, IL (US)

(73) Assignee: IOT AND M2M TECHNOLOGIES, LLC, Evanston, IL (US)

( * ) Notice: Subject to any disclaimer, the term of this patent is extended or adjusted under 35 U.S.C. 154(b) by 0 days.

(21) Appl. No.: 17/481,599

(22) Filed: Sep. 22, 2021

(65) Prior Publication Data

US 2022/0006625 A1    Jan. 6, 2022

Related U.S. Application Data

(63) Continuation of application No. 16/683,242, filed on Nov. 13, 2019, now abandoned.

(Continued)

(51) Int. Cl.
*H04L 9/08*       (2006.01)
*G06F 9/445*     (2018.01)
(Continued)

(52) U.S. Cl.
CPC ............ *H04L 9/0841* (2013.01); *G06F 9/445* (2013.01); *H04L 9/3073* (2013.01); *H04L 9/3236* (2013.01); *H04L 63/0442* (2013.01)

(58) Field of Classification Search
CPC ... H04L 9/0841; H04L 9/3073; H04L 9/3236; H04L 63/0442; G06F 9/445
See application file for complete search history.

(56) References Cited

U.S. PATENT DOCUMENTS

| 9,288,059 B2 | 3/2016 | Nix |
| 9,319,332 B2 | 4/2016 | Nix |

(Continued)

FOREIGN PATENT DOCUMENTS

CA    2860437 A1 *  7/2013   ........... H04L 9/3066

OTHER PUBLICATIONS

GSM Association, "iUICC POC Group Primary Platform requirements", Release 1.0, May 17, 2017.

(Continued)

*Primary Examiner* — Noura Zoubair
*Assistant Examiner* — Mayasa A. Shaawat
(74) *Attorney, Agent, or Firm* — GrowIP Law Group LLC

(57) ABSTRACT

A device can (i) operate a primary platform (PP) within a tamper resistant element (TRE) and (ii) receive encrypted firmware images for operating within the primary platform. The TRE can store in nonvolatile memory of the TRE (i) a PP static private key (SK-static.PP), (ii) a server public key (PK.IDS1), and (iii) a set of cryptographic parameters. The TRE can generate a one-time PKI key pair of SK-OT1.PP and PK-OT1.PP and send the public key PK-OT1.PP to a server. The TRE can receive a one-time public key from the server comprising PK-OT1.IDS1. The TRE can derive a ciphering key using an elliptic curve Diffie Hellman key exchange and the SK-static.PP, SK-OT1.PP, PK.IDS1, and PK-OT1.IDS1 keys. The TRE can decrypt the encrypted firmware using the derived ciphering key. The primary platform can comprise a smart secure platform (SSP) and the decrypted firmware can comprise a virtualized image for the primary platform.

17 Claims, 8 Drawing Sheets

Related U.S. Application Data

(60) Provisional application No. 62/767,585, filed on Nov. 15, 2018.

(51) Int. Cl.
    *H04L 9/32*      (2006.01)
    *H04L 9/40*      (2022.01)
    *H04L 9/30*      (2006.01)

(56) References Cited

U.S. PATENT DOCUMENTS

| | | |
|---|---|---|
| 11,349,675 B2 * | 5/2022 | Kim ................ H04L 9/3278 |
| 2016/0149709 A1 | 5/2016 | Nix |
| 2018/0144147 A1 | 5/2018 | Nix |
| 2019/0074983 A1 * | 3/2019 | Yang ................ H04L 9/3265 |
| 2019/0140836 A1 * | 5/2019 | Novak ................ G06F 21/74 |
| 2020/0162247 A1 | 5/2020 | Nix |

OTHER PUBLICATIONS

European Technical Standards Institute (ETSI), "Meeting #81 document SCP(17)000188", Dec. 5, 2017.
Wikipedia, "Elliptic Curve Diffie-Hellman", Mar. 9, 2018.
National Institute of Standards and Technology (NIST) document "NIST SP 800-56A, Recommendation for Pair-Wise Key Establishment Schemes Using Discrete Logarithm Cryptography", Mar. 2007.
GlobalPlatform, "Open Firmware Loader for Tamper Resistant Element", Version 1.3, Jun. 2017.

* cited by examiner

Figure 4

Cryptographic Parameters 104

| Set 104a | PKI Key Length 104b | Curve 104c | Hash 104d | Symmetric Ciphering Key Length 104e | Symmetric Ciphering Parameters 104f | Random Length 104g |
|---|---|---|---|---|---|---|
| A | 256 | p256 | SHA-256 | 128 | C1 | 128 |
| B | 384 | p384 | SHA-384 | 192 | C2 | 192 |
| C | 512 | secp521r1 | SHA-512 | 256 | C3 | 256 |
| D | 256 | Curve25519 | SHA-3 | 128 | C4 | 128 |
| E | 448 | Curve448 | SHA-3 | 192 | C5 | 192 |
| ... | | | | | | |

SECURE FIRMWARE TRANSFER FOR AN INTEGRATED UNIVERSAL INTEGRATED CIRCUIT CARD (IUICC)

CROSS-REFERENCE TO RELATED APPLICATION

This U.S. Non-Provisional Applications is a continuation of U.S. Non-Provisional application Ser. No. 16/683,242, filed Nov. 13, 2019, that claims the benefit of the filing date of U.S. Provisional Patent Application Ser. No. 62/767,585, filed Nov. 15, 2018, which are hereby incorporated by reference in their entirety.

BACKGROUND

Technical Field

The present systems and methods relate to securely transferring firmware to a primary platform from a server, and more particularly to conducting an Elliptic Curve Diffie Hellman key exchange (ECDH) in the primary platform and the server in order to (i) encrypt firmware and (ii) transfer the encrypted firmware over a communications channel with insecure elements.

Description of Related Art

The commercial development and deployment of secure processing environments within microprocessors and tamper resistant elements (TRE) can increase security of computing devices such as mobile phones and networked sensors for the "Internet of Things". A secure processing environment or TRE can enable a device to securely record cryptographic keys and conduct cryptographic operations such as key exchanges, key derivation, and also digital signatures in an a computing environment that is isolated from other electrical components within the device that may not be secure. Examples available today include an embedded subscriber identity module (embedded SIM), which is also known as an embedded universal integrated circuit card (eUICC), a traditional SIM card, a secure enclave within a "system on a chip", a trusted execution environment (TEE), and other examples are available as well. A common computing architecture includes a processor with multiple cores, where a secure processing core is isolated from the other cores, and the secure processing core can read cryptographic keys and conduct cryptographic operations. Other possibilities exist as well, including "switching" a generic processor between an insecure mode to a secure mode.

As the number of transistors and memory cells available for a given surface area of silicon continues to grow, the computational power for secure processing environments continues to increase. Some secure processing environments can operate as a host computing environment and provide the functionality of a virtual machine for different firmware images, such that each firmware image can operate as separate computing environments within the secure processing environment. As one example, secure processing environments can now enable a TRE to operate as a primary platform for hosting potentially a variety of different firmware images, where each of the firmware images can support a different application. As one example, a secure processing environment could operate a Java™ virtual machine, and different firmware images could comprise different Java applets or Java-based applications. Each Java applet could comprise different images for the Java virtual machine. Other possibilities exist as well for a secure processing environment to operate as a primary platform for hosting images, and the images may also be referred to as a firmware image.

A primary platform both (i) operating within a secure processing environment and (ii) using firmware images can support a variety of useful applications for a computing device. The operation of an example primary platform can perform functions outlined in the GSM Association (GSMA) technical document "iUICC POC Group Primary Platform requirements", Release 1.0 dated May 17, 2017, which is hereby incorporated by reference in its entirety ("GSMA PP Requirements"). Example applications supported by a primary platform using firmware images are identified in Section 3, "Use Cases" and include firmware for an embedded SIM, a traditional universal integrated circuit card (UICC), mobile payments, secure bootstrapping, digital rights management, user identification such as a drivers license, secure access to home automation, a virtual automobile key, and other applications are identified as well.

Further the European Telecommunications Standards Institute (ETSI) has begun developing standards for a "Secure Primary Platform" (SSP) as part of the development of 5G standards, and an SSP could operate as a primary platform as well. As of November, 2018, the draft standards for an SSP are not available for public review, but will likely support applications similar to those contemplated in the GSMA PP requirements document. In addition, the industry association Global Platform is also developing standards for operating a primary platform in order to support a variety of applications. As the standards for operating a primary platform or a secure primary platform (SSP) continue to evolve, new features or the use of new cryptographic algorithms or steps may be introduced. These new features and/or cryptographic steps may require new firmware for the primary platform in order to support new or updated versions of the standards. A need exists in the art for a primary platform to securely receive updated firmware in order to support currently evolving standards and features for the operation of a primary platform or SSP and supported applications.

Secure operation of a primary platform or an SSP for each of the above standards depends on the secure delivery of firmware from a server to the primary platform. Different firmware may be required by a primary platform in order to support each of the above example applications. Further, over time new features may be added to the applications, which would also likely require a firmware update. The GSMA PP Requirements document provides an overview of a proposed solution in FIG. 7 on page 25. Note that the GSMA PP requirements document does not suggest necessary and secure steps for how the firmware encryption keys (or "SSD keys container") can be encrypted. Secure encryption and also an authenticated delivery of firmware to a primary platform is a significant technical challenge, since the computing device may include insecure components, such as a generic processor and a generic operating system. The insecure device can conduct many of the steps for communicating between (i) a server that sources the firmware and (ii) the primary platform. As one example, the computing device could comprise a mobile phone or "smartphone" based on Android or IOS or similar operating systems and could also either (i) operate with "malware" that is unknown to a user or a network or (ii) could comprise a "rooted" mobile phone that is under the control of hackers. A need exists in the art for the secure and authenticated encryption of firmware for a primary platform, such that a primary platform can subsequently securely decrypt the firmware and also authenticate the firmware is from a trusted source.

A primary platform operating in a tamper resistant element can be a resource constrained computing environment, compared to a traditional computing environment of a mobile phone or a personal computer. This resource constrained environment can create significant challenges for authentication of the source of a firmware image. As one example, a primary platform may have no direct access to the Internet, but rather must communicate through the insecure mobile phone or computing device in order to send and receive data with a server, including updated firmware for the primary platform. The primary platform may not have resources to operate a full transport layer security (TLS) stack. The primary platform may not readily be able to (i) use and obtain a full chain of X.509v3 certificates and also (ii) verify a full chain of certificate authority certificates in order to validate a signature from an IDS server.

In addition, the proper and full implementation of certificate revocation lists may not be feasible for the primary platform, since the primary platform (i) cannot directly contact the repository of a certificate revocation list and (ii) depends on an insecure mobile phone or computing device to reach a certificate revocation list. In addition, although the use of elliptic curve cryptography (ECC) may be strongly preferred for a primary platform due both (i) limited computation resources, and (ii) the increased efficiency of ECC-based algorithms, elliptic curve digital signature algorithms also have challenges, where the reuse of a value k for two different signatures can reveal the private key. An insecure mobile phone or computing device operating a primary platform could try to force the reuse of a value K and thus expose a private key (either recorded at the server or in the primary platform). Consequently, a need exists in the art for a primary platform to receive a firmware image using an authenticated encryption key exchange, such that a successful encryption key exchange also authenticates a server providing the image.

An important objective for secure firmware download for a primary platform is also to obtain forward secrecy. In this manner, if a private key is compromised then only the subset of historical data encrypted using the compromised private key is subject to decryption or attempted replay by third parties, and other communications using a different private key can remain secured. An authenticated exchange can be conducted using at least two static PKI key pairs (e.g. not an ephemeral key exchange with ephemeral PKI keys), but without the benefits of forward secrecy. The use of authenticated key exchanges (but without ephemeral or one-time PKI keys) for a primary platform and a server can increase security risks over time, where repeated use of a one static PKI key pair (such a for a server private key used to communicated potentially with millions of devices over time) is subject to cryptographic analysis and "leakage" of equivalent bits of security over time. A need exists in the art where both the primary platform and the server can conduct an authenticated exchange and also obtain the benefits of forward secrecy from including one-time PKI keys in the key exchange in order to obtain the benefits of forward secrecy.

Addressing forward secrecy can create additional problems that need to be solved for a primary platform to securely receive firmware from a server. The addition of ephemeral or one-time PKI keys in cryptographic operations in order to obtain forward secrecy risks attacks from specifically chosen ephemeral or one-time PKI public keys. For example, a significant compromise for many Bluetooth implementations was recently revealed, where ephemeral public keys received for cryptographic operations such as key exchanges could be either (i) not on an ECC curve or (ii) specifically selected to expose information about the static private key. A need exists in the art for securely including one-time PKI keys in a an authenticated key exchange used by a server and a primary platform.

Although the GSMA PP Requirements document outlines requirements and conventional technology for the use a primary platform and firmware for images operating on the primary platform, the GSMA PP Requirements document does not suggest or teach the use of specific PKI key pairs or cryptographic algorithms to use with the PKI key pairs. Further, there is no teaching for how a public key for the IDS server could be securely received by a primary platform. The receipt of a server public key certificate by a resource constrained primary platform may be difficult to verify, since proper verification may require access to a full chain of certificates, and the primary platform may not have access to a full chain of certificates, as described above. A need exists in the art for a primary platform to securely record a server public key used in a key exchange, while using forward secrecy, in order to conduct a key exchange in an authenticated manner. A need exists in the art for the primary platform to use a resulting derived symmetric ciphering key from the key exchange in order to decrypt ciphertext firmware. A need exists in the art for a primary platform to achieve the security goals in the unique environment where a primary platform can be resource constrained and also operate within a potentially insecure device.

Many other examples exist as well for needs in the art for a primary platform to securely receive firmware from a server, and the above are examples are just a few and intended to be illustrative instead of limiting.

SUMMARY

Methods and systems are provided for a primary platform to securely receive firmware from a server. The primary platform (PP) can operate within a tamper resistant element (TRE) and comprise a secure processing environment operating within a computing device. The primary platform can comprise a secure enclave, a secure element, a trusted execution environment (TEE), or a "Smart Secure Platform" as specified by ETSI standards. The computing device can comprise a mobile phone, wireless device, personal computer, laptop, or a networked transducer for the "Internet of Things". The device can (i) include insecure components such as a general processor and a general operating system and (ii) communicate with the primary platform using a device driver such as a primary boot loader (PBL) agent.

The device can connect with an internet protocol based network such as the public Internet in order to establish a secure session with a server. The server can comprise an image delivery server (IDS) and receive a ciphertext firmware and a firmware key from an image maker, where the ciphertext firmware is encrypted with the firmware key. The server can comprise a computer with a network interface to communicate with the device via the IP network. The server can record and operate a server database. The device can be one of a plurality of different devices communicating with the server. The server can operate a database, where the database records at least identities for a plurality of primary platforms and associated primary platform public keys. The database could also record a set of cryptographic parameters associated with the primary platform public keys. The server can record at least one PKI key pair comprising a server static public key and a server static private key compatible with the set of cryptographic parameters. The server can also use a set of IDS one-time PKI keys, which could be derived using a random number generator, cryptographic algorithms, and the set of cryptographic parameters.

In exemplary embodiments an image maker can create a firmware image for the primary platform. The firmware image can support the primary platform operating with an application, such as, but not limited to, an eUICC, a "Smart Secure Platform", secure identification of the device using the primary platform, and other possibilities exist as well for supported applications. The image maker can create the firmware image for a plurality of different primary platforms. The image maker can derive a symmetric ciphering key and encrypt the firmware image with the symmetric ciphering key in order to create a ciphertext firmware. The ciphertext firmware and the symmetric ciphering key can comprise an unbound image, which could be subsequently used by the server with a plurality of different primary platforms, after subsequent cryptographic operations by the server with different primary platforms.

The primary platform and the server can record and operate a set of compatible values and cryptographic algorithms for an elliptic curve Diffie Hellman (ECDH) key exchange algorithm, a symmetric ciphering algorithm, and a set of cryptographic parameters. Before distribution to an end user of the computing device, a TRE manufacturer could record a set of data in nonvolatile memory for the TRE. In addition to a PP boot firmware and PP boot configuration for the PP, the data recorded in device before distribution could include (i) a server static public key, (ii) a primary platform static private key, (iii) a set of cryptographic parameters associated with the static public keys, and (v) a primary platform identity for the TRE. For a first exemplary embodiment, the server static public key can be unique for the TRE not shared with other TRE. For a second exemplary embodiment, the server static public key can be shared across a set of different TRE and thus the server static public key would not be uniquely recorded in an individual TRE, but the server static public key could be recorded in a set of TRE.

After boot and startup of both the device and the TRE operating the primary platform, the device can use a primary boot loader (PBL) agent as a driver to communicate with the primary platform. The device can use the PBL agent to obtain (i) a firmware status, (ii) the primary platform identity, and (iii) a set of cryptographic parameters for the primary platform private key. The firmware status can comprise a list of parameters associated with any firmware image recorded or stored by the primary platform, including a version number for either a stored firmware image or a version number for PP boot firmware. In exemplary embodiments, the set of cryptographic parameters at least specifies a specific ECC curve for the primary platform private key. The device can establish a secure session with the server and send a first message through the secure session comprising: (i) a firmware status, (ii) the primary platform identity, and (iii) a set of cryptographic parameters for the primary platform private key.

The server can receive the first message and process the data. The server can use the received primary platform identity to query the database for information pertaining to the primary platform, such as a PP boot firmware version number and a PP static public key. The server can use the firmware status to determine if a new, updated firmware is available for the primary platform. Upon determining that the use of a new or updated firmware image by the primary platform is desirable or possible, the server can send the image maker a second message, where the second message queries the image maker for the new or updated firmware image. The server can receive the unbound image from the image maker through a secure session, where the unbound image can comprise a plaintext firmware key and the ciphertext firmware.

The server can derive a one-time PKI key pair that is compatible with the set of cryptographic parameters, where the one-time PKI key pair comprises a server one-time public key and a server one-time private key. Although described as "one-time" PKI keys, the derived keys could comprise ephemeral or protocol keys, and in exemplary embodiments the keys are used one-time with a specific primary platform, although the one-time PKI key pair could also be used with different primary platforms. The server can calculate a secure hash value over the server static public key and send the secure hash value of the server static public key to the device through the secure session in a third message. The secure hash algorithm, such as, but not limited to, a SHA-2 algorithm, could be specified in the received set of cryptographic parameters from the first message.

The device can forward the secure hash over the server static public key to the primary platform through the PBL agent. The primary platform could record a plurality of different server public keys, such as being recorded during a manufacturing step for the TRE. The primary platform can calculate a secure hash over each of the recorded server public keys. The primary platform can select a server public key from the plurality of recorded server public keys by finding and calculating a secure hash value that matches the hash value received in the third message. The primary platform can select or derive a PP one-time PKI key pair using the set of cryptographic parameters, where the one-time PKI key pair can comprise a PP one-time public key and a PP one-time private key. The primary platform can also generate a random number using a hardware random number generator. The primary platform can respond to the PBL agent with the selected or derived PP one-time public key and a secure hash value over the PP static public key and the generated random number. For some exemplary embodiments, although a server is described as sending a hash value over a server static public key and a primary platform is described a sending a hash value over the primary platform static public key, each node could also alternatively send the public key without the use of a hash algorithm over the public key.

The device can then send the server a fourth message through the secure session with (i) the secure hash value over the PP static public key and (ii) the PP one-time public key and (iii) the random number. The server can receive the fourth message and conduct a key validation step over the PP one-time public key, such as confirming the PP one-time public key is on the ECC curve specified by the set of cryptographic parameters. The server can confirm the received hash value over the PP static public key matches a calculated hash value over the PP static public key recorded in the database for the PP identity. The server can select or derive a server one-time PKI key pair using the set of cryptographic parameters. The server one-time PKI key pair can comprise a server one-time public key and a server one-time private key.

The server can conduct a key exchange step using at least the (i) the PP static public key selected using the fourth message, (ii) the PP one-time public key from the fourth message, (iii) the server static private key, (iv) the server one-time private key, and (v) the set of cryptographic parameters. The key exchange can comprise an ECDH key exchange and use an ECDH key exchange algorithm. The output of an ECDH key exchange can comprise a mutually derived share secret. The mutually derived shared secret can be input into a key derivation function (KDF) in order to derive a mutually derived symmetric ciphering key and also optionally a message authentication code (MAC) key.

The server can use the mutually derived symmetric ciphering key to encrypt the firmware key and the random number received in the fourth message, in order to obtain or store a ciphertext firmware key. The ciphertext firmware key can comprise (i) an encrypted plaintext firmware key and (ii) the encrypted random number. The collection of (i) the server one-time public key, (ii) the ciphertext firmware key, and (iii) the ciphertext firmware can comprise a bound image for the primary platform. In this manner, (A) a bound image can comprise an image that is specifically formatted and structured for the primary platform and (B) a different primary platform would not feasibly be able to read plaintext firmware data from a bound image. The server can send the device the bound image through the secure session. The device can use the PBL agent to transfer to the bound image to the primary platform.

The primary platform can receive the bound image and read the plaintext value for the server one-time public key. The primary platform can conduct a key validation step over the server one-time public key, including verifying the server one-time public key is a point on the ECC curve from the cryptographic parameters and also that the server one-time public key is not reused. The primary platform can conduct a key exchange step using at least the (i) the selected server static public key, (ii) the server one-time public key from the bound image, (iii) the PP static private key, (iv) the PP one-time private key, and (v) the set of cryptographic parameters. The key exchange can comprise an ECDH key exchange and use an ECDH key exchange algorithm equivalent to the algorithm used by the server. The output of an ECDH key exchange can comprise a mutually derived share secret. The mutually derived shared secret can be input into a key derivation function (KDF) in order to derive a mutually derived symmetric ciphering key and also optionally a message authentication code (MAC) key.

The primary platform can use the mutually derived symmetric ciphering key to conduct a first decryption step. The first decryption step with the mutually derived symmetric ciphering key can convert the ciphertext firmware key from the bound image into a plaintext firmware key and also the plaintext random number. The primary platform can verify that the decrypted plaintext random number is equal to the random number generated by the primary platform. Successful decryption of the ciphertext firmware key and also verifying the decrypted random number is equal to the random number sent by the primary platform can comprise an authentication of the server. In other words, only a server holding the server static private key corresponding to the server public key recorded by the primary platform would feasibly be able to encrypt the ciphertext firmware key and random number, where the primary platform uses the server static public key to decrypt the ciphertext firmware key and the encrypted random number.

The primary platform can use the plaintext firmware key from the first decryption step to conduct a second decryption step. The second decryption step with the plaintext firmware key can convert the ciphertext firmware from the bound image into a plaintext firmware. The primary platform can also use the MAC key to verify a MAC code for the ciphertext firmware in order to verify data integrity for the ciphertext firmware. The ciphertext firmware may also include an initialization vector to support block chaining and the primary platform can use the initialization vector in the second decryption step.

The primary platform can subsequently read and load the plaintext firmware. The primary platform can begin operating with the plaintext firmware and send an updated firmware status to the PBL agent. The primary platform can use the PP boot firmware to operate the received firmware. The device can forward the updated firmware status to the server over the secure session, and the updated firmware status can include the equivalent of an "OK" message confirming the received firmware has been properly decrypted and/or loaded and/or is operating in the primary platform. The device can begin securely operating an application supported by the received firmware operating in the primary platform. The primary platform can use the received firmware to record cryptographic keys and conduct cryptographic operations such as digital signatures using the received firmware, cryptographic keys, and cryptographic algorithms in the PP boot firmware and/or the received firmware.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS OF THE INVENTION

FIG. 1a

Figure 1A:
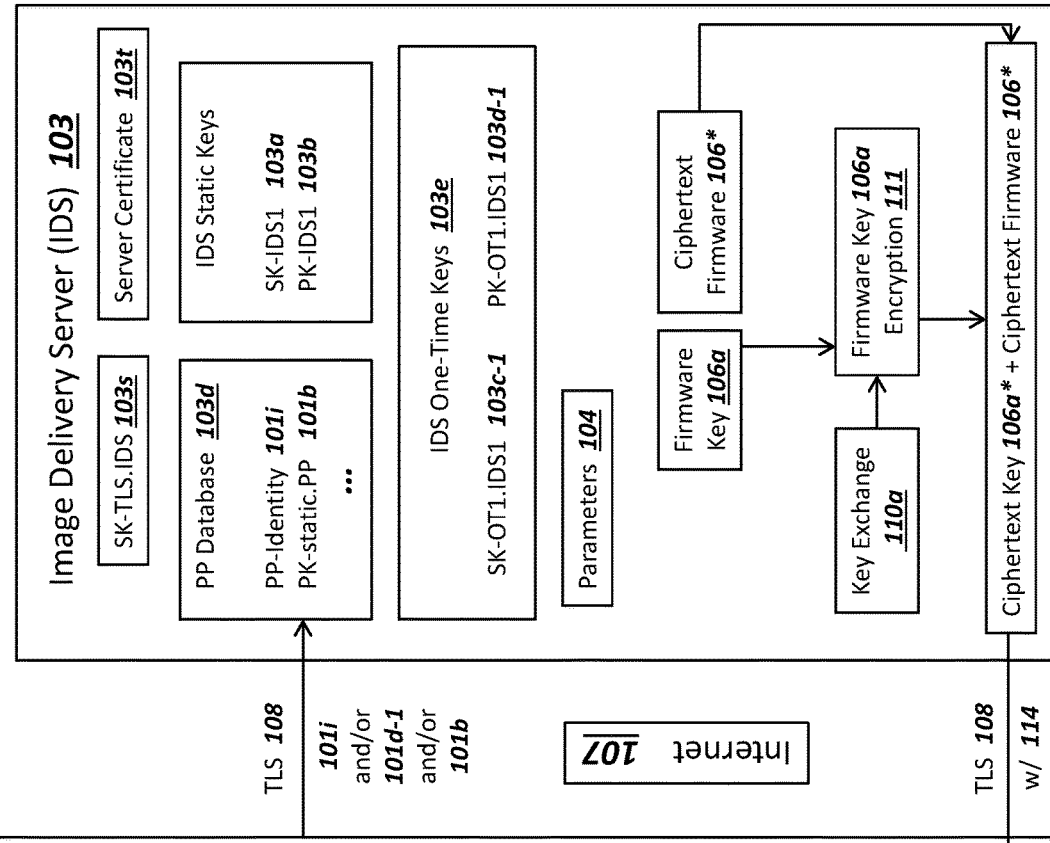
FIG. 1a is a graphical illustration of an exemplary system, where a device with a secure processing environment and a server securely transfer encrypted firmware from the server to the secure processing environment.
Figure 1A:
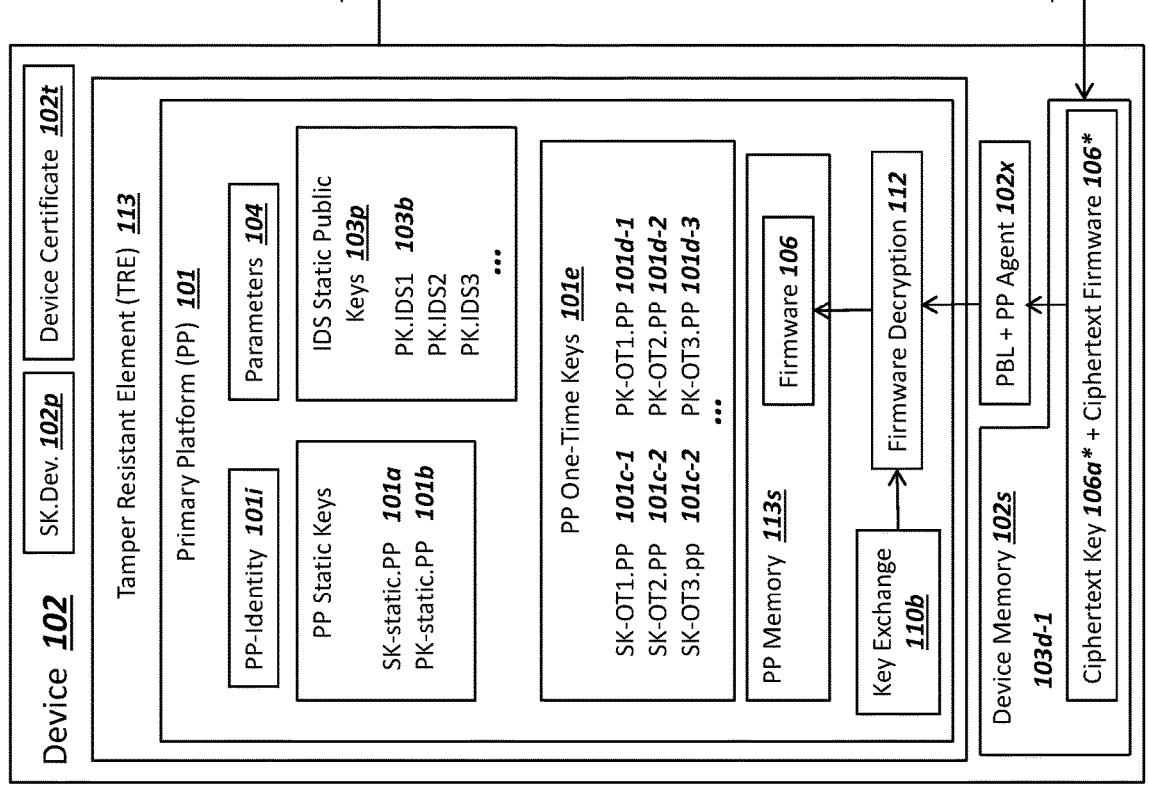

FIG. 1a is a graphical illustration of an exemplary system, where a device with a secure processing environment and a server securely transfer encrypted firmware from the server to the secure processing environment. The system 100 can include a device 102 and a server 103, where the nodes can establish secure sessions such as a Transport Layer Security (TLS) 108 session over an Internet Protocol (IP) network 107. Server 103 can comprise an image delivery server 103. Although a single server 103 and a single device 102 are depicted in FIG. 1a, a system 100 can comprise a plurality of servers 103 and devices 102. In addition, although a single server 103 is depicted in FIG. 1a, the exemplary server 103 shown for system 100 can comprise either different physical computers such as rack-mounted servers, or different logical or virtual servers or instances operating in a "cloud" configuration, including different computing processes which are geographically dispersed.

Server 103 could also represent different logical "server-side" processes within a network, including different programs running on a server that listen and communicate using different IP port numbers within one physical server. In exemplary embodiments, server 103 can operate using the physical electrical components similar to those depicted and described for a device 102 in FIG. 1b below. Sever 103 can use electrical components with larger capacities and larger overall power consumption, compared to the capacity and power consumption for the equivalent electrical components in a device 102. Other possibilities exist as well for the physical embodiment of server 103 without departing from the scope of the present disclosure.

IP network 107 could be either a Local Area Network (LAN) or a Wide Area Network (WAN), or potentially a combination of both. IP network 107 could include data links supporting either IEEE 802.11 (WiFi) standards. Device 102 could also utilize a variety of WAN wireless technologies to communicate data in a secure session 108 with server 103, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, planned future 5G networks, and other examples exist as well. Server 103 can connect to the IP network 107 via a wired connection such as, but not limited to, an Ethernet, a fiber optic, or a Universal Serial Bus (USB) connection (not shown). IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses and also comprise an insecure network.

Device 102 can be a computing device for sending and receiving data, including a wireless device. Device 102 can take several different embodiments, such as a general purpose personal computer, a mobile phone based on the Android® from Google® or the IOS operating system from Apple®, a tablet, a device with a sensor or actuator for the "Internet of Things", a module for "machine to machine" communications, a device that connects to a wireless or wired Local Area Network (LAN), and other possibilities exist as well without departing from the scope of the present disclosure. Device 102 can also be a computing device according to GSMA technical document "iUICC POC Group Primary Platform requirements", Approved Release 1.0 dated May 17, 2017, which is hereby incorporated by reference in its entirety ("GSMA PP Requirements"). Device 102 can comprise a device such as that depicted in FIG. 6 on page 24 of the GSMA PP Requirements. Exemplary electrical components within a device 102 are depicted and described in FIG. 1b below. Other possibilities exist as well for the physical embodiment of device 102 without departing from the scope of the present disclosure.

Device 102 can include a private key SK.device 102p (or secret key), a device certificate 102t, a tamper resistant element 113, device memory 102s, and a primary boot loader (PBL) and PP agent 102x. Private key SK.device 102p can comprise a private key for device 102 corresponding to a public key within device certificate 102t. Device certificate 102t can include a set of cryptographic parameters 104a for the certificate as well as (i) a digital signature from a certificate authority for the public key corresponding to (ii) the private key SK.device 102p. The set of cryptographic parameters in certificate 102t can specify cryptographic algorithms to use with the public key and SK.device 102p, such as elliptic curve cryptography (ECC) name curves, key length, padding schemes, and key usage (e.g. key exchange and/or digital signatures, digital signature algorithms, etc). Device certificate 102t and SK.device 102p can also use RSA based cryptography as well. Private key SK.device 102p and device certificate 102t can be used by device 102 in establishing and conducting TLS session 108 with server 103.

Tamper resistant element (TRE) 113 can comprise a tamper resistant element as described in the GSMA PP Requirements document. Tamper resistant element can comprise a silicon enclave within a tamper resistant chip such as a "system on chip" as depicted and described in connection with FIG. 1b below. TRE 113 can include a primary platform (PP) 101, where a primary platform is also described in the GSMA PP Requirements document. TRE 113 could also comprise a "Smart Secure Platform" (SSP) as described in ETSI TC SCP Meeting #81 document "SCP(17)000188", which is hereby incorporated by reference in its entirety. Note that draft specifications for an SSP such as "103 666-1 SSP Draft Specification 0.8.0" are not publicly available and have restricted access on the ETSI web site as of Nov. 15, 2018. Primary platform 101 can comprise a secure operating environment, a secure enclave, a secure element, and include a dedicated processing core within a processor for device 102. Primary platform 101 can also operate in a Trusted Execution Environment (TEE) within a processor for device 102. Primary platform 101 can also comprise a SSP as contemplated by ETSI documents and draft specifications for 5G networks. Exemplary components for a TRE 113 and PP 101 for a device 102 are also depicted and described in connection with FIG. 1c below.

TRE 113 and PP 101 can support a variety of applications. TRE 113 can comprise the physical device such as that depicted in FIG. 1a and FIG. 1c below, and a primary platform 101 can comprise a secure processing environment operating within the TRE 113. With appropriate firmware 106, TRE 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 102, a virtual key for cars or door locks, an secure environment for recording an identity and secret or private keys for drivers licenses, passports, online or web-site access, etc. Other applications for firmware 106 operating in TRE 113 and PP 101 are possible as well, without departing from the scope of the present disclosure. In general, cryptographic keys and cryptographic algorithms and parameters could be stored in PP 101 in order to securely support applications such as device programs operating on device 102. In this manner, an insecure device program also operating on device 102 would not feasibly be able to ready the cryptographic keys or use the cryptographic algorithms stored in PP 101.

Each of the above exemplary applications can be operated by a firmware 106 running within TRE 113 on PP 101. Although a single firmware 106 is depicted and described in connection with FIG. 1a and FIG. 1c below, a TRE 113 and PP 101 can operate a plurality of different firmware 106 simultaneously. Each firmware 106 can operate within a virtual machine for a processor 113b (in FIG. 1c) for TRE 113 and PP 101. As one exemplary embodiment, firmware 106 can comprise a JAVA applet running on a java virtual machine in TRE 113, where the JAVA virtual machine can be recorded in secure boot firmware 121 for TRE 113 and PP 101 (shown in FIG. 1c below). Different firmware 106 operating within TRE 113 can be isolated from each other by conventional technology for processing hosts and/or virtual machines. Other possibilities exist as well for a TRE 113 and PP 101 to operate as a host for an application downloaded as firmware 106. In summary, the overall security of an application operated by TRE 113 and PP 101 can depend on securely receiving firmware 106 by TRE 113 and PP 102 from a server 103.

PP 101 can include a primary platform identity PP-ID 101i, a set of cryptographic parameters 104, PP static keys, a set of IDS static public keys 103p, a set of primary platform one-time keys 101e, primary platform memory 101d, a key exchange algorithm 110b, and firmware decryption libraries 112. PP-ID 101i can comprise a string of digits or alphanumeric characters to uniquely globally identify PP 101. PP-ID 101i can allow an IDS server 103 to identify the PP 101 for receiving an encrypted firmware 106. In exemplary embodiments, PP-ID 101i can be similar to either (i) an integrated circuit card identity (ICCID) found on SIM cards or (ii) an embedded universal integrated circuit card (eUICC) identity of "EID". In exemplary embodiments, PP-ID 101i can be written to hardware in PP 101 and operate as a unique, long-term identity for PP-ID 101i. For some exemplary embodiments, PP-ID 101i can comprise a cryptographic hash such as an SHA-256 hash value of a primary platform static public key PK-static.PP 101a based on a set of cryptographic parameters 104, which could specify a secure hash algorithm to use over PK-static.PP 101a. For these embodiments, then PP-ID 101i can also potentially comprise multiple different reasonably unique values, depending on the hash algorithm specified in cryptographic parameters 104 (e.g. a first PP-ID 101a for a first hash algorithm and a second PP-ID 101a for a second hash algorithm). Other examples for an identity of a primary platform are possible as well without departing from the scope of the present disclosure.

Cryptographic parameters 104 can specify values or settings for (i) conducting an ECDH or ECDHE key exchange, (ii) mutually deriving a symmetric ciphering key, (iii) using a symmetric ciphering algorithm, (iv) an ECC curve which could comprise a commonly used name curve, (iv) PKI key lengths, etc. As contemplated herein, cryptographic parameters 104 may also be referred to as parameters 104, and a detailed description of cryptographic parameters 104 is depicted and described in connection with FIG. 4 below. Each of PP 101, server 103, and device 102 can record at least one compatible subset of parameters within a set of cryptographic parameters 104. A subset of cryptographic parameters 104 can be referred to as a "set of cryptographic parameters 104a".

Parameters 104 can specify values for an elliptic curve cryptography (ECC) curve name, key length, key formatting (e.g. compressed or uncompressed), encoding rules, etc. As contemplated herein, the parameters 104 and cryptographic algorithms used with ECC PKI keys and a key exchange in the present disclosure can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. Other possibilities exist as well for cryptographic parameters 104 without departing from the scope of the present disclosure.

For use of ECC algorithms, parameters 104 can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters 104 can specify domain parameters for elements in system 100 to calculate values or numbers in a compatible manner, such as (i) a common base point G for use with ECC PKI key pairs and (ii) a defining equation for an elliptic curve. Parameters 104 can also specify settings to use with a set of cryptographic algorithms 141 as depicted and described in connection with FIG. 1c below. An exemplary set of cryptographic parameters 104 is depicted and described in connection with FIG. 4 below.

PP 101 can record a set of IDS static public keys 103p. IDS static public keys 103p can include a set of sever public keys such as an exemplary PK.IDS1 103b, PK.IDS2, PK.IDS3, etc., where each of the public keys are associated with different IDS server 103 (or "server 103"). Although not depicted in FIG. 1a, each public key within IDS static public keys 103p can be associated with a server name or identity in order for PP 101 to track which key is associated with which IDS server. Server public key PK.IDS1 103b can comprise the public key corresponding to server private key SK.IDS1 103a, where server private key SK.IDS1 103a is recorded by a server 103. IDS static public keys 103p can also each be associated with different sets of cryptographic parameters 104a, such as PK.IDS1 103b using a first set of cryptographic parameters 104a, and PK.IDS2 using a second set of cryptographic parameters 104a, etc. Or, different keys within IDS static public keys 103p could use the same set of cryptographic parameters 104a.

A PP 101 can record a plurality of different network static public keys PK.IDS1 103b in a set of IDS static public keys 103p. Different keys 103b in a table or dataset comprising keys 103p could be associated with different networks and servers 103 that PP 101 communicates with over time in order to receive firmware 106. Or a first key 103b could be used with a first server, and (ii) a second, different key 103b a table of IDS static public keys 103p could be used as a backup or failover key for the first server, and (iii) a third key 103b could be used with a second server. Exemplary data for a key 103*b* is depicted and described in connection with FIG. 2*c* below. The different keys 103*b* in a set of keys 103*p* can be associated with network names and/or Uniform Resource Locators (URLs) or domain names, such that PP 101 can select the key 103*b* based on a URL or domain name where device 103 will receive firmware 106.

Further, although not depicted in FIG. 1*a*, a PP 101 could record different public keys for the same IDS 103, such as a first PK.IDS1 103*b* using a first set of cryptographic parameters 104*a* (such as a first named ECC curve), a second PK.IDS1 103*b* using a second set of cryptographic parameters 104*a* (such as a second named ECC curve), etc. The public keys in a set of IDS static public keys 103*p* can also be recorded in the form of a certificate similar to certificate 102*t*, where each IDS static public key is signed by a certificate authority. In exemplary embodiments, public and private keys in the present disclosure can comprise keys for elliptic curve cryptograph (ECC). For embodiments where key 103*b* is recorded in volatile memory, device 102 could obtain key 103*b* in a certificate form a different server than server 103 before receiving firmware 106 from server 103, such as device 102 obtaining key 103*b* via a secure session.

Data within a set of keys 103*p* could be written upon manufacturing of TRE 113 and configuration of PP 101. Some embodiment could support the recoding of keys 103*p* via upload by a manufacturer, distributor, or an owner of device 102 in a secure manner. Data within a set of keys 103*p* could be securely written through PBL and PP agent 102*x* where the keys written are only accepted if digitally signed by a certificate authority where PP 101 records a matching certificate authority public key 131 (depicted and described below in FIG. 1*c*), such that PP 101 could verify the digital signature for a key in keys 103*p* using the certificate authority public key 131. For embodiments where some keys in the set of IDS public keys 103*p* are written during manufacturing, then the requirement for verifying a digital signature for a key 103*b* by PP 101 could be optionally omitted. For embodiments where keys 103*p* are recorded in nonvolatile memory in TRE 113 after manufacturing of TRE 113, keys 103*p* could be uploaded by a device 102 manufacturer or device distributor. Other possibilities exist as well for the source and secure recording of keys 103*p* and at least one key 103*b* without departing from the scope of the present disclosure.

PP 101 can record at least one static PKI key pair for PP 101 comprising primary platform static private key SK-static.PP 101*a* and a primary platform static public key PK-static.PP 101*b*. Primary platform static public key PK-static.PP 101*b* could be derived from SK-static.PP 101*a* using a set of cryptographic parameters 104. Exemplary data and values for the use of a secret or private key SK-static.PP 101*a* and the corresponding public key PK-static.PP 101*b* are depicted and described below in connection with FIGS. 2*b* and 2*c*. Although a single PP static key pair is depicted in FIG. 1*a*, a PP 101 could record multiple static key pairs, where the different key pairs are used with different sets of cryptographic parameters 104, such as a first key pair for use with a first set of cryptographic parameters 104*a* and a second key pair for use with a second set of cryptographic parameters 104*a*. PK-static.PP 101*b* could also be recorded in the form of a certificate, where the public key PK-static.PP 101*b* is signed by a certificate authority. As contemplated herein, certificates for public keys can be formatted according to the X.509v3 set of standards, as well as subsequent or related standards for recording and digitally signing a certificate for a public key. SK-static.PP 101*a* could be recorded in PP 101 during manufacturing in a secure manner, such that no nodes or entities besides PP 101 record or store or feasibly could derive or determine the value for SK-static.PP 101*a*.

As depicted in FIG. 1*a*, PP 101 could also store or record a series of one-time PKI key pairs comprising PP one-time keys 101*e*. One-time PKI public keys could comprise a sequence of public keys such as a first primary platform one-time public key PK-OT1.PP 101*d*-1 with a corresponding first primary platform one-time secret key SK-OT1.PP 101*c*-1, a second PK-OT1.PP 101*d*-2 with a corresponding second secret key SK-OT1.PP 101*c*-2, etc. The keys 101*e* could be recorded during a manufacturing step, similar to PP static keys described in the paragraph above. In other exemplary embodiments, PP 101 could internally derive the one-time PKI key pairs as ephemeral PKI keys using a random number generator 128 (in FIG. 1*c* below) and cryptographic algorithms 141 (in FIG. 1*c* below) and a set of cryptographic parameters 104*a*. As contemplated herein, the use of one-time PKI keys can also be referred to as an ephemeral PKI key pair or a protocol PKI key pair, which contrasts with a static PKI key pair. In other words, a static PKI key pair can be recorded and utilized over a long period of time, such as an exemplary several years, while a one-time PKI key pair (or ephemeral key pair or protocol key pair) could be used either once or over a shorter period of time such as a single time or over a few hours or days.

PP 101 can include an ECC key pair generation algorithm in cryptographic algorithms 141 (from FIG. 1*c* below) and server 103 can include a compatible ECC key pair generation algorithm for the generation of IDS One-Time Keys 103*e* for server 103 as described below. A key pair generation algorithm can use (i) a random number generator 128 (in FIG. 1*c* below) in order to derive the ephemeral PKI private key and (ii) a selected set of cryptographic parameters 104*a* in order to calculate the ephemeral PKI public key. In exemplary embodiments, a random number for the ephemeral PKI private key multiplies the base point G from the parameters 104*a* in order to obtain the corresponding ephemeral PKI public key. Other possibilities exist as well for PP 101 or server 103 to derive an ephemeral or one-time ECC PKI key pair without departing from the scope of the present disclosure. A key pair generation algorithm for PP 101 can output a one-time ECC PKI pair comprising public key PK-OT1.PP 101*c*-1 and corresponding private key SK-OT1.PP 101*d*-1. A key pair generation algorithm for server 103 can output a one-time ECC PKI pair comprising server one-time private key SK-OT1.IDS1 103*c*-1 and corresponding server one-time public key PK-OT1.IDS1 103*d*-1.

PP 101 can operate a memory 113*s* for recording or storing data received from server 103 via device 102 and PBL and PP agent 102*x*. Memory 113*s* can comprise a volatile random access memory (RAM) or a nonvolatile flash memory based on NAND or NOR memory cells. The memory 113*s* can also comprise a persistent memory or a nonvolatile RAM (NVRAM) memory. Memory 113*s* can comprise a physical memory of NAND or NOR flash memory, such that data recorded in non-volatile memory 113*s* continues to be recorded when electrical power is removed from TRE 113 and PP 101. The data within non-volatile memory 113*s* can subsequently be read and/or re-written when power is restored to TRE 113.

Non-volatile memory for memory 113*s* can include occasional bit errors due to the nature of the physical memory, such as small memory cell sizes, but error correcting codes operating in a processor 113*b* in TRE 113 (in FIG. 1*c* below)

can normally correct the errors, to less than one part per billion during the normal, operating lifetime of TRE 113. As contemplated herein, error correcting codes can comprise either (i) convolution codes operating on a bit by bit basis on memory or data from memory, such as a Veterbi decoder, or (ii) block codes, such as a Hamming codes or Reed-Solomon codes. Other possibilities for the physical structure of memory 113s and error correcting codes exist as well without departing from the scope of the present disclosure. Generally (i) non-volatile memory for memory 113s includes addresses and blocks, such that binary data can be recorded and subsequently read in a nonvolatile state, and (ii) error correcting codes attempt to identify and correct the presence of bit errors in either physical memory and/or data read from the physical memory.

For some exemplary preferred embodiments, a TRE 113 could use persistent memory, known as nonvolatile RAM (NVRAM). NVRAM can use transistor gate technology recording binary states within memory cells when electrical power is removed from TRE 113. NVRAM for memory 113s in TRE 113 and for PP 101 could use a memory chip supporting the memory technology commercially available in the NVDIMM-P specifications as of 2018 (but not with the DIMM physical form and rather in a specified silicon area for TRE 113 with capabilities for NVRAM technology). In exemplary embodiments, TRE 113 and PP 101 could use persistent memory for memory 113s, and thus obtain the benefits of faster read and write times (with lower power consumption) while also having the benefits of nonvolatile storage, such that firmware 106 could continue to be recorded in memory 113s when power is removed from TRE 113.

Firmware 106 recorded in can provide machine executable instructions for a processor in PP 101 (such as processor 113b depicted and described in connection with FIG. 1c) to execute or run. Firmware 106 could comprise a collection of compiled software libraries and programming code for the operation of TRE 113 and PP 101. Firmware 106 could comprise a Java-based applet or application, where boot firmware of PP 101 establishes and operates a Java virtual machine such as, but not limited to JamVM or HaikuVM. Other platforms for virtualization and emulation of a computer system by PP 101 are possible as well, without departing from the scope of the present disclosure, where firmware 106 can be compiled or formatted to operate on PP 101 operating as a host for the virtualized computer system. In exemplary embodiments, firmware 106 can comprise an application where PP 101 operates as a process virtual machine or an application virtual machine. The environment in which firmware 106 operates can also be referred to as a managed runtime environment (MRE).

Firmware 106 can comprise compiled software or machine executable instructions for either (i) a processor or (ii) a virtual machine in PP 101, and may also be referred to herein as an "image". In other words, although (A) firmware may traditionally refer to machine executable programming instructions that provides low-level or hardware control over computing hardware, such as memory and physical interfaces, as contemplated herein, (B) "firmware" can comprise higher level software written for a virtual machine. In addition, the computing environment of a primary platform can require secure functions such as writing and reading cryptographic keys for a firmware 106 specially designated protected memory, and thus firmware 106 comprising high level software may include features similar to traditional firmware. Further, firmware may be traditionally associated with machine executable instructions that are read from a read only memory, and firmware 106 comprising software that is loaded into primary platform 101 can have features after loading in PP 101 that are similar to traditional firmware, such as firmware 106 not being readily modified by an insecure processor in device 101. In any case, although "firmware 106" is described herein as firmware, "firmware 106" can comprise any collection of machine executable instructions which can be loaded and operated by primary platform 101. Similarly, the GSMA PP Requirements document refers to the collection of machine executable code for a primary platform as "firmware".

PP 101 can also include a key exchange 110b, which could include an ECDH key exchange. For an ECDH key exchange, at least one public key and at least one private key can be input along with cryptographic parameters 104a in order to output a shared secret. The other party (such as server 103) can also input at least one private key (corresponding to the public key in the prior sentence) and at least one public key (corresponding to the private key in the previous sentence) in order to mutually derive the same shared secret. A summary of ECDH as a key exchange for key exchange algorithm 110b and 110a (in server 103) is included in the Wikipedia article titled "Elliptic Curve Diffie-Hellman" from Mar. 9, 2018, which is herein incorporated by reference. An exemplary embodiment of key exchange algorithm 110b and 110a (in server 103) could comprise a "One-Pass Diffie-Hellman, C(1, 1, ECC CDH)" algorithm as described in section 6.2.2.2 on page 81 of the National Institute of Standards and Technology (NIST) document "NIST SP 800-56A, Recommendation for Pair-Wise Key Establishment Schemes Using Discrete Logarithm Cryptography" from March, 2007 which is hereby incorporated by reference its entirety.

Other key exchange algorithms in NIST SP 800-56A could be utilized as well for a key exchange algorithm 110b and 110a in FIG. 1a without departing from the scope of the present disclosure. Exemplary calculations for an ECDH key exchange for a key exchange algorithm 110a are shown below in FIG. 2b and exemplary calculations for an ECDH key exchange for a key exchange algorithm 110b are shown below in FIG. 2c. The output of a commonly shared secret key can be used with a key derivation function (KDF) in order to derive a mutually shared symmetric ciphering key. The mutually derived symmetric ciphering key can be used by PP 101 for with firmware decryption 112.

PP 101 can include a firmware decryption 112, which converts a ciphertext firmware 106* and a ciphertext firmware key 106a* into a plaintext firmware 106. Exemplary details for firmware decryption 112 are depicted and described in connection with FIG. 2c below. In summary, a first step 112a can comprise a decryption step of ciphertext firmware key 106a* by PP 101 using the mutually derived symmetric ciphering key from key exchange 110b. The output of a first step 112a for firmware decryption 112 can comprise a plaintext firmware key 106a. A plaintext firmware key is contemplated herein as a designation of "106a" and a ciphertext firmware key is contemplated herein as a designation of "106a*". A second step 112b can comprise a decryption step of ciphertext firmware 106* by PP 101 using the plaintext firmware key 106a in order to read a plaintext firmware 106. A plaintext firmware is contemplated herein as a designation of "106" and a ciphertext firmware is contemplated herein as a designation of "106*". A processor in PP 101 can read instructions in a plaintext firmware 106 but could not feasibly read instructions within a ciphertext firmware 106*, and thus PP 101 records and operates on a plaintext firmware 106 after a firmware decryption 112.

In exemplary embodiments, the ciphertext firmware 106* can comprise the encrypted firmware in FIG. 7 of the GSMA white paper, and the firmware key 106a can comprise the "SSD keys container" also in FIG. 7 of the GSMA white paper. Although the use of a separate ciphertext firmware key 106a* is depicted in FIG. 1a, for some exemplary embodiments, in other exemplary embodiments, the transmission of a separate ciphertext firmware key 106a* could be omitted, and PP 101 could use a firmware decryption step 112 and a mutually derived symmetric ciphering key from key exchange 110b in order to directly decrypt ciphertext firmware 106* (and server 103 could omit the use of a ciphertext firmware key 106a* as well). In other words, for embodiments without the transfer of a ciphertext firmware key 106a*, then (i) PP 101 and IDS 103 could mutually derive the equivalent of firmware key 106a* such that the key 106a* does not need to be transmitted, and (ii) ciphertext firmware 106* could be encrypted with the mutually derived equivalent of firmware key 106a*.

PBL and PP agent 102x in device 102 can comprise a program or process operating in device 102 for managing the communications with PP 101, such as reading the ciphertext firmware key 106a* and ciphertext firmware 106* from device nonvolatile memory 102s and writing the ciphertext firmware key 106a* and ciphertext firmware 106* to the PP 101. Note that in exemplary embodiments, PBL and PP agent 102x could also write the one-time IDS public key 103d-1 to PP 101. Device 102 could obtain ciphertext firmware key 106a* and ciphertext firmware 106* and the associated one-time IDS public key 103d-1 from server 103 via TLS session 108. The collection of ciphertext firmware key 106a* and ciphertext firmware 106* and IDS public key 103d-1 can comprise a bound package 114. Although the use of a nonvolatile memory 102s is depicted in FIG. 1a, a device 102 could record data from the bound package 114 in a volatile memory such as RANI or also an NVRAM memory. Device memory 102s can comprise general memory for device 102 and also record other data for device 102 than that depicted in FIG. 1a. "PBL and PP agent 102x" may also be referred to herein as agent 102x and agent 102x could manage communications between device 102 and PP 101 via electrical pads 109a depicted in FIG. 1b. In other words, agent 102x could send and receive data with PP 101 for functions other than conducting primary boot loader. For some embodiments, an agent 102x could also be referred to as an "Open Firmware Loader" agent.

For system 100, server 103 and device 102 may establish a secure session 108, which could comprise establishing a secure communications link between the two servers using protocols such as TLS, IPSec, a virtual private network (VPN), a secure shell (SSH), or similar networking, transport, or application layer technologies in order to establish secure communications between server 103 and device 102. Secure session 108 is depicted as "TLS 108" but other methods for establishing secure sessions could be used as well, including Datagram Transport Layer Security (DTLS). Secure session 108 can utilize certificates for server 103 and/or device 102 in order to provide mutual authentication and mutual key derivation for a symmetric encryption key in secure session 108. For some embodiments, the use of a certificate 102t for device 102 in secure session 108 could be omitted, and for these embodiments only server 103 would be authenticated. Other possibilities exist as well for establishing a secure session 108 between server 103 and device 102 without departing from the scope of the present disclosure. Server 103 can begin listening for incoming messages from a device 102 using a physical network interface that provides connectivity to the IP network 107 and server 103 can use a specific port number such as TCP port 443 to listen for incoming data for secure session 108 from a device 102.

As depicted for the secure session 108 in FIG. 1a, a device 102 could send an identity for the primary platform comprising PP-ID 101i as well as public keys comprising PP static public key PK-static.PP 101b and one-time public key PK-OT1.PP 101d-1. Although not depicted in FIG. 1a, device 102 could also send a subset of cryptographic parameters 104a (where the set of cryptographic parameters 104 can comprise a superset of the subset 104a) associated with PP 101 and PK-static.PP 101b in order for server 103 to determine parameters 104a to use with a PK-static.PP 101b. For some embodiments, server 103 could obtain PK-static.PP 101b from other means than TLS 108 (such as from a device manufacturer) and for these embodiments then PP-static.PP 101b could be omitted from the secure session 108. For other embodiments, the use of a one-time PKI key pair for PP 101 could be omitted, such as a key exchange 301a in FIG. 3 below. Device 102 could obtain the data transmitted by device 102 in secure session 108 from PP 101 via PBL and PP agent 102x. In the exemplary embodiments depicted in FIG. 2a below, device 102 could alternatively send a secure hash value over PP-static.PP 101b, and server 103 could select the PP static public key PK-static.PP 101b based on the secure hash value.

As depicted in FIG. 1a, IDS server 103 can include a server private key SK-TLS.IDS 103s, a server certificate 103t, a database for primary platform units comprising PP database 103d, a table or set of IDS static keys, a table or set of IDS one-time PKI keys 103e, a set of cryptographic parameters 104, firmware key 106a, ciphertext firmware 106*, a key exchange 110a, and a firmware key encryption 111. As contemplated herein, an IDS server 103 can also be referred to as a "server 103". Server private key SK-TLS.IDS 103s and server certificate 103t can be used in the establishment of secure session 108 with device 102, such as for authenticating IDS server 103 with device 102. The PP database 103d can include data for a plurality of different primary platforms 101 operating in different devices 102, such as, but not limited to, an identity for PP 101 of PP-ID 101i and a public key of PK-static.PP 101b.

Other data for PP database 103d could include the set of cryptographic parameters 104 for the PP 101, a boot or operating system version for PP 101, a list of versions of current firmware 106 operating with PP 101, and other possibilities as well. IDS server 103 could use PP database 103d to determine which version of a firmware 106 or ciphertext firmware 106* to send to which device 102 with PP 101. Although not depicted in FIG. 1a, server 103 could also record an identity, which could comprise a domain name, IP address, or similar text or numerical value to uniquely identify server 103. For depiction of keys in FIG. 1a and subsequent Figures, the keys for server 103 are displayed as "IDS1". A different IDS server 103 for a system 100 or system 200 below could have the different values of "IDS2", etc.

The set of IDS static keys can record or store at least one static PKI key pair for server 103 comprising server static private key SK.IDS1 103a and server static public key PK.IDS1 103b. Server static public key PK.IDS1 103b could be derived from SK.IDS1 103a. PK.IDS1 103b could comprise PKI keys formatted and compatible with a set of cryptographic parameters 104, where each subset of cryptographic parameters 104a could be associated with different IDS static PKI keys. Exemplary data and values for the use of a secret or private key SKIDS' 103a and the corresponding public key PK.IDS1 103b are depicted and described below in connection with FIGS. 2b and 2c. Although a single key pair is depicted in FIG. 1a, a server 103 could record multiple key pairs, where the different key pairs are used with different sets of cryptographic parameters 104, such as a first key pair for use with a first set of cryptographic parameters and a second key pair for use with a second set of cryptographic parameters. PK.IDS1 103b could also be recorded in the form of a certificate, where the public key PK.IDS1 103b is signed by a certificate authority. SK.IDS1 103b could be recorded in server 103 during in a secure manner during a server configuration step, such that no nodes or entities besides server 103 record or store or feasibly could derive or determine the value for SK.IDS1 103b.

As depicted in FIG. 1a, server 103 could also store or record a series of one-time PKI key pairs comprising IDS one-time keys 103e. One-time PKI public keys could comprise a sequence of public keys such as a first PK-OT1.IDS1 103d-1 with a corresponding first secret key SK-OT1.IDS1 103c-1, a second PK-OT2.IDS1 103d-2 with a corresponding second secret key SK-OT2.IDS1 103c-2, etc. The keys 103e could be derived using a key pair generation algorithm and a random number generator, similar or equivalent to the key pair generation algorithm described for PP one-time keys 101e for PP 101 above. Each of the PKI key pairs or individual public keys for PP 101 recorded in server 103 could be associated with a set of cryptographic parameters 104. A set of cryptographic parameters 104 was also described above for a PP 101 and also depicted and described in more detail below in FIG. 4.

IDS server 103 could receive a ciphertext firmware 106* and a plaintext firmware key 106a from a secure channel with an image maker, which is also depicted in FIG. 6 of the GSMA PP Requirements document. The image maker could be a different server for the processing and creation of images for PP 101 than a server 103. Note that IDS server 103 could communicate with a plurality of different image makers, and the IDS server 103 could select or query for an image for PP 101 using the PP-ID received in secure session 108 and a PP database 103d. Other possibilities for the source and selection of a ciphertext firmware 106* and plaintext firmware key 106a exist without departing from the scope of the present disclosure. For some embodiments, IDS server 103 could receive and record plaintext firmware 106 and encrypt the firmware 106 into ciphertext firmware 106* using a mutually derived symmetric ciphering key from a key exchange 110a. In exemplary embodiments, the ciphertext firmware 106* and firmware key 106a can be utilized with a plurality of different PP 101, and the process of encrypting the firmware key 106a into a ciphertext firmware key 106a* can be unique for each different PP 101.

Server 103 can also include a key exchange algorithm 110a, which could include an ECDH key exchange. Key exchange algorithm 110a in server 103 can be equivalent or correspond to key algorithm 110b in PP 101 described above. For an ECDH key exchange, at least one public key and at least one private key can be input along with cryptographic parameters 104 in order to output a shared secret. The other party (such as PP 101) can also input at least one private key (corresponding to the public key in the prior sentence) and at least one public key (corresponding to the private key in the previous sentence) in order to mutually derive the same shared secret. Exemplary calculations for an ECDH key exchange for a key exchange algorithm 110a are shown below in FIG. 2b. The output of a commonly shared secret key can be used with a key derivation function (KDF) in order to derive a mutually shared symmetric ciphering key. The mutually derived shared symmetric ciphering key can be used with a firmware key 106a encryption step 111. The mutually derived symmetric ciphering key can be used by PP 101 for with firmware decryption 112. As contemplated herein, a "shared secret" can be the same as and also referred to as a "shared secret key".

Server 103 can include a firmware key encryption 111, which converts a plaintext firmware key 106a into a ciphertext firmware key 106a*, where the ciphertext firmware key 106a* can only feasibly be decrypted by PP 101. Exemplary details for firmware key encryption 111 are depicted and described in connection with FIG. 2b below. In summary, a firmware key encryption 111 can comprise an encryption step of plaintext firmware key 106a by server 103 using the mutually derived symmetric ciphering key from key exchange 110a. The output of a firmware key encryption 111 can comprise a ciphertext firmware key 106a*. IDS server 103 can then send device 102 a bound image 114 or a bound package comprising the ciphertext firmware key 106a* and the ciphertext firmware 106*. The bound image 114 can include IDS one-time public key PK-OT1.IDS 103d-1 for PP 101 to use in order to derive the mutually derived symmetric ciphering key. Or, in some embodiments the IDS one-time public key PK-OT1.IDS 103d-1 could be omitted from a bound image 114 and set separately from the ciphertext firmware key 106a* and the ciphertext firmware 106*.

Note that the ciphertext firmware key 106a* and the ciphertext firmware 106* are sent or transmitted to device 102 within the secure session 108, and thus would be "double encrypted". The double encryption can be useful because (i) the processor in device 102 could be untrusted or insecure, while PP 101 could be trusted, and (ii) device 102 would normally "unrap" or decrypt the encryption from secure session 108. Thus, the plaintext data read from receiving data in secure session 108 can comprise ciphertext for PP 101. PP 101 can receive the bound image 114 via PBL and PP agent 102x and subsequently decrypt the data and read and load firmware 106 using a key exchange 110b and a decryption step 112. In this manner, a firmware 106 can be securely delivered to PP 101 through an insecure device and also an insecure network such as Internet 107. Additional details will be provided in subsequent Figures below.

FIG. 1b

Figure 1B:
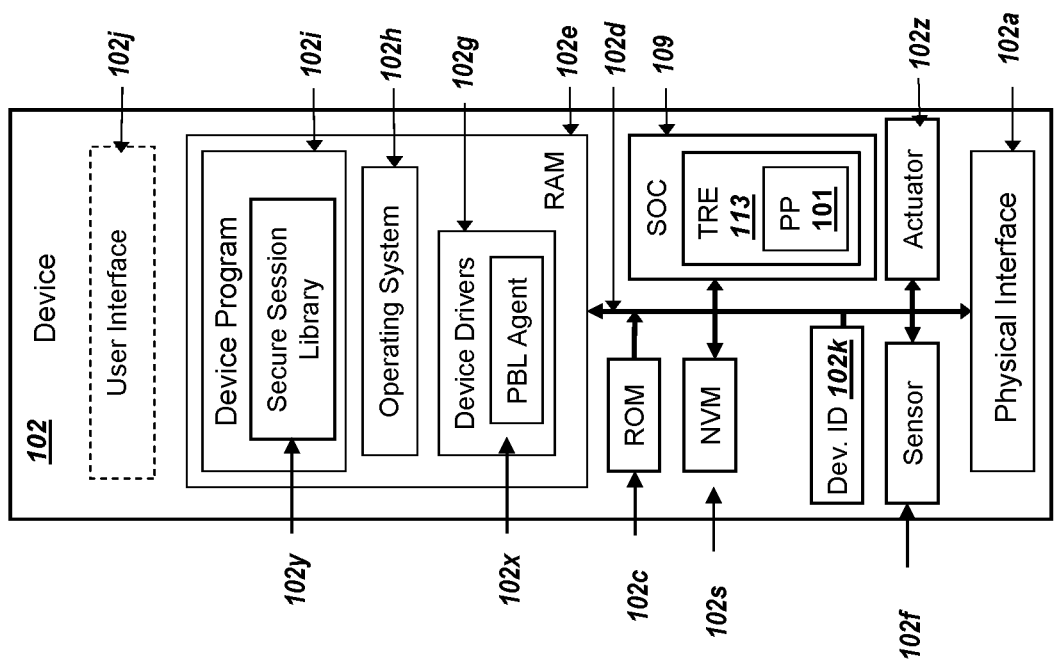
FIG. 1b is a graphical illustration of hardware, firmware, and software components for a device, including a tamper resistant element with a primary platform, in accordance with exemplary embodiments.

FIG. 1b is a graphical illustration of hardware, firmware, and software components for a device, including a tamper resistant element with a primary platform, in accordance with exemplary embodiments. FIG. 1b is illustrated to include many components that can be common within a device 102, and device 102 may also operate in a wireless configuration in order to connect with a wireless network. In a wireless configuration, the physical interface 102a of device 102 may support radio-frequency (RF) communications with networks including a wireless network via standards such as GSM, UNITS, mobile WiMax, CDMA, LTE, LTE Advanced, 5G, and/or other mobile-network technologies. In a wireless configuration, the physical interface 102a may also provide connectivity to local networks such as 802.11 WLAN, Bluetooth, Zigbee, or an IEEE 802.15.4 network, among other possibilities. In a wireless configuration, device 102 could use a physical interface 102a connected with both a wireless WAN and wireless LAN simultaneously. In a wired configuration, the physical interface 102a can provide connectivity to a wired network such as through an Ethernet connection or USB connection.

The physical interface 102a can include associated hardware to provide connections to components such as radio-frequency (RF) chipsets, a power amplifier, an antenna, cable connectors, RF filters, etc. Device drivers 102g can communicate with the physical interfaces 102a, providing hardware access to higher-level functions on device 102. Device drivers 102g may also be embedded into hardware or combined with the physical interfaces. Device drivers 102g can include a PBL and PP agent 102x, which can be utilized by a device 102 and operating system 102h in order to read and write data to TRE 113, including communicating with a primary platform 101 within TRE 113. Device 102 may preferably include an operating system 102h to manage device drivers 102g and hardware resources within device 102. The operating systems described herein can also manage other resources such as memory and may support multiple software programs or software libraries operating on device 102, including applications that communicate with PP 101 through a device driver 102g.

The operating system 102h can include Internet protocol stacks such as a User Datagram Protocol (UDP) stack, Transmission Control Protocol (TCP) stack, a domain name system (DNS) stack, etc., and the operating system 102h may include timers and schedulers for managing the access of software to hardware resources, including TRE 113. The operating system shown of 102h can be appropriate for a low-power device with limited memory and CPU resources (compared to a server 103). Example operating systems 102h for a device 102 includes Linux, Android® from Google®, IoS from Apple®, Windows® Mobile, or Open AT® from Sierra Wireless®. Additional example operating systems 102h for device 102 include eCos, uC/OS, LiteOs, Contiki, OpenWRT, Raspbian, and other possibilities exist as well without departing from the scope of the present disclosure.

A device program 102i may be an application programmed in a language such as, but not limited to, C, C++, Java, and/or Python, and could provide functionality to support M2M applications such as remote monitoring of sensors and remote activation of actuators. A device program 102i could also comprise an application for a mobile phone, table, personal computer, or the like. Device program 102i could also be a software routine, subroutine, linked library, or software device, according to one preferred embodiment. As contemplated herein, a device program 102i may be an application operating within a smartphone, such as an iPhone® or Android®-based smartphone, and in this case device 102 could comprise the smartphone. The application functioning as a device program 102i could be downloaded from an "app store" associated with the smartphone. Device program 102i can include secure session library 102y, which can provide the functionality or "System on a Chip" (SOC) 109 instructions for conducting secure session 108.

Many of the logical steps for operation of device 102 can be performed in software and hardware by various combinations of sensor 102f, actuator 102z, physical interface 102a, device driver 102g, operating system 102h, device program 102i, and SOC 109. Note that device 102 may also optionally include user interface 102j which may include one or more devices for receiving inputs and/or one or more devices for conveying outputs. User interfaces are known in the art for devices 102 and could include a few LED lights or LCD display or OLED display, and thus user interfaces are not described in detail here. User interface 102j could comprise a touch screen if device 102 operates as a smartphone or mobile phone. As illustrated in FIG. 1b, device 102 can optionally omit a user interface 102j, since no user input may be required for many M2M applications, although a user interface 102j could be included with device 102.

Device 102 may be a computing device or wireless device that includes computer components for the purposes of collecting data from a sensor 102f or triggering an action by an actuator 102y. Device 102 may include a central processing unit (CPU) within SOC 109, a random access memory (RANI) 102e, and a system bus 102d that couples various system components including the random access memory 102e to the processing unit 102b. The system bus 102d may be any of several types of bus structures including a memory bus or memory controller, a peripheral bus, and a local bus using any of a variety of bus architectures including a data bus.

Device 102 may include a read-only memory (ROM) 102c which can contain a boot loader program. Although ROM 102c is illustrated as "read-only memory", ROM 102c could comprise long-term memory storage chipsets or physical units that are designed primarily for writing once and reading many times, such as Electrically Erasable Programmable Read-Only Memory (EEPROM). As contemplated within the present disclosure, a read-only address could comprise an address within a read only memory such as a ROM 102c memory address or another hardware address for read-only operations accessible via bus 102d. Changing data recorded in a ROM 102c can require a technician have physical access to device 102, such as removing a cover or part of an enclosure, where the technician can subsequently connect equipment to a circuit board in device 102, including replacing ROM 102c. ROM 102c could also comprise a nonvolatile memory, such that data is stored within ROM 102c even if no electrical power is provided to ROM 102c.

Device 102 can include a SOC 109 and SOC 109 is also depicted and described in connection with FIG. 1c below. SOC 109 can include TRE 113, and additional details for the operation of SOC 109 and TRE 113 is provided in subsequent figures. Although TRE 113 is depicted in FIG. 1b as operating within SOC 109, TRE 113 could be operated within a removable unit such as an SD card, a SIM card, etc. Or TRE 113 could operate within a separate soldered chip connected to bus 102d. An exemplary removable form factor for TRE 113 could comprise a standard SD card, a mini SD card, a micro SD card, a mini UICC, a micro UICC, or a nano UICC, and other possibilities exist as well without departing from the scope of the present disclosure. SOC 109 can include electrical contacts (such as external pads 109a depicted in FIG. 1c) which provide electrical connectivity to bus 102d.

SOC 109 can include NAND or NOR flash memory in order to record data when device 102 is not powered, and other nonvolatile memory technologies can be used in a storage unit as well without departing from the scope of the present disclosure. SOC 109 can be separately manufactured from device 102 and accessed and loaded with data before insertion into device 102. SOC 109 could also operate as an "embedded" unit, such that storage unit comprises an integrated circuit soldered to a circuit board in device 102, and in these embodiments SOC 109 can be fixed and not removable.

In exemplary embodiments, SOC 109 can include a TRE 113, and additional details regarding the components and operation of a TRE 113 are depicted and described in additional figures below, including FIG. 1c. The inclusion of TRE 113 and the operation of TRE 113 with PP 101 in SOC 109 can add functionality for SOC 109 that is not normally included in commercially available SOC in the market as of 2018, such as with the secure receipt of firmware 106 as described herein. TRE 113 within SOC 109 can include a processor, bus, and memory similar (but with less power and on a smaller scale) as the CPU 102*b*, bus 102*d*, and ROM 102*c*. TRE 113 can perform cryptographic functions using either boot firmware or downloaded firmware 106 such as (i) internally deriving a private key such as PP private key 103*e* in a cryptographically secure manner, (ii) recording the private key in a protected memory such that device 102 or external parties cannot feasibly or cost-effectively read the derived private key, and (ii) conducting key exchanges and encryption/decryption.

Although the exemplary environment described herein employs ROM 102*c*, RAM 102*e*, and nonvolatile memory (NVM) 102*s*, it should be appreciated by those skilled in the art that TRE 113 could also operate within other types of computer readable media which can store data that is accessible by a device 102, such as memory cards, subscriber identity device (SIM) cards, local miniaturized hard disks, and the like, which may also be used in the exemplary operating environment without departing from the scope of the disclosure. The memory and associated hardware illustrated in FIG. 1*b* provide nonvolatile storage of computer-executable instructions, data structures, program devices, device program 102*i*, device drivers 102*g*, and other data for computer or device 102. Note the device 102 may include a physical data connection at the physical interface 102*a* such as a miniaturized universal serial bus adapter, firewire, optical, or other another port and the computer executable instructions such as device program 102*i*, operating system 102*h*, or device driver 102*g* can be initially loaded into memory such as ROM 102*c* or NVM 102*s* through the physical interface 102*a* before device 102 is given to an end user, shipped by a manufacturer to a distribution channel, or installed by a technician.

Further, device program 102*i*, operating system 102*h*, or device driver 102*g* can be separately loaded into NVM 102*s* before or after distribution of device 102. In some exemplary embodiments, applications or programs operating within device 102 can be given limited or restricted access to TRE 113 in order to support the applications or programs. For example, a mobile payment application operating a device program 102*i* could authenticate either device 102 or a user with keys recorded in TRE 113 and a firmware 106. Device program 102*i* could provide a graphical user interface (GUI) to a user through user interface 101*j*. Other possibilities exist as well for a device program 102*i* to operate in conjunction with keys and identities recorded in TRE 113 without departing from the scope of the present disclosure.

A number of program devices may be stored in RAM 102*e*, ROM 102*c*, or NVM 102*s*, including an operating system 102*h*, device driver 102*g*, an http client (not shown), a DNS client, and related software. TRE 113 can record program devices as well, where the program devices in TRE 113 may be focused on cryptographic operations and functions conducted within TRE 113 in support of the operation of device 102. A firmware 106 depicted and described in connection with FIG. 1*a* and other figures herein can comprise a program device. Program devices include routines, sub-routines, programs, objects, components, data structures, etc., which perform particular tasks or implement particular abstract data types. Aspects of the present disclosure may be implemented in the form of (i) a device program 102*i* which are executed by the device 102 working in conjunction with (ii) firmware 106 on TRE 113 and PP 101 to authenticate device 102 with a server using public key infrastructure. In exemplary embodiments, program devices for TRE 113 in SOC 109 can include cryptographic algorithms 141 as depicted and described in connection with FIG. 1*c* below.

A user may enter commands and information into device 102 through an optional user interface 102*j*, such as a keypad, keyboard (possibly miniaturized for a mobile phone form-factor), and a pointing device. Pointing devices may include a trackball, an electronic pen, or a touch screen. A user interface 102*j* may also include a display (not shown) such as a device screen. A display may also be connected to system bus 102*d* via an interface. The display can comprise any type of display devices such as a liquid crystal display (LCD), a plasma display, and an organic light-emitting diode (OLED) display. Device 102 may also include a camera (not shown) connected to or integrated with device 102 through a physical interface 102*a*, and the camera can comprise a video camera for the device 102 to collect sensor data that includes video or images. The camera (not shown) can be a CCD (charge-coupled device) camera, a CMOS (complementary metal-oxide-semiconductor) camera, or a similar device to collect video or camera input including QR codes. Other arrangements could be used as well, without departing from the disclosure.

The device 102, comprising a computer, may operate in a networked environment using logical connections to one or more remote computers, such as servers. Servers communicating with device 102 can also function as a general purpose server to provide files, programs, disk storage, remote memory, and other resources to device 102 usually through a networked connection. Additional remote computers with which device 102 communicates may include another device 102 or mobile device, an M2M node within a capillary network, a personal computer, other servers, a client, a router, a network PC, a peer device, a wireless network, or other common network nodes. The servers or networks communicating with device 102 or a remote computer typically includes many of the elements described above relative to the device 102, including a CPU, memory, and physical interfaces. It will be appreciated that the network connections shown throughout the present disclosure are exemplary and other means of establishing a wireless or wired communications link may be used between mobile devices, computers, servers, corresponding nodes, and similar computers. The operation of a TRE 113 within device 102 with a firmware 106 can be utilized to authenticate a device 102 in each or any of the above described networking environments.

The device program 102*i* operating within device 102 illustrated in FIG. 1*b* and communicating with TRE 113 can provide computer executable instructions to hardware such as CPU 102*b* through a system bus 102*d* in order for a device 102 to (i) transmit and receive data with a service provider, (ii) monitor a sensor and/or change the state of an actuator 102*y*, (iii) send or receive packets with a server or network, and (iv) authenticate with a server, thus allowing the server to remotely monitor or control device 102 in an authenticated and secure manner. The device program 102*i* can enable the device 102 to authenticate and communicate with a server by recording data in memory such as RAM 102*e*, where the data can include sensor data, a destination IP address number, a packet or packet header value, an encryption or ciphering algorithm and key, a digital signature and public key, etc, where cryptographic operations or calculations for the device program 102*i* can be performed by TRE 113 using firmware 106. The data recorded in RAM 102*e* can be subsequently read by the operating system 102*h* or the device driver 102*g*. The operating system 102*h* or the device driver 102g can write the data to a physical interface 102a using a system bus 102d in order to use a physical interface 102a to send data such as a digital signature for authentication to a server using the Internet 107. In exemplary embodiments, the digital signature can be generated or processed in the TRE 113 using a PP 101 and firmware 106. Alternatively, the device program 102i can write the data directly to the physical interface 102a using the system bus 102d.

In general, digital signatures for authentication with a server can be performed in TRE 113, where the digital signature output is transferred from TRE 113 to RAM 102e before being transmitted from device 102 to a server through the IP network 107. The data recorded in RAM 102e such as a digital signature can be subsequently read by the operating system 102h or the device driver 102g. Note that device driver 102g can include PBL and PP agent 102x in order to communicate with TRE 113. Thus, PBL and PP agent 102x can be a device driver 102g specifically for TRE 113. The operating system 102h or the device driver 102g can write the data to a physical interface 102a using a system bus 102d in order to use a physical interface 102a to send data such as a digital signature for authentication to a server using the Internet 107. Alternatively, the device program 102i can write the data directly to the physical interface 102a using the system bus 102d. Other possibilities exist as well without departing from the scope of the present disclosure.

The device program 102i or operating system 102h using TRE 113 and PP 101 with firmware 106 can include steps to process the data recorded in memory such as encrypting data, selecting a destination address, or encoding sensor data acquired by (i) a sensor 102f or (ii) through a physical interface 102a such as a thermocouple, shock or vibration sensor, light sensor, or global positioning system (GPS) receiver, etc. The device 102 can use the physical interface 102a such as a radio to transmit or send (i) the data from a sensor or (ii) a digital signature from TRE 113 to a wireless network 102. For those skilled in the art, other steps are possible as well for a device program 102i or operating system 102h to collect data from either (i) a sensor 102f or (ii) a TRE 113 and send the data in a packet without departing from the scope of the present disclosure.

Conversely, in order for device 102 to receive a packet or response from server, which could include a challenge or nonce in order to authenticate a device 102 with the server, the physical interface 102a can use a radio to receive the challenge or nonce from a wireless network. The challenge or nonce received from the server through the wireless network could comprise a random number or a pseudo random string of digits, bits, and/or characters. The received data can include information from a server and may also comprise a datagram, a source IP address number, a packet or header value, an instruction for device 102, an acknowledgement to a packet that device 102 sent, a digital signature, and/or encrypted data. The operating system 102h or device driver 102g can use a system bus 102d and CPU 102b to record the received data such as a challenge or nonce from a server in memory such as RAM 102e, and the device program 102i or operating system 102h may access the memory in order to process the received data and determine the next step for the device 102 after receiving the data.

Processing the received data from a server to device 102 could include deciphering or decrypting received data by TRE 113 with a key recorded in TRE 113, sending the challenge or nonce to the TRE 113, reading an instruction from a server, or similar transformations of the received data. The steps within the paragraph above may also describe the steps a device program 102i can perform in order to receive a packet. For those skilled in the art, other steps are possible as well for a device program 102i or device 102 to receive a packet or challenge or nonce from a server without departing from the scope of the present disclosure. A server described herein without the designation of "server 103" or IDS server 103 can comprise a different server than server 103 communicating with device 102 in support of an application operating as a device program 102i.

Moreover, those skilled in the art will appreciate that the present disclosure may be implemented in other computer system configurations, including hand-held devices, netbooks, portable computers, multiprocessor systems, microprocessor based or programmable consumer electronics, network personal computers, minicomputers, mainframe computers, servers, and the like. The disclosure may also be practiced in distributed computing environments, where tasks are performed by remote processing devices that are linked through a communications network. In a distributed computing environment, program devices may be located in both local and remote memory storage devices. In addition, the terms "mobile node", "mobile station", "mobile device", "M2M device", "M2M device", "networked sensor", or "industrial controller" can be used to refer to device 102 as contemplated herein.

Although not depicted in FIG. 1b, a server shown above in FIG. 1a such as IDS server 103 and other servers as well can include equivalent internal components as device 102 in order to operate. The server 103 in FIG. 1a could include a processor similar to CPU 102c, with primary differences for the processor server being increased speed, increased memory cache, an increased number and size of registers, the use of a 64 bits for datapath widths, integer sizes, and memory address widths, as opposed to an exemplary 32 bits for processor cores in SOC 109 or an exemplary 32 or 16 bits for a processor in TRE 113. Other possibilities exist as well for the size of datapath widths for a TRE 113 and processing core in device 102 without departing from the scope of the present disclosure. Similarly, RAM in a server could be a RAM similar to RAM 102e in device 102, except the RAM in a server could have more memory cells such as supporting exemplary values greater than an exemplary 16 gigabytes, while RAM in device 102 could support fewer memory cells such as less than an exemplary 8 gigabytes. Non-volatile memory for storage in a server 103 in FIG. 1a could comprise disks, "solid state drives" (SSDs) or "storage area networks" (SAN) for a server. For a physical interface 102a, in exemplary embodiments, a server 103 in FIG. 1a could use a physical, wired LAN interface such as a high-speed Ethernet or fiber optic connection.

In exemplary embodiments, a device 102 can include the functional capabilities of (i) collecting sensor data, (ii) changing state of an actuator 102z, (iii) communicating the data associated with a sensor or actuator with a wireless network, and/or receiving a challenge or nonce from a server and sending a digital signature. The device driver 102g, operating system 102i, and/or device program 102i could optionally be combined into an integrated system for providing the device 102 functionality. Other possibilities exist as well for the configuration or combination of components illustrated in FIG. 1b without departing from the scope of the present disclosure.

FIG. 1c

Figure 1C:
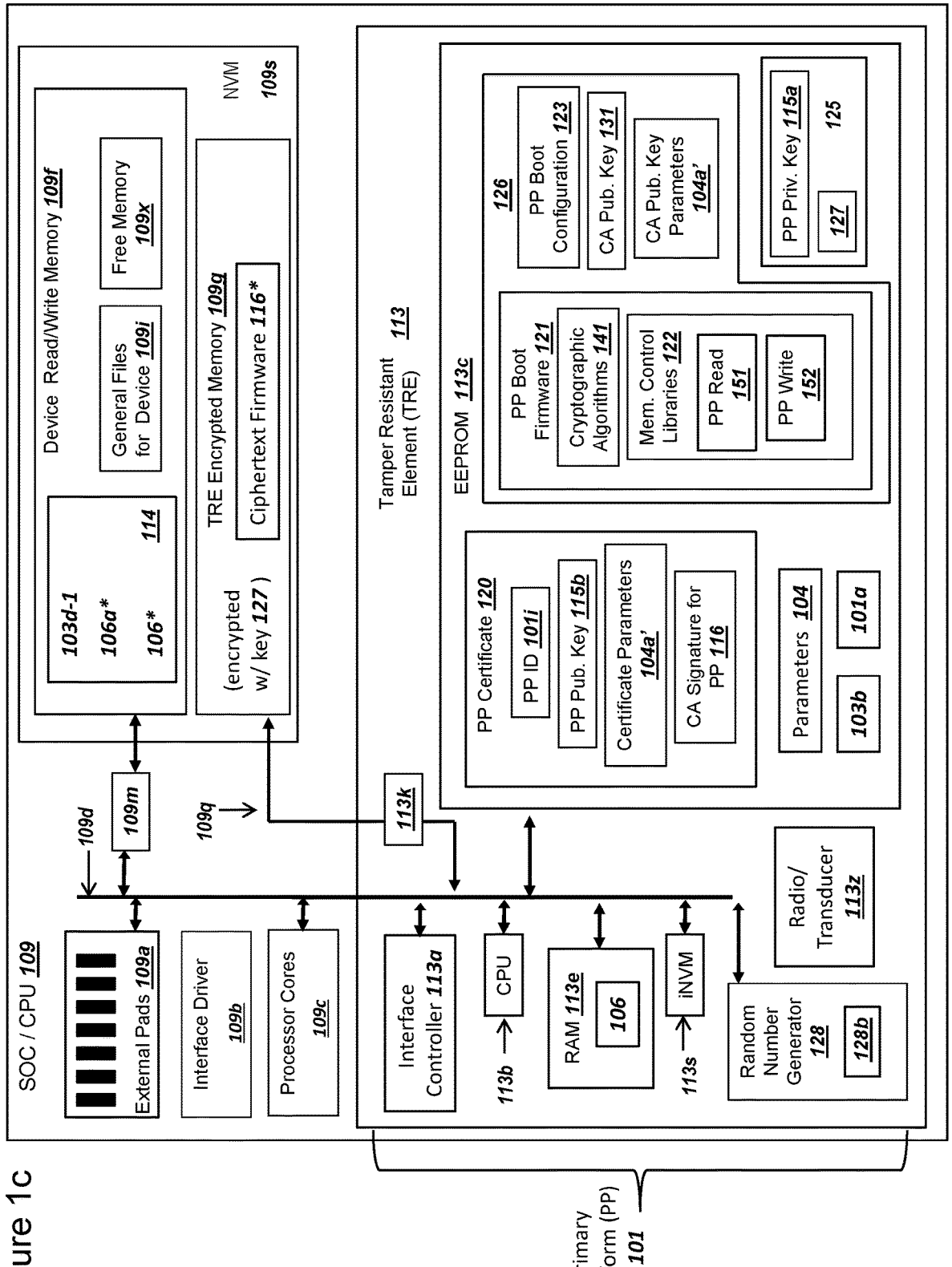
FIG. 1c is a graphical illustration of hardware, firmware, and software components for a device, including a tamper resistant element with a primary platform, in accordance with exemplary embodiments.

FIG. 1c is a graphical illustration of hardware, firmware, and software components for a device, including a tamper resistant element with a primary platform, in accordance with exemplary embodiments. FIG. 1c is illustrated to include several components that can be common within a "system on a chip" (SOC) 109 and a manufactured TRE 113 with a PP 101. Device 102 may consist of multiple components in order to collect and transmit transducer data from a sensor 102f or an actuator 102z associated with device 102. In exemplary embodiments and as depicted in FIG. 1b above, device 102 can include and operate with the SOC 109, where SOC 109 can include a processor such as a central processing unit (CPU) or processor cores.

Device 102 can include a manufactured SOC 109. SOC 109 can include separate components of external pads 109a, interface driver 109b, processor cores 109c, bus 109d, memory core interface 109m, nonvolatile memory 109s, and TRE 113. Although TRE 113 is depicted as operating in SOC 109, TRE 113 could also operate within a different component in device 102, such as physical interface 102a (in FIG. 1b above), where physical interface 102a could include a radio and a baseband processing unit. TRE 113 could also operate within a user interface 101j, and other possibilities exist as well without departing from the scope of the present disclosure, including TRE 113 operating as a "stand alone" module or chip soldered to a circuit board for device 102.

The external pads 109a of SOC 109 can provide an electrical interface for SOC 109 to connect with bus 102d of device 102, such that the internal components of device 102 can communicate with the internal components of SOC 109, using a device driver 102g, which could comprise PBL and PP agent 102x. The external pads 109a can include pins or electrical contacts for electrical input into SOC 109 and such as a power voltage, electrical ground, a clock input, and data lines to communicate binary data. The external pads 109a can support electrical output from SOC 109 as well. Although not separately depicted in FIG. 1c, a TRE 113 could also include electrical connectors similar to external pads 109a in order to transfer electrical signals from TRE 113 to SOC 109.

Interface driver 109b within SOC 109 can provide the firmware to support the selected physical bus type of both (i) bus 102d and internal bus 109d and (ii) a communications protocol for transferring data through the external pads 109a. The interface driver 109b can provide functionality similar to device driver 102g in FIG. 1b. For example, interface driver 109b could support multiple different bus types of a SPI bus, an I2C bus, a memory bus, and other possibilities exist as well for data transfer using the driver 109b between processing cores 109c and device 102 using bus 102d, and other possibilities exist as well.

The processing cores 109c can comprise a general purpose processing cores appropriate for typically low power consumption requirements for a device 102 (compared to a server 103), and may also function as a microcontroller. The processing cores 101c can include at least one processor core for device 102 such as an ARM® based processor or an Intel® based processor such as belonging to the Atom or MIPS family of processors, and other possibilities exist as well including exemplary Cortex-M processors and cores. A single processor or processing core could operate for processing cores 109c as well. The processing cores 109c can also comprise specialized processing cores, such as including hardware based cryptographic accelerators, field-programmable gate arrays (FPGAs), and other possibilities exist as well without departing from the scope of the present disclosure.

Internal bus 109d can comprise at least one data bus to connect the internal components of SOC 109, including TRE 113. Internal bus 109d can be a bus similar to bus 102d for device 102 as depicted and described in connection with FIG. 1b above. Although internal bus 109d is depicted as extending into TRE 113, in exemplary embodiments two separate data buses could be utilized, and the two busses connected via electrical connections for TRE 113 similar to pads 109a, where TRE 113 manages the data flow between the two busses using an interface controller 113a.

SOC 109 can also include a memory core interface 109m, where memory core interface 109m provides processor 109c and/or TRE 113 access to physical memory such as nonvolatile memory 109s and/or a RAM memory within SOC 109. RAM memory within SOC 109 and external to TRE 113 is not shown in FIG. 1c, but RAM memory similar to RANI 102e for device 102 could be included in SOC 109 and connected via internal bus 109d. Processor 109c and/or TRE 113 can read data from physical memory by writing an address of a memory page and/or block to memory core interface 109m, and memory core interface 109m returns the data from the page in physical nonvolatile memory 109s or a RAM memory for SOC 109 or TRE 113.

Similarly, processor 109c and/or TRE 113 can write data from physical memory by writing an address of a memory block and/or page to memory core interface 109m plus the data to be recorded in physical memory, and memory core interface 109m can subsequently write the data to physical memory at the block and page address specified. Other possibilities exist as well for the use of a memory core interface 109m without departing from the scope of the present disclosure. In exemplary embodiments, individual cells within a page can be addressed by a memory core interface 109m as well, and other possibilities for the structure and naming conventions of memory are possible without departing from the scope of the present disclosure.

Physical nonvolatile memory 109s can comprise memory similar or equivalent to nonvolatile memory 102s as depicted and described for device 102 above in FIG. 1b. Data recorded in memory 109s can remain stored in SOC 109 when power is removed from SOC 109. Although memory 109s is depicted as located within SOC 109, (X) some memory cells recording data for SOC 109 could be located outside the physical housing of SOC 109 and/or TRE 113 and (Y) other memory cells recording data for SOC 109 could be located inside the physical housing of SOC 109. TRE 113 and processor cores 109c could access the physical nonvolatile memory 109s via a bus 109d and a memory controller 109m. In some exemplary embodiments, a memory controller 109m could operate with physical nonvolatile memory both (i) inside SOC 109 and (ii) outside SOC 109 and within device 102.

Physical nonvolatile memory 109s for SOC 109 can comprise at least a device read/write memory 109f and a TRE encrypted memory 109g. As noted in the paragraph above some data or memory allocations depicted in FIG. 1c as recorded in memory 109s in SOC 109 could be recorded or stored in nonvolatile memory 102s for device 102. Device read/write memory 109f can include a bound image 114 which has been downloaded from a secure session 108 as depicted in FIG. 1a above. Bound image 114 can include a one-time public key for IDS server 103 such as PK-OT1.IDS1 103d-1, a ciphertext firmware key 106a*, and ciphertext firmware 106*. Device read/write memory 109f can also be referred to as device memory 109f. Device memory 109f can also include general files for device 109i and free memory 109x. General files for device 109i can include files or data for the operation of device 102, such as data or libraries for device programs 102i, operating system 102h, and device drivers 102g. Free memory 109x can include unused or unallocated or free memory that is available for use by device 102 and/or TRE 113.

TRE encrypted memory 109g can comprise memory within nonvolatile memory 109s that includes data and/or files for TRE 113 that are encrypted and decrypted by TRE 113 using at least a symmetric ciphering key 127 and a memory controller 113k, where memory controller 113k is described in the paragraph below. Symmetric ciphering key 127 can comprise a sequence of pseudo-random digits unique for TRE 113 that are recorded in a read only memory for TRE 113 as shown in FIG. 1c within EEPROM 113c, although other possibilities exist as well for the location and format of a symmetric ciphering key 127 for TRE 113 without departing from the scope of the present disclosure, such as recording key 127 in iNVM 113s. TRE encrypted memory 109g can include ciphertext firmware 116*, where ciphertext firmware 116* can be different than ciphertext firmware 106*. Ciphertext firmware 116* can be either (i) a different firmware than firmware 106 (e.g. include different plaintext processor instructions for a different application than firmware 106) and/or (ii) be encrypted with symmetric key 127 instead of a firmware key 106a. In other words, ciphertext firmware 116* can comprise firmware that is encrypted by TRE 113 and managed by TRE 113 (such as stored by TRE 113 for later loading or use) and ciphertext firmware 106* can comprise firmware that is encrypted by an image maker 299 (in FIG. 2a below).

Data recorded in nonvolatile memory 109g (or nonvolatile memory 102s) may be (X) logically or physically separately from processor cores 109c and device 102 for (Y) reading and writing exclusively by TRE 113 through the use a memory controller 113k. Memory controller 113k can provide physical or logical isolation of TRE 113 and TRE encrypted memory 109g such that device 102 or SOC 109 could not feasibly read or write valid ciphertext data to memory 109g which could be subsequently read by TRE 113. For embodiments where TRE encrypted memory is physically separated from other memory for device 102 in SOC 109, encryption could be optionally omitted and the memory 109g could be referred to as "TRE only accessible memory" 109g.

As one example of physical separation of memory 109g, the physical memory in SOC 109 comprising non-volatile memory 109g could have a portion of the physical addresses reserved for reading and writing by TRE 113 only, such as an exemplary top 50 blocks of non-volatile memory 109g. Memory controller 113k could intentionally disallow the transfer of data from or to non-volatile memory 109g to (i) processors 109c or (ii) other components within SOC 109 or (iii) device 102 except for TRE 113, where the block address is in the exemplary top 50 blocks. Memory controller 113k could also operate on a lower level than a block address for non-volatile memory 109g as well, such as only allowing TRE 113 or processor 113b (discussed below in FIG. 1c) to allow a specified range of pages within non-volatile memory 109g, where the specified range of pages could belong to TRE encrypted memory 109g.

In this manner, memory controller 113k could operate as a firewall to restrict access for TRE encrypted memory 109g to TRE 113. Other possibilities exist as well for the operation of a memory controller 113k in order to isolate and separate "TRE only accessible memory" or TRE encrypted memory 109g such that processor cores 109c cannot feasibly utilize, read from, or write to physical memory addresses for recording and reading data utilized in "TRE only accessible memory" or "TRE encrypted memory" 109g. In addition, memory controller 113k and TRE 113 could utilize a memory bus 109q such that only (i) data encrypted by TRE 113 would be written to TRE encrypted memory 109g and (ii) data decrypted by TRE 113 could be feasibly read in plaintext form by TRE 113 using symmetric key 127. In other words, memory bus 109q could be a physical bus or a logical bus or circuit for TRE to access memory 109g. Memory bus 109q is not required in some exemplary embodiments, and memory controller 113k could be connected to data bus 109d, but limit access to physical memory cells comprising memory 109g to processor 113b. Other possibilities for limiting access to memory 109g to TRE 113 are possible as well without departing from the scope of the present disclosure.

In another embodiment, memory controller 113k could perform hardware-based encryption/decryption using a symmetric key 127 to encrypt and decrypt data transferred between TRE 113 and TRE encrypted memory 109g. In an exemplary embodiment, TRE encrypted memory 109g can be formatted with a file system with a separate partition from the memory that device 102 and SOC 109 accesses within memory 109f. A file system on TRE encrypted memory 109g could be encrypted using a symmetric ciphering algorithm from cryptographic algorithms 141 a symmetric key 127 recorded by TRE 113, such that even if TRE encrypted memory 109g could be accessed by device 102 or SOC 109, no useful data could be extracted or tampered with.

Although memory controller 113k is depicted in FIG. 1c as a separate element from memory core interface 109m, memory controller 113k could also be optionally integrated with memory core interface 109m, and other possibilities exist as well for the operation and location of a memory controller 113k for ciphering data or restricting access to data recorded in SOC 109 for TRE 113, without departing from the scope of the present disclosure.

SOC 109 or device 102 can include tamper resistant element (TRE 113). TRE 113 can also be referred to as a "secure element", "secure enclave", "secure environment", or also a trusted execution environment (TEE) or smart secure platform (SSP). As depicted in FIG. 1c, TRE 113 can comprise the physical hardware with components consisting of at least an interface controller 113a, a CPU 113b, memory controller 113k, RAM 113e, internal nonvolatile memory (iNVM) 113s, an internal bus 109d which could be segmented and a distinct subset of a bus 109d that is external to TRE 113 and internal to SOC 109, a hardware-based random number generator 128, a transducer 113z, and an Electrically Erasable Programmable Read-Only Memory (EEPROM) 113c. The connection of the subset of bus 109d inside TRE 113 and the external portion of bus 109d within SOC 109 could be managed by interface controller 113a.

TRE 113 can include a primary platform identity PP-ID 101i. PP-ID 101i could comprise a preferably unique alphanumeric or hexadecimal identifier for PP 101, such as a universal unique identifier (UUID), an International Mobile Equipment Identity (IMEI), an owner interface identifier in an IPv6 network, a serial number, or other sequence of digits to uniquely identify each of the many different possible units for PP 101 in a system 100 and other systems herein. PP-ID 101i can preferably be recorded in a non-volatile memory or written directly to hardware in TRE 113 by a TRE manufacturer upon TRE 113 manufacturing.

Figure 2A:
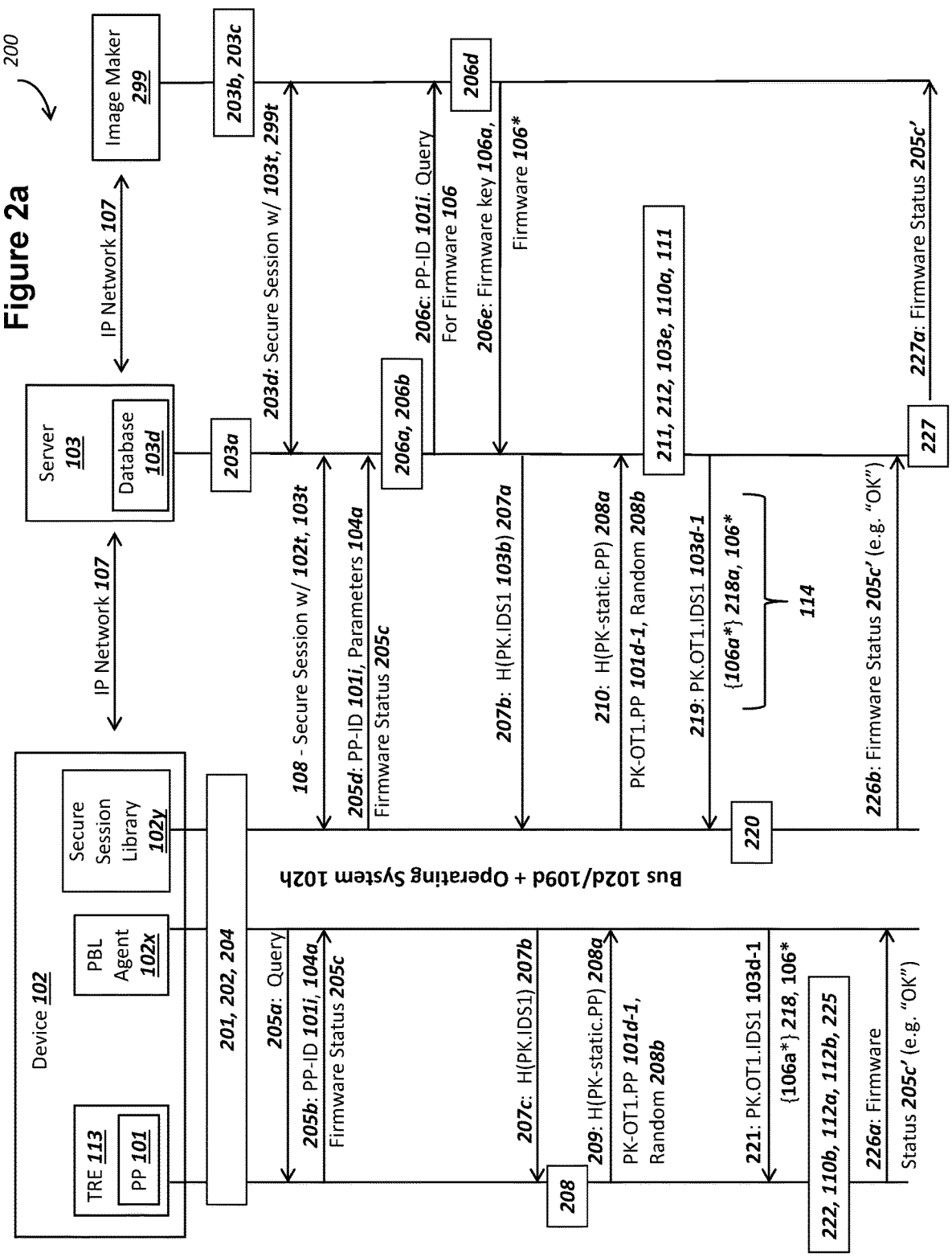
FIG. 2a is a simplified message flow diagram illustrating an exemplary system with exemplary data sent and received by a device with a primary platform, a server, and an image maker, in order to securely transfer a firmware for the primary platform to the device, in accordance with exemplary embodiments.
Figure 3:
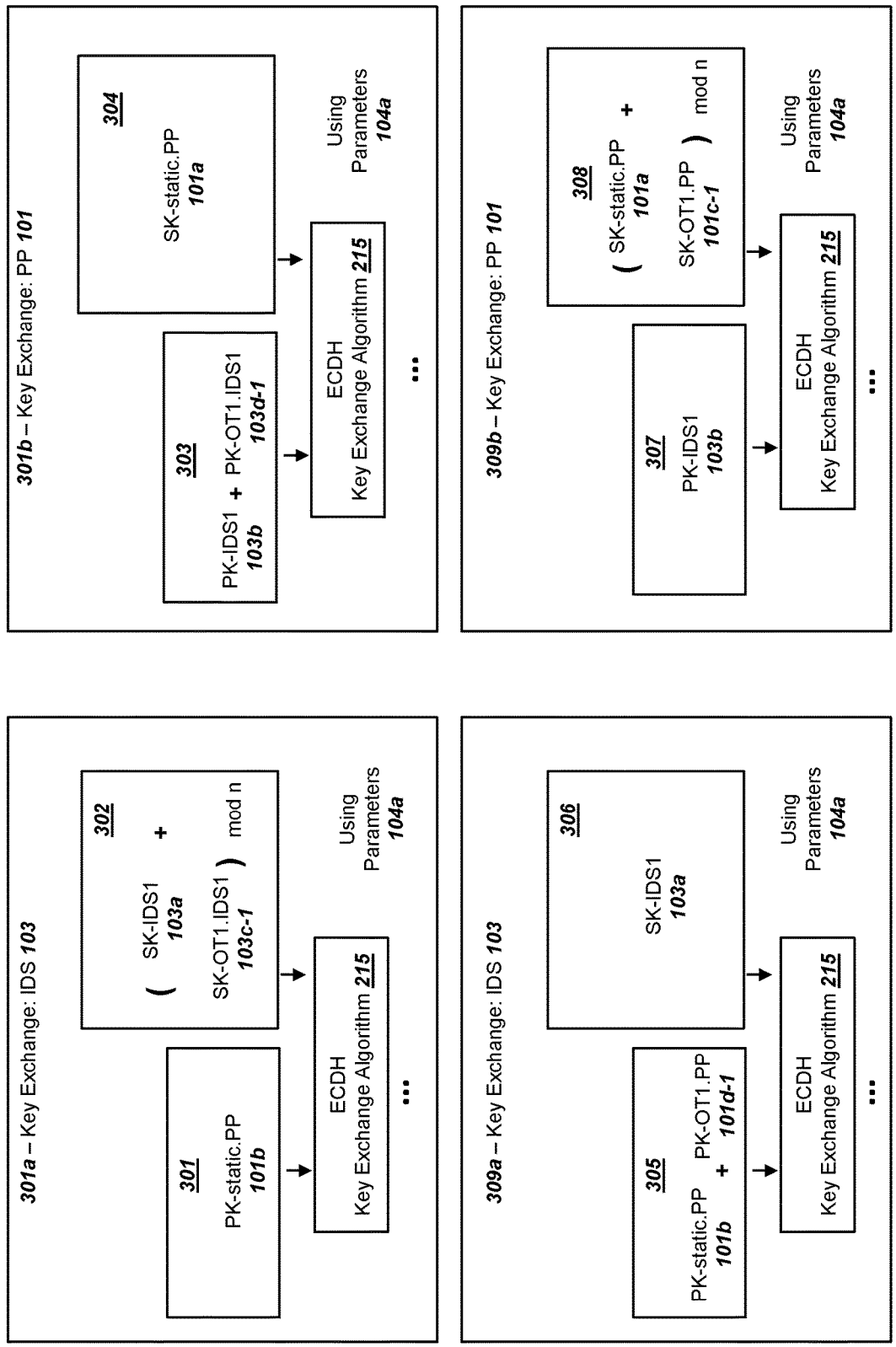
FIG. 3 is a flow chart illustrating exemplary steps for conducting a key exchange using PKI keys in order to derive a shared secret key, in accordance with exemplary embodiments; and, FIG. 4 is an illustration of an exemplary set of cryptographic parameters, in accordance with exemplary embodiments.

CPU 113b can comprise a processor embedded into the TRE 113 and consequently typically with less resources than processing cores 109c, such as (i) less cache memory, (ii) operating typically at a slower speed, (iii) fewer internal registers, (iv) lower power consumption due to reduced thermal dissipation for a TRE 113 compared to device 102, etc. CPU 113b with interface controller 113a can also manage and sequence the flow of data between TRE 113 and the portion of the bus 109d extending to TRE 113. CPU 113b can also process other functions such as operating a set of cryptographic algorithms 141 recorded in boot firmware 121 or other cryptographic operations within a downloaded and/or operating firmware 106. CPU 113b could conduct the processing, computational, and logical steps for TRE 113 and PP 101 as depicted in FIG. 2a and FIG. 3 below, as well as other Figures herein.

The processor 113b in TRE 113 can function similar to processor cores 109c for SOC 109 as described above. However, processor 113b can operate with a form factor, speed, and computational capacity suitable for TRE 113. Processor 113b in TRE 113 could be a processor belonging to the exemplary MIPS®, ARM®, or Intel® family of processors, and other possibilities exist as well. Processor 113b can include components such as registers, accumulators, and logic elements to add, subtract, multiply, and divide numerical values, and processor 113b can be connected to data bus 109d. The timing of processor 113b and data bus 109d can be driven by a clock, which could be either (i) operating internal to TRE 113 and connected to bus 109d or (ii) operating external to TRE 113 and input to TRE 113 via bus 109d. Processor 113b can provide the hardware for TRE 113 to perform calculations for cryptographic algorithms 141 in addition to the general operation of TRE 113 and managing communication between TRE 113 and SOC 109 through electrical connections similar to electrical pads 109a. Processor 113b could also be connected to internal bus 109q. When TRE 113 has received electrical power and loaded boot firmware from EEPROM 113c, then TRE 113 using processor 113b can operate as a primary platform 101.

EEPROM 113c could also comprise a read only memory, where the data in EEPROM 113c is written once upon manufacturing of SOC 109. EEPROM 113c could also function as a read only memory for TRE 113 similar to ROM 102c for device 102 above. In other words, EEPROM 113c does not need to be erasable and reprogrammable, although some data in EEPROM 113c could be re-written in exemplary embodiments. EEPROM 113c could comprise a nonvolatile flash memory based on NAND or NOR memory cell technology, and other possibilities exist as well without departing from the scope of the present disclosure. The contents of EEPROM 113c will be discussed in additional detail below for this FIG. 1c. Although depicted as using EEPROM 113c, the data and elements depicted within EEPROM 113c in FIG. 1c could be alternatively stored in an internal nonvolatile memory (iNVM) 113s, where the memory within 113s is tagged or set as being "read only" during most of the life of operation of TRE 113. In other words, a physical EEPROM chip or memory cells are not required for some embodiments in order to implement the functionality of EEPROM 113c depicted in FIG. 1c.

Random access memory 113e in TRE 113 can function similar to RAM 102e for device 102, with a form factor, speed, and storage capacity suitable for TRE 113. RAM 113e can be connected to an internal data bus 109d in TRE 113 (where (X) the internal data bus 109d in TRE 113 can be separate from (Y) the internal bus 109d outside TRE 113 and in SOC 109). RAM 113e and can store data for processor 113b in a volatile state, such that data recorded in RAM 113e can be essentially flushed or reset when electrical power to SOC 109 and TRE 113 is removed. Random access memory 113e can store data such as tables of memory addresses and sectors for memory 109g and memory 113s, since these tables are ordinarily larger than the registers provided by CPU 113b.

For some exemplary embodiments, although depicted as separate elements for both (i) processor cores 109c, and RANI 113e, and (ii) CPU 113e and RAM 113e, the two elements (processor and RANI) could comprise the same physical hardware but represent time division or time separation of the physical hardware, similar to how the same physical hardware can host multiple logical processes running concurrently In other words, processor cores 109c could switch operations between a "normal" mode functioning as a CPU for device 102 and then a "secure" mode as TRE 113 for device 102. Or, CPU 113b could represent a virtualized process or computer within device 102, where the OS 102h implements virtualization and operates as a host for TRE 113. Switching could take place rapidly enough that processor 109c and TRE CPU 113b would appear to other components (both inside and outside device 102) as separate processors, while there could be a single physical processor inside device 102 such as within SOC 109.

As depicted in FIG. 1c, TRE 113 can include a transducer 113z, where transducer 113z could comprise a sensor and/or a radio. Transducer 113z can also be referred to as a radio 113z. Radio 113z could support NFC communication. Although illustrated as internal to TRE 113, radio 113z could be external to TRE 113 in some embodiments. A radio 113z that is external to TRE 113 but internal to SOC 109 could be connected via a secure bus such as bus 109d. In some embodiments, bus 109d can extend outside SOC 109 and/or TRE 113 in order to connect external components for SOC 109 with internal components for SOC 109 and TRE 113.

Radio 113z can comprise a radio for short-distance wireless communication, and be connected with an antenna. Radio 113z, when operating to support NFC communications, could (i) transmit and receive at the globally available frequency for unlicensed use of 13.56 Mhz, and (ii) be compatible with the International Standards Organization (ISO) 14443 standards and subsequent and related versions. Radio 113z can operate as any of an NFC reader, NFC writer, and NFC peer-to-peer communication, and preferably supports communication at short range such as within several inches of SOC 109 and TRE 113. Radio 113z, when operating as an NFC radio, can support radio frequency communications with another NFC radio, when device 102 with SOC 109 is within close physical proximity of the other NFC radio, such as less than a few feet in an exemplary embodiment.

A benefit of the use of short-range communication for radio 113z is physical security, such that any external device desiring to communicate with TRE 113 through radio 113z must be in close physical proximity. In exemplary embodiments radio 113z could support other short-range wireless standards besides NFC. Radio 113z could implement radio frequency protocols that utilize low power and close proximity for the other node for which TRE 113 will communicate with. In exemplary embodiments, radio 113z could be a Bluetooth or WiFi radio, but operate at intentionally reduced in order to require closer physical proximity for an external device such as a mobile phone to communicate with TRE 113 using radio 113z. For embodiments where radio 113z operates as a Bluetooth or WiFi radio, radio 113z could transmit at a power in an exemplary range of 0.001-0.1 watts. Other possibilities for the radio technology and power levels of radio 113z exist without departing from the scope of the present disclosure.

TRE 113 can also include an embedded sensor for a transducer 113z. A sensor as a transducer 113z could comprise a sensor similar to sensor 102f for device 102, with a difference that a sensor for transducer 113z can be sufficiently small to be enclosed by the housing for TRE 113 along with the other components illustrated in FIG. 1c. In exemplary embodiments the analog output of a sensor for transducer 113z can be converted to digital form by CPU 113b and utilized as input, along with other data, into a random number seed 128b within random number generator 128 in TRE 113. A sensor for a transducer 113z could collect analog data, such as temperature, pressure, thermal noise in silicon within TRE 113, or other environmental variables, with a sufficient number of significant digits, such that the trailing digits could comprise an effective noise value. Or, the combination of many different measurements by a sensor as transducer 113z could comprise an essentially random value or a number with enough randomness for use with cryptographic operations.

As illustrated in FIG. 1c, TRE 113 and SOC 109 may also contain a random number generator 128. Random number generator 128 can comprise a physical component that generates random or pseudo random numbers for cryptographic operations of TRE 113 and PP 101. A random number generator 128 can also comprise a hardware random number generator. The creation of random numbers with a high degree of entropy is important in the use of subsequent steps such as generating a value for SK-OT1.PP 101c-1 (where TRE 113 derives the one-time or ephemeral keys). Or, random numbers from random number generator 128 could be used with the creation of nonce values or challenge values for use with digital signatures. Random number generator 128 can be used to create random number 208b as depicted and described in connection with FIG. 2a below.

Random numbers from random number generator 128 could be used to create a symmetric ciphering key 127, and other possibilities exist as well. A seed 128b for random number generator 128 could comprise a plurality of data from within TRE 113 appended together in order to accumulate information entropy. To acquire the seed 128, TRE 113 could collect a plurality of transducer 113z measurements or states, radio 113z measurements, clock times or values for CPU 113b, RAM 113e or memory 109g states, etc. In exemplary embodiments, random number generator 128 can include a secure hash algorithm operating on the random number seed. In exemplary embodiments, random number generator 128 operates within TRE 113 as depicted in FIG. 1c, and in this manner the random numbers used for cryptographic operations such as PKI key generation for the secret or private key for PP one-time keys 101e can remain reasonably secure and not normally communicated outside TRE 113. Random number generator 128 could also be used to derive PKI keys for TRE in support of the operation of a firmware 106, where firmware 106 could conduct cryptographic operations for an application on device 102.

EEPROM 113c in TRE 113 can include a PP certificate 120, PP boot firmware 121, CU boot configuration 123, certificate authority public key 131, certificate authority public key parameters 104a', a primary platform private key 115a, and a symmetric key 127. PP private key 115a and symmetric key 127 can be recorded in a protected memory 125 in nonvolatile memory 113c, similar to TRE only accessible memory 109g, such that (i) only TRE 113 can read PP private key 115a using instructions in PP boot firmware 121 or firmware 106, and (ii) PP private key 115a may not be read by device 102 or transferred out of TRE 113 in exemplary embodiments. In exemplary embodiments, PP boot firmware 121 or firmware 106 can omit instructions that would allow PP private key 115a to be transferred to electrical pads 109a.

Note that PP private key 115a could be used for digital signature operations by TRE 113, and key 115a can be different than primary platform private key 101a used for downloading firmware 106. For other embodiments, key 115a could be the same as key 101a (such as embodiments where device 102 represents a more resource constrained system where separate keys for 101a and 115a may have higher costs than benefits). EEPROM 113c can also include PKI keys of at least SK-static.PP 101a and IDS static public keys 103p. By recording the keys in EEPROM 113c during manufacturing, the values can be fixed and TRE 113 can be reasonably assured about the security and integrity of these keys during operation.

Data within EEPROM 113c can comprise PP certificate 120, PP boot firmware 121, PP boot configuration 123, certificate authority public key 131, and certificate authority public key parameters 104'. Data can be written to EEPROM 113c by a TRE configuration unit during manufacturing of TRE 113. The data in EEPROM 113c for TRE 113 can be written into EEPROM 113c in TRE 113 and SOC 109 before SOC 109 is distributed to a manufacturer of device 102. PP certificate 120 can be written to EEPROM 113c by a TRE configuration unit (i) after the generation of PP private key 115a, and (ii) after the signature of the corresponding PP public key 115b by a certificate authority.

PP certificate 120 can include the PP identity PP-ID 109i, PP public key 115b (corresponding to PP private key 115a), certificate parameters 104', and a certificate authority digital signature 116. PP certificate 120 can be formatted according to the X.509 v3 specifications, among other possible formats, and stored as a plain text file, *.pem file, or *.crt file or similar file formats. PP certificate 120 can be used by TRE 113 and SOC 109 in order to (i) verify identity of TRE 113 to device 102 or a server such as server 103 (including verifying identity of TRE 113 to a network), or (ii) generate a digital signature for an internally generated or derived PKI key pair, such as PK-OT1.PP 101d-1. In exemplary embodiments, parameters 104' in CU certificate 120 can include an expiration time of PP certificate 120 longer than the expected operational lifetime of TRE 113, and in this manner PP certificate 120 can remain valid whenever SOC 109 is utilized. An exemplary expiration time of PP certificate 120 could be 25 years, although other possibilities exist as well.

PP boot firmware 121 in EEPROM 113c can provide machine executable code for processor 113b to initiate operations when electrical power is provided to TRE 113 and SOC 109 via the electrical pads 109a. Although not illustrated in FIG. 1c, processor 113b may also include a ROM memory with CPU 113b instructions for CPU 113b to fetch PP boot firmware 121 upon startup when power is provided to CPU 113b. In exemplary embodiments, PP boot firmware 121 could comprise a "Primary Boot Loader" as contemplated by the GSMA PP requirements document, and other possibilities exist as well. PP boot firmware 121 can include a set of cryptographic algorithms 141, described in the paragraph below, and memory control libraries 122. PP boot firmware 121 in EEPROM 113c could also include instructions for TRE 113 to load a firmware 116* recorded in non volatile memory 109g, where a plaintext firmware 116 can comprise a base image for the operation of primary platform 101.

Cryptographic algorithms 141 in memory 113c can comprise digital signature algorithms such as ECDSA or DSA, symmetric ciphering algorithms such as AES and TripleDES, key exchange algorithms, key pair generation algorithms, random number generators, secure hash algorithms such as SHA-2 or SHA-3, and asymmetric ciphering algorithms such as El gamal or RSA. Libraries in cryptographic algorithms 109q could be from standard open source libraries such as OpenSSL, crypto++, Bouncy Castle, or Mozilla libraries from Network Security Services, and other possibilities exist as well. Example calculations and functions from the use of cryptographic algorithms 141 are depicted and described in connection with FIG. 2b, FIG. 2c, and FIG. 3 below.

In exemplary embodiments, ciphertext firmware 116* could be decrypted with a symmetric key 127 recorded in EEPROM 113c. Authorized providers of firmware 116*, such as image maker 299 in FIG. 2a below or perhaps SOC manufacturer, could have access to a symmetric key 127 for TRE 113 with PP-ID 109i, and consequently only the authorized providers could properly encrypt firmware 116* using the symmetric key 127. Note that TRE 113 could use multiple different values for symmetric key 127, such that a first key 127 is used with a first firmware 116* (which could be provided by a TRE 113 manufacturer) and a second key 127 could be derived by TRE 113 for encrypting storing subsequently downloaded firmware 106 as a second firmware 116* in memory 109g. For some exemplary embodiments, firmware 116* could be transmitted to a device 102 over IP network 107 in the encrypted format. In exemplary embodiments, a symmetric key 127 for TRE 113 will be unique for each different SOC 109, and each symmetric key 127 can be uniquely associated with a PP-ID 109i. Thus, symmetric key 127 within TRE 113 can comprise a shared secret key for some embodiments. In some exemplary embodiments, firmware 116 is not required for TRE 113 to operate, and TRE 113 could operate using PP boot firmware 121.

Memory control libraries 122 could include software or firmware to manage and schedule the operation of TRE 113, such as machine code for (i) instructing processor 113b to write data to bus 109q for memory controller 113k when data is recorded in memory 109g, (ii) read data from bus 109d when data from SOC 109 is passed to TRE 113, (iii) reading PP private key from protected memory 125 or protected memory 113i when cryptographic algorithms 141 for TRE 113 need the private keys for cryptographic operations such as a key exchange or digital signatures. Memory control libraries 122 can include the software libraries and firmware for processor 113b to manage all input and output of TRE 113, including embodiments where TRE operates as a separate component connected to bus 102d and separate from SOC 109. Other possibilities exist as well for memory control libraries 122 to support the operation of TRE 113 and SOC 109 via program instructions provided to processor 113b without departing from the scope of the present disclosure. Note that memory control libraries 122 could also allow PP 101 to operate multiple different firmware 106 concurrently, such as for encapsulating and isolating data for each firmware 106, such that different firmware 106 could not read or write to data within TRE 113 that does not belong to the firmware 106.

Memory control libraries 122 can also include PP read instructions 151 and PP write instructions 152. PP read instructions 151 can provide machine executable code for processor 113b to read data from device 102 and/or SOC 109 using a data bus 109d or bus 109q. PP read instructions 151 can provide the read libraries for firmware 106 to call in order for firmware 106 (or firmware 116) to read data from physical memory within TRE 113. The data read from physical memory by PP read instruction 151 for a firmware 106 could be used with cryptographic algorithms 141 by TRE 113. In this manner, PP read instructions 151 could provide both (i) the logical software or firmware interface for TRE 113 to receive data from device 102 and (ii) isolate data for different firmware 106 operating in PP 101.

PP read instructions 151 could specify memory addresses or file locations in a file system for non-volatile memory 109s or memory 113s or memory 113e. For example, PP read instructions 151 could be used by PP 101 for data in memory 109s where device 102 can write data in order to be read by TRE 113. In an exemplary embodiment, (i) device 102 could write a file with an exemplary name "firmware-_update_version_1.5" (which could comprise a bound image 114 with ciphertext firmware 106*) to a specified location in device memory 109f. Then, after commands from PBL and PP agent 102x, (ii) PP read instructions 152 could instruct processor 113b to read the bound image 114 data and subsequently process the bound image 114 data with firmware decryption step 112.

EEPROM 113c in TRE 113 for SOC 109 can also include a PP boot configuration 123, a certificate authority public key 131, certificate authority public key parameters 104a', a PP private key 115a and a symmetric key 127. PP boot configuration 123 can provide values for the configuration or operation of TRE 113 when operating with the PP boot firmware 121, such as specifying (i) the frequency to operate a bus 109d for data input SOC 109 or device 102, (ii) the frequency to operate a processor 113b as well as processor configuration settings, (iii) a boot firmware version number, (iv) the memory capacity of memory 109g for TRE 113 or iNVM 113i, and (v) parameters specifying values for hardware within TRE 113 or radio/transducer 113z.

Certificate authority (CA) public key 131 can be utilized by TRE 113 to verify digital signatures received where the digital signature was generated and signed with a CA private key, such as a certificate for a server. CA public key parameters 104a' can specify the parameters for using the CA public key 131, where parameters 104a' can be a subset of the parameters 104 supported by cryptographic algorithms 141. Exemplary parameters 104 are depicted and described in connection with FIG. 4 below, such as specifying a key length, digital signature algorithm 141d and secure hash algorithm 141c to utilize, etc. Note that parameters 104a' for CA public key 131 and parameters 104a for a PP static public key of PK-static.PP 101b and/or PP private key 115a can be different.

Although a single CA public key 131, PP private key 115a, symmetric key 127, and PP certificate 120 is depicted in FIG. 1c, an EEPROM 113c or SOC 109 could record a plurality of each of these and associated elements. For example TRE 113 could record two different private keys 115a in EEPROM 113c, where a first private key 115a is used with asymmetric ciphering algorithms (such as El Gamal based encryption) and a second private key 115b is used with digital signature algorithms. Each of the first and second private keys could have a corresponding public key 115b, and consequently two different PP certificates 120 (each with a different public key 115b) could be recorded in an EEPROM 113c. CA public key 131 could also be used with asymmetric ciphering algorithms in 141, such that TRE 113 could encrypt data using the CA public key 131 and the certificate authority could subsequently decrypt the encrypted data using the CA private key corresponding to the CA public key 131.

In exemplary embodiments, initial PKI keys for SOC 109 may be recorded in EEPROM for TRE 113 as shown in FIG. 1c, and subsequent or updated versions of the keys can be recorded in memory 109g or memory 113s. Certificate Authority (CA) Public Keys 131 can also record a set of root certificates for TRE 113 and SOC 109 to use with verification of certificate authority digital signatures for certificates such as a server certificate 103t. Root certificates recorded in CA public keys 131 can comprise the list or a subset of the list of included root certificates from the Mozilla Foundation with Mozilla projects, where the aggregate list of community approved root certificates and associated parameters is in the widely distributed file certdata.txt from the Mozilla web site.

TRE 113 can include internal nonvolatile flash memory iNVM 113s, which can also be referred to as "nonvolatile memory 113s" or "memory 102s". Nonvolatile memory 102s can comprise a physical memory of NAND or NOR flash memory, or other nonvolatile memory types including a persistent memory or nonvolatile random access memory (NVRAM), such that data stored or written by TRE 113 to nonvolatile memory 113s continues to be stored or recorded when electrical power is removed from device 102 or SOC 109 or TRE 113. The data within non-volatile memory 113s can subsequently be read and other data re-written when power is restored to TRE 113. Some components of a plaintext firmware 106 for TRE 113 can be stored in memory 113s, such as cryptographic keys including private keys such a long-term secret symmetric key K for 5G networks or 4G networks, an identifier for device 102 with a 3GPP or ETSI wireless network such as an international subscriber identity (IMSI) or subscriber permanent identity (SUFI).

In exemplary embodiments, the wireless network could also record the key K in an authentication center or authentication credential repository and processing function (ARPF) in order to conduct an authenticated key agreement (AKA) key exchange between the wireless network and device 102, where device 102 records and operates with the key K and identity information in TRE 113. Other keys from a firmware 106 could be recorded in iNVM memory 113s as well including private keys such as a private key of the eUICC for creating signatures comprising a key SK.EUIC-C.ECDSA. Other possibilities exist as well for private keys described in the present disclosure to be stored or recorded in an internal nonvolatile memory iNVM 113s for a TRE 113 without departing from the scope of the present disclosure.

FIG. 2a

FIG. 2a is a simplified message flow diagram illustrating an exemplary system with exemplary data sent and received by a device with a primary platform, a server, and an image maker, in order to securely transfer a firmware for the primary platform to the device, in accordance with exemplary embodiments. System 200 can include a device 102, server 103, and an image maker 299. Device 102 and components in device 102 were depicted and described in connection with FIG. 1a, FIG. 1b, and FIG. 1c above. Server 103 was depicted and described in connection with FIG. 1a, and the components in server 103 were also described in connection with FIG. 1b above. Image maker 299 can comprise a collection of servers similar to server 103, where a primary function for operation of image maker 299 is to create firmware 106 for device 102 operating a primary platform 101 in a tamper resistant element (TRE) 113. Although a single device 102, server 103, and image maker 299 are depicted in FIG. 2a, a system 200 could include a plurality of each of the devices and servers shown. Device 102, server 103, and image maker 299 can communicate using an IP network 107, which could also comprise an Internet as depicted and described in connection with FIG. 1a above.

Device 102 can include a TRE 113, a primary boot loader (PBL) and PP agent 102x, and a secure session library 102y. Components within TRE 113, such as a primary platform 101 were depicted and described in connection with FIG. 1b and FIG. 1c above. PBL and PP agent 102x can comprise a secure driver or a device driver for TRE 113, such that device 102 can send and receive data with TRE 113 using a data bus operating within device 102 such as a bus 102d or a bus 109d. Secure session library 102y can comprise a firmware or software library for device 102 to securely communicate with external nodes from device 102 and establish secure sessions through a physical interface such as a radio for device 102. Secure session library 102y was depicted and described as a device program 102i operating in device 102 in FIG. 1b above, and other possibilities exist as well. As depicted in FIG. 2a, communication between secure session library 102y and PBL and PP agent 102x can be through a bus 102d and/or a bus 109d and an operating system 102h for device 102. In other words, data transfer between secure session library 102y and PBL and PP agent 102x can be managed by an operating system 102h for a device 102 using a data bus and/or internal memory such as RAM 102e. Other possibilities exist as well for a device to communicate data with a server and also internally communicate the data with a TRE 113 without departing from the scope of the present disclosure.

Server 103 can record and operate a server database 103d, where server database 103d was also depicted and described in FIG. 1a as a "primary platform database" 103d. Individual steps and components used in system 200 in FIG. 2a are also additionally depicted and described in subsequent FIGS. 2b, 2c, and 2d, etc.

Image maker 299 can comprise the source of a firmware 106 for a primary platform 101 operating in device 102. Although a single image maker 299 is depicted in FIG. 2a, a system 200 could include a plurality of different image makers 299, and a server 103 could select an image maker 299 based on data received from device 102. Many possibilities exist for the source and operation of a firmware 106 from an image maker 299 without departing from the scope of the present disclosure. A first image maker 299 could create a first firmware 106 which operates as an embedded SIM for M2M devices, such as specified in GSMA standards SGP.02. A second image maker 299 could create a second firmware 106 which operates as an embedded SIM for consumer devices, such as specified in GSMA standard SGP.22. The operation of primary platform 101 as an embedded SIM may also be referred to as an embedded "Smart Secure Platform" (eSSP). Or, the first image maker 299 could create both the first and second firmwares 106. A third image maker 299 could create a firmware 106 for the operation of primary platform 101 as an integrated "Smart Secure Platform" (iSSP). Further, image maker 299 could create firmware 106 for other secure functions of a primary platform 101 operating in a secure environment such as TRE 113 for device 102, including digital identification, electronic payments, authentication tokens, etc. without departing from the scope of the present disclosure. As discussed above, a plaintext firmware 106 can provide machine executable instructions and cryptographic data such as algorithms and keys for a TRE 113 to conduct secure cryptographic operations for device 102 using firmware 106.

At step 201, TRE 113 can be manufactured, where the exemplary components for a TRE 113 from FIG. 1c can be assembled and connected within a housing for TRE 113. Or, if TRE 113 comprises a separate processing core for a CPU or SOC 109, a step 201 can comprise manufacturing the TRE 113 in a secure environment. A step 201 can include TRE 113 securely recording or storing data depicted in FIG. 1a including at least (i) a server static public key PK.IDS1 103b (ii) a primary platform static private key SK-static.PP 101a, (iii) a set of cryptographic parameters 104, and (iv) a primary platform identity PP-ID 101i. For some embodiments, an TRE 113 could omit recording the data for IDS 103 in a step 201 and receive the data in an authenticated and secure manner at a later time, such as later receiving a certificate for PK.IDS1 103b and verifying the certificate (and/or chain of certificates) using CA public key 131. In general, TRE 113 receives a server public key 103b for IDS 103 before conducting a key exchange 110b step below.

A step 201 can include writing configuration and boot data to TRE 113 as depicted in FIG. 1c, including PP boot firmware 121, cryptographic algorithms 141, PP boot configuration 123, CA public key 131, PP private key 115a, PP certificate 120, etc. In addition, a collection of PP one-time keys 101e could be stored in TRE 113 at a step 201, if TRE 113 does not derive the PP one-time keys 101e at a later time, such as a step 208 below or for a message 209 below (where message 209 can include a PK.OT1.PP 101d-1). In exemplary embodiments, a primary boot loader (PBL) for PP 101 can comprise the collection of data and boot firmware written to TRE 113 in a step 201 during manufacturing. A primary boot loader can comprise the PP boot firmware 121. The configuration portion of a step 201 for TRE 113 could also be conducted after manufacturing of a TRE 113, but before distribution of a TRE 113 to end users or device 102 manufacturers.

At step 202, device 102 can be manufactured, where the exemplary components for a device 102 from FIG. 1b can be assembled and connected within a housing for device 102. In exemplary embodiments, a TRE 113 can be connected to other components in device 102 using a bus 102d. A step 202 can also comprise device 102 being configured, such as storing in nonvolatile memory 102s for device 101 an operating system 102h, device drivers 102g including PBL and PP agent 102x, a device identity 102k, a secure session library 102y, etc. A step 202 can include device 102 being distributed to end users such that device 102 can begin operating "in the field" or outside a manufacturing facility.

At step 203a, IDS server 103 can record a set of cryptographic parameters 104 and a server static private key SK.IDS1 103a, which can correspond to the server static public key PK.IDS1 103b recorded by TRE 113 in a step 201. As contemplated herein, when a node or computing device such as a server 103 or TRE 113 is described as storing or recording a private key, the node or computing device may also record the corresponding public key concurrently. Or, the computing device could optionally record only the private key and then subsequently generate the public key using cryptographic parameters 104 (which could include a base point G for multiplying the private key in order to obtain the public key). Thus, a computing device could utilize or store a public key whenever a private key is recorded.

Continuing at step 203a, for some embodiments, an IDS server 103 could also record a primary platform static public key PK-static.PP 101b and a primary platform identity PP-ID 101i in a database 103d in a step 203a. An IDS server 103 could receive the PK-static.PP 101b and PP-ID 101i from a manufacturer of TRE 113 after a step 201 above. Or, for other embodiments, an IDS server 103 could omit recording the data for PP 101 in a step 203a and receive the data in an authenticated and secure manner at a later time, such as later receiving a certificate for PK-static.PP 101b and verifying the certificate. For either embodiment, IDS server 103 receives a public key 101b for primary platform 101 before conducting a key exchange 110a step below.

At 203b, image maker 299 generates or processes firmware 106 for primary platform 101 operating in TRE 113. Image maker 299 could create a common firmware 106 for a collection of devices 102 with TRE 113, such as a firmware 106 comprising a Java applet or application for operating an embedded universal integrated circuit card (eUICC) or simply an integrated universal integrated circuit card (iUICC). Firmware 106 could also be machine executable code, such as byte code, for other platforms as well and may also support other applications such as firmware for running or operating a "Smart Secure Platform" within TRE 113. A step 203b can comprise compiling or assembling source code for firmware 106 into machine executable code. A first firmware 106 in a step 203b could be for a first processor type of CPU 113b and PP boot firmware 121 for a first class of device 102, and a second firmware 106 in a step 203b could be for a second processor type of CPU 113b and PP boot firmware 121 for second class of device 102, and other possibilities exist as well. In exemplary embodiments, image maker 299 can comprise a collection of servers, such that a first server processes the firmware 106 offline and encrypts the data of firmware 106 before storing the ciphertext firmware 106* in a second server for image maker 299, where the second server is connected to IP network 107 with IDS server 103.

After a step 203b, image maker 299 can conduct a step 203c to derive a symmetric ciphering key which can comprise a firmware key 106a. Firmware key 106a could be derived using a random number generator equivalent to a random number generator 128 from FIG. 1c and a secure hash algorithm. For some embodiments where firmware key 106a could comprise an SSD container as contemplated by the GSMA PP Requirements document, a firmware key 106a could comprise at least one public key associated with image maker 299 instead of or in addition to a symmetric ciphering key. In other words, a firmware key 106a as contemplated by the present disclosure could comprise keys more than a symmetric ciphering key.

At step 203c, image maker can conduct an encryption of firmware 106 using the firmware key 106a, where encryption of a plaintext firmware 106 into a ciphertext firmware 106* is depicted and described in connection with FIG. 2b below. The firmware 106 for a step 203c can comprise the firmware 106 generated in a step 203b above. For embodiments where the firmware key 106a includes at least one public key associated with or for the image maker 299, the at least one public key for the image maker in the firmware key 106a could be used in a subsequent key exchange in order to derive a symmetric ciphering key, where the derived symmetric ciphering key using the public key for image maker 299 could be used to encrypt plaintext firmware 106 into ciphertext firmware 106*. In other embodiments, the firmware key 106a can comprise a symmetric ciphering key.

The operation and function of an encryption step 203c with a firmware key 106a is depicted and described in connection with FIG. 2c below. The output or result of an encryption step 203c can comprise a ciphertext firmware 106*. Image maker 299 can transfer ciphertext firmware 106* to a server that communicates with IDS server 103 via IP network 107, such that the ciphertext firmware 106* is available for transfer to server 103. Note that ciphertext firmware 106* (and other ciphertext data as contemplated herein) may also include non-ciphertext metadata such as a file name, file size, operating system for the file, file processing date, a key identifier or identity for the corresponding decryption key comprising firmware key 106*a*, etc.

For system 200, server 103 and image maker 299 may establish a secure session 203*d*, which could comprise establishing a secure communications link between the two servers using protocols such as TLS, IPSec, a virtual private network (VPN), a secure shell (SSH), or similar networking, transport, or application layer technologies in order to establish secure communications between image maker 299 and server 103. Secure session 203*d* can utilize certificates for the two servers in order to provide mutual authentication and mutual key derivation for a symmetric encryption key in secure session 203*d*. As depicted in FIG. 2*a*, the certificates could comprise a first certificate 103*t* for server 103 and a second certificate 299*t* for image maker 299. Secure session 203*d* can also be conducted over private IP network 107. Other possibilities exist as well for establishing a secure session 203*d* between server 103 and image maker 299 without departing from the scope of the present disclosure. Although not depicted in FIG. 2*a*, firewalls between server 103 and image maker 299 could also be utilized in order to establish or conduct secure session 203*d*. After step 203*a*, IDS server 103 can begin listening for incoming messages from a device 102 using a physical network interface that provides connectivity to the IP network 107 and server 103 can use a specific port number such as TCP port 443 to listen for incoming secure session 108 from a device 102.

At step 204, device 102 can power up or boot, load PBL and PP agent 102*x*, and provide power to TRE 113. Device 102 can then be configured to read and write data with TRE 113 using PBL and PP agent 102*x*. At step 204, TRE 113 can boot and use boot firmware 121 and boot configuration 123 to begin operation at least as a primary boot loader. In addition, if an existing primary platform firmware 116* is recorded in memory such as memory 109*s* or iNVM 113*s*, then primary platform 101 could, after boot, decrypt with key 127, load, and operate with firmware 116. In exemplary embodiments, firmware 116 could comprise a host for operating virtual machines, and firmware 116 could also be written to iNVM 113*s* during a manufacturing step 201 for TRE 113.

After a step 204, where device 102 and TRE 113 boot and begin operating in a step 204, PBL and PP agent 102*x* can submit a query 205*a* to TRE 113. Query 205*a* could be transmitted through a bus 109*d* as depicted in FIG. 1*c*. Query 205*a* could request a status of firmware operating in TRE 113, as well as other information such as an identity for primary platform 101 of PP-ID 101*i*, versions of software or firmware supported, including an operating system, PBL identity or version, boot firmware 121 versions, free memory capability, any attached transducers or radios for TRE 113 such as an NFC radio 113*z*. Other configuration information for TRE 113 could be requested in a query 205*a*. Query 205*a* could also be referred to as a request or probe for TRE 113. The source of a query 205*a* could be device 102, or another server that device 102 connects with, or an instruction received from IDS server 103. In general, a query 205*a* can be used to obtain information securely from a primary platform 101 regarding the configuration of primary platform 101.

Primary platform 101 could receive query 205*a* and process the data or request. Primary platform 101 could respond with a message or response 205*b* which could comprise a response. As depicted in FIG. 2*a*, response 205*b* can include the identity for primary platform 101 of PP-ID 101*i*, a selected set of cryptographic parameters 104*a*, and a firmware status 205*c*. The selected set of cryptographic parameters 104*a* could comprise a subset of the cryptographic parameters 104, such as an exemplary row of data in FIG. 4 below. A query 205*a* could also request or specify the selected set of cryptographic parameters 104*a*, or include a list of options for values in FIG. 4 and PP 101 could select the options supported and include parameters 104*a* in response 205*c*. Firmware status 205*c* can comprise information about firmware within PP 101, such as a firmware version, a firmware installation date, a firmware size, an identity for a firmware key 106*a* associated with the firmware, a list of all installed firmware 106 stored by PP 101, a list of free or available memory, a log file or error log regarding the installation or operation of a firmware 106, and other possibilities exist as well.

In addition, a firmware status 205*c* could include information about a host environment operated by TRE 113 such as a virtual machine version or technology, an identity for a processor 113*b* of TRE 113 which could comprise a CPUID, a host platform version equivalent to Virtualbox, VMware, etc. In general, a firmware status 205*c* and response 205*b* can include information for an IDS server 103 to utilize for selecting a firmware 106 for transfer to PP 101. Message 205*b* can also include an identity for IDS server 103, such as a domain name or IP address, which could be recorded in TRE 113 before a step 205*a*.

Device 102 and server 103 may establish a secure session 108, which could comprise establishing a secure communications link between the two nodes using protocols such as TLS, IPSec, a virtual private network (VPN), a secure shell (SSH), or similar networking, transport, or application layer technologies in order to establish secure communications between device 102 and server 103. Secure session 108 can utilize certificates for the two nodes in order to provide mutual authentication and mutual key derivation for a symmetric encryption key for secure session 108. As depicted in FIG. 2*a*, the certificates could comprise a first certificate 103*t* for server 103 and a second certificate 102*t* for device 102. Device 102 and secure session library 102*y* could use a domain name for IDS server 103 received from TRE 113 in a response 205*b*.

In message 205*d*, device 102 could use secure session 108 to send data regarding primary platform 101, where the data regarding primary platform 101 can comprise the information received by a device driver 102*g* such as PBL and PP agent 102*x* in response 205*c*. Message 205*d* can include the identity of primary platform 101 of PP-ID 101*i*, the selected set of cryptographic parameters 104*a*, and also the firmware status 205*c*. For some exemplary embodiments, message 205*d* could also include the certificate for PP 101 of PP certificate 120, where PP certificate 120 can include the identity of primary platform of PP-ID 101*i* as depicted in FIG. 1*b*. Other summary or configuration data for PP 101 could be send in a message 205*d* as well, such as a host platform version operated by processor 113*b* in TRE 113 (e.g. a host for a virtual machine like Virtualbox), etc. Note that processor 113*b* in TRE 113 could be a host operating a Xinu embedded operating system, and other possibilities exist as well.

In step 206*a*, server 103 can receive message 205*d* and process the data. Server can use data within message 205*d* to query or select data to determine an updated or available firmware 106 can be installed on primary platform 101. Server 103 could use PP-ID 101*i* and firmware status 205*c* to determine if a compatible firmware 106 is available. As one example, server 103 could evaluate if (X) a version number for an existing firmware 116 running or stored in TRE 113 has (Y) an updated firmware version available, such as with security patches, new features, support for new protocol versions, etc. Other possibilities exist as well for a server 103 to evaluate or determine that a firmware 106 is available for a device 102 with a PP 101 and PP-ID 101i from a message 205d without departing from the scope of the present disclosure. As one example, PP 101 may boot without a firmware 106 and firmware 116, and message 205d could be a signal or request to download firmware 106 for PP 101. A step 206a may also conclude with IDS server 103 determining that an image maker 299 may record a firmware 106 for device 102 with PP 101.

At step 206b, server 103 can use parameters 104a and PP-ID 101i to select a set of IDS static PKI keys, where the selected PKI keys can comprise the secret key SK.IDS1 103a and the corresponding public key PK.IDS1 103b as depicted and described in connection with FIG. 1a. In other words, IDS server 103 could record a plurality of these keys (such as different keys supporting different sets of cryptographic parameters 104a), and IDS server 103 can select the appropriate PKI keys using parameters 104a. Further, IDS server 103 could have a plurality of different keys SKIDS1 103a for use with different PP 101, and consequently select the correct SK.IDS1 103a based on the identity PP-ID 101i. In other words, IDS server 103 could use a first SK.IDS1 103a with a first set of PP 101 and a second SK.IDS1 103a with a second set of PP 101. IDS server 103 could also calculate a secure hash value for the selected, corresponding public key PK.IDS1 103b in a step 206b.

IDS server 103 can then send image maker 299 a message 206c via secure session 203d. Message 206c can include an identity of PP 101 of PP-ID 101i, related information regarding a firmware 106 such as a version number received in firmware status 205c, and message 206c can comprise a query or request for firmware 106. At step 206d, image maker 299 can receive message 206c via secure session 203d and process the message. Image maker 299 can use information or data in message 206c in order to select a ciphertext firmware 106* and a corresponding firmware key 106a used to encrypt the plaintext firmware 106. Image maker 299 could use an identity of primary platform PP-ID 101i to select the ciphertext firmware 106* and the corresponding firmware key 106a. Or, image maker 299 could use other data in message 206c to select ciphertext firmware 106* and firmware key 106a, such as a version of TRE 113, a version of primary platform boot firmware 121, a PP boot firmware configuration version for PP boot configuration 123, cryptographic parameter 104, or related data as well for TRE 113. In some embodiments, an image maker 299 could conduct a step 203c after receiving a message 206c. The collection of ciphertext firmware 106* and firmware key 106a in a step 206d and a subsequent message 206e can comprise an unbound image for TRE 113 and PP 101 and an unbound image for TRE 113 and PP 101 can comprise an image for multiple different TRE 113 in different devices 102.

Image maker 299 can then send IDS server 103 a message 206e through secure session 203d, where message 206e includes the unbound image comprising at least a plaintext firmware key 106a and the ciphertext firmware 106*. IDS server 103 can receive message 206e with the unbound image and securely record or store the plaintext firmware key 106a and the ciphertext firmware 106*, while also using PP-ID 101i to record that the unbound image is for device 102 with TRE 113 and PP 101. Although not depicted in FIG. 2a, IDS server 103 could also conduct a validation check for the unbound image received in message 206e, such as verifying the plaintext firmware key 106a properly decrypts the ciphertext firmware 106* and that a resulting, calculated MAC code from using a MAC key from firmware key 106a matches or is equal to the received MAC code for ciphertext firmware 106*. In this manner, and for other descriptions of decrypting firmware or a ciphertext as contemplated herein, the decryption can include using a MAC key as part of a ciphering key in order to (i) calculate a MAC code for the ciphertext, and (ii) compare the calculated MAC code with a received MAC code for the ciphertext in order to confirm the integrity of the ciphertext (e.g. no bit errors or alteration of the ciphertext).

IDS server 103 can then calculate a secure hash over server static public key comprising PK.IDS1 103b, where the server static public key PP.IDS1 103b for PP 101 was selected in a step 206b above. The secure hash algorithm could be specified in a set of selected cryptographic parameters 104a, such as the exemplary secure hash algorithms in FIG. 4 below. An exemplary secure hash algorithm could comprise an SHA-2 or SHA-3 hash with an exemplary number of bits of 256, although other possibilities exist as well. The output of a secure hash over PK.IDS1 103b can comprise the value H(PK.IDS1) 207a.

IDS server 103 can then send device 102 at least the secure hash value 207a via secure session 108 as a message 207b. Note that the secure hash value 207a is included as an encrypted datagram within secure session 108. Although the use of a secure hash value 207a instead of the plaintext value of PK.IDS1 103b is depicted in FIG. 2a for message 207b, in other embodiments a server 103 could send the plaintext value of PK.IDS1 103b in a message 207b instead of the hash value. For these other embodiments, PK.IDS1 103b may not be previously recorded in TRE 113 and for these embodiments then (i) PK.IDS1 103b could be included in a certificate, where the digital signature for the certificate could be verified by PP 101 using a CA public key 131, and (ii) message 207b could include a certificate chain of intermediate certificates between the certificate with PK.IDS1 103b and CA public key 131 stored with PP 101.

Device 102 could receive message 207b with the secure hash of H(PK.IDS1) 207a using the secure session library 102y. Device 102 can then send TRE 113 the secure hash of H(PK.IDS1) 207a in a message 207c, where message 207c is sent using a device driver such as PBL and PP agent 102x. In step 208, PP 101 operating in TRE 113 can receive message 207c with the secure hash of H(PK.IDS1) 207a and process the data. In a step 208, PP 101 can conduct the secure hash algorithm specified by cryptographic parameters 104a over recorded public PKI keys for a plurality of IDS server static public keys 103p in order to find a matching IDS server static public key 103b. In other words, PP 101 can select the IDS server static public key 103b used by server 103 based on the matching and/or equal secure hash value received in a message 207c. In this manner, PP 101 can identify and select the server static public key 103b used by server 103 since a calculated secure hash value over keys in the set of public keys 103p would match the received value of H(PK.IDS1) 207a. In this manner, the value of PK.IDS1 103b does not need to be transmitted or received by TRE 113 and the key can be identified by using H(PK.IDS1) 207a. A benefit of using H(PK.IDS1) 207a instead of PK.IDS1 103b is that device 102 could include insecure components or processes.

For other exemplary embodiments of a step 208 and a message 207c, the message 207c could include the plaintext value of PK.IDS1 103b in the form of a certificate with a digital signature from a certificate authority (and likewise message 207b could include PK.IDS1 103b instead of H(PK.IDS1)). For these embodiments, a step 208 could comprise verifying the digital signature for the certificate with PK.IDS1 103b using certificate authority public keys 131 and a set of cryptographic parameters 104 within the certificate.

A step 208 can also include PP 101 selecting a one-time PKI key pair from PP one-time PKI keys 101e, where the selected PKI key pair are compatible with the selected set of cryptographic parameters 104a (such as using the named ECC curve in parameters 104a). For some embodiments, PP 101 could derive a private key using a random number generator 128 and the selected set of cryptographic parameters 104a in order to obtain a PP one-time private key of SK-OT1.PP 101c-1 and the corresponding one-time public key of PK-OT1.PP 101d-1. In either case (deriving the PKI keys or selecting the PKI keys from a set of PP one-time PKI keys 101e), at the conclusion of a step 208, PP 101 can store one-time PKI keys for subsequent operations, where the one-time PKI keys comprise at least of SK-OT1.PP 101c-1 and the corresponding one-time public key of PK-OT1.PP 101d-1. Note that if a previous pair of one-time PKI keys in keys 101e had already been used for a previous download of ciphertext firmware 106*, then the previous pair of one-time PKI keys could be deprecated, and PP 101 could select a subsequent pair of one-time PKI keys such as SK-OT2.PP 101c-2 with PK-OT2.PP 101d-2, etc.

Continuing in a step 208, PP 101 can then calculate a secure hash over PP static public key comprising PK-static.PP 101b. The secure hash algorithm could be specified in a set of selected cryptographic parameters 104a, such as the exemplary secure hash algorithms in FIG. 4 below. An exemplary secure hash algorithm could comprise an SHA-2 or SHA-3 hash with an exemplary number of bits of 256, although other possibilities exist as well. The output of a secure hash over PK-static.PP 101b can comprise the value H(PK-static.PP) 208a. For some exemplary embodiments, a secure hash value over PK-static.PP 101b could be omitted, and the value of PK-static.PP 101b could be used for subsequent messages in FIG. 2a instead of the secure hash value H(PK-static.PP) 208a. A step 208 can also include PP 101 using a hardware random number generator 128 in order to generate or derive a random number 208b.

PP 101 can then send PBL and PP agent 102x in device 102 a message 209, where message 209 includes at least (i) the value H(PK-static.PP) 208a and (ii) the primary platform one-time public key of PP-OT1.PP 101d-1 from a step 208 and (iii) the random number 208b. In exemplary embodiments in order to enhance security, PP 101 does not send information for PK-static.PP 101b until after a step 208, where PP 101 can either (i) verify that H(PK.IDS1) 207a matches a hash value for a recorded IDS public key in keys 103p or (ii) verify that a received PK.IDS1 103b with a certificate is properly signed and verified with a CA public key 131. For other embodiments that require a lower level of security, then PP 101 could send information for PK-static.PP 101b at an earlier time than step 208, such as sending either (i) the value H(PK-static.PP) 208a with a message 205b or (ii) a certificate that includes PK-static.PP 101b with a message 205b. Device 102 then using secure session library 102y can send IDS server 103 a message 210 over secure session 108, where message 210 includes the secure hash value H(PK-static.PP) 208a and the primary platform one-time public key of PP-OT1.PP 101d-1 and the random number 208b.

Server 103 can receive message 210 and process the message. For a step 211, where message 210 includes value H(PK-static.PP) 208a, server 103 can calculate a secure hash algorithm over primary platform static public keys PK-static.PP 101b recorded in a database 103d in order to find a matching primary platform static public key PK-static.PP 101b. Note that the calculation of hash values over public keys in a database 103d could be performed one time or periodically as new public keys are inserted into database 103d, instead of being calculated each time. For a step 211, where message 210 includes a certificate for primary platform public key PK-static.PP 101b, server 103 can verify a digital signature for the key PK-static.PP 101b from a certificate authority. As contemplated herein, the term "certificate" can include both a public key and a digital signature for the public key from a certificate authority, such as with an X-509 v3 certificate. In addition for a step 211, if server 103 does not record or store a value for PK-static.PP 101b after receipt of a message 210, then server 103 could query a TRE manufacturer using identity PP-ID 101i (or H(PK-static.PP) 208a) in order to obtain the PP public key PK-static.PP 101b. At the conclusion of a step 211, server 103 can select and store the value of PK-static.PP 101b for PP 101, where PP 101 can operate with an identity PP-ID 101i.

At step 212, server 103 can conduct a key validation step for the primary platform one-time public key of PP-OT1.PP 101d-1. Server 103 can verify that PK-OT1.PP 101d-1 is not reused and has not been received before by server 103, thereby increasing assurance that subsequent key exchanges such as key exchange 110a is resistant to replay attacks. In addition, for a step 212, server 103 can conduct public key validation step to ensure that received primary platform one-time public key of PP-OT1.PP 101d-1 is properly formatted and does not contain weak or compromising cryptographic data. For example, a step 212 could comprise server 103 performing the steps for an ECC Full Public-Key Validation Routine in section 5.6.2.3.2 of FIPS publication SP 800-56A (revision 2). Alternatively, step 212 can comprise server 103 performing the steps ECC Partial Public-Key Validation Routine in section 5.6.2.3.3 of the same FIPS publication. Other example steps within a public key validation step 212 can comprise (i) verifying the public key is not at the "point of infinity", and (ii) verifying the coordinates of the point for the public key are in the range [0, p−1], where p is the prime defining the finite field. Other possibilities exist as well for evaluating and validating a received public key is cryptographically secure in a public key validation step 212, without departing from the scope of the present disclosure. As contemplated in the present disclosure, a server 103 or PP 101 can conduct a public key validation step such as a step 212 each time a public key is received.

At step 103e', server 101 can generate or derive IDS one-time PKI keys 103e, where IDS one-time PKI keys 103e are also depicted and described in connection with FIG. 1a above. Although IDS one-time PKI keys 103e are described as "one-time" in exemplary embodiments the keys 103e for a step 103e' could be one-time for a specific device 102 and could potentially be re-used with another device 103. In other words, as a minimum for exemplary embodiments, the IDS one-time PKI keys 103e would be one-time keys for a specific device 102. The one-time PKI keys 103e can also be referred to as "ephemeral" or "protocol" keys. A server 103 can use a random number generator and a key pair generation algorithm with the selected set of cryptographic parameters 104a in order to generate and store a server one-time secret key of SK-OT1.IDS1 103c-1 and the corresponding one-time public key of PK-OT1.IDS1 103*d*-1 for use with PP 101 at the conclusion of a step 103*e'*.

IDS server 103 can then conduct a key exchange step 110*a*. Details and exemplary data for a key exchange step 110*a* by server 103 are depicted and described in connection with FIG. 2*b* below. In summary, IDS server 103 can input at least (i) PP static public key PK-static.PP 101*b*, (ii) PP one-time public key PK-OT1.PP 101*d*-1, (iii) server static private (or secret) key SK-IDS1 103*a*, (iv) and server one-time private key SK-OT1.IDS1 103*c*-1, and (v) cryptographic parameters 104*a* into a key exchange 110*a* in order to generate, calculate, or derive at least a mutually derived symmetric ciphering key 218*a*.

In exemplary embodiments, a key exchange step 110*a* could also derive a MAC key 218*b*. Server 103 could conduct an ECC point addition operation over (i) PK-static.PP 101*b*, (ii) PK-OT1.PP 101*d*-1 and input the resulting point into an ECDH key exchange algorithm 215 (shown in FIG. 2*b* below). Server 103 could calculate a sum over (iii) SK-IDS1 103*b* and (iv) SK-OT1.IDS1 103*c*-1 and then calculate the modulus of the sum using the value n, where the value n can be defined or determined based upon the selected set of cryptographic parameters 104*a*. The modulus can then also be input into the ECDH key exchange algorithm as well in order to derive a mutually shared secret. The shared secret can be processed with a key derivation function (KDF) in order to obtain the mutually derived symmetric ciphering key 218*a*. Note that additional steps 213-217 can be included in a key exchange step 110*a*, and these additional steps 213-217 are depicted and described in connection with FIG. 2*b* below.

After deriving a mutually shared symmetric ciphering key 218*a* in a key exchange step 110*a*, server 103 can conduct an encryption step 111 of the plaintext firmware key 106*a* and the random number 208*b*, where random number 208*b* was received in a message 210. Encryption step 111 can also be referred to as a key encryption step, or the encryption of a SSD keys container using session keys. In other words, a mutually derived symmetric ciphering key 218*a* can comprise a session key as contemplated by the GSMA PP Requirements document. The plaintext firmware key 106*a* can be received by server 103 from an image maker 299 in a message 206*e* above. An encryption step 111 of the plaintext firmware key 106*a* in order to process or output a ciphertext firmware key 106*a** is depicted and described in connection with FIG. 2*b* below. As depicted in FIG. 2*a*, the ciphertext firmware key 106*a** can also include the random number 208*b* in addition to the encrypted firmware key 106*a*. The collection of a ciphertext firmware key 106*a** and ciphertext firmware 106* can be referred to as a bound image 114 or a "bound package".

The term "bound" can mean that the resulting data in the image or package is specifically written or structured for PP 101 on device 102 (holding at least private key SK-static.PP 101*a*), and another PP 101 on a different device 102 (or any other node on the Internet 107) would not be feasibly able to read the bound image 114. Note that IDS one-time public key PK-OT1.IDS1 101*d*-1 can also be included in a bound image 114 or bound package. An unbound image can be used with an of a number of different devices 102 with PP 101 before the key exchange step 110*a* and encryption step 111 over the firmware key 106*a*. In addition, although not depicted in FIG. 2*b* below, a symmetric ciphering key 218*a* could also be used directly by IDS sever 103 to encrypt a plaintext firmware 106 to create a ciphertext firmware 106*, and for these embodiments the use of a separate firmware key 106*a* and ciphertext firmware key 106*a** could be omitted. For these embodiments that omit the use of a separate firmware key 106*a*, a bound image 114 can comprise the ciphertext firmware 106* and the IDS one-time public key PK-OT1.IDS1 101*d*-1. Some plaintext metadata (including a file name, date, version, MAC code, initialization vector, etc.) can be included in a bound image 114.

After an encryption step 111 to encrypt a portion of bound image 114 (either to create a ciphertext firmware key 106*a** or to directly encrypt firmware 106 into ciphertext firmware 106*), IDS server 103 can send device 102 a message 219 through secure session 108. Message 219 can include the IDS one-time public key PK-OT1.IDS1 101*d*-1 used with a key exchange 110*a* and a ciphertext firmware key 106*a** from an encryption step 111, as well as ciphertext firmware 106*. The depiction of "{ }" for message 219 in FIG. 2*a* depicts that (i) ciphertext firmware key 106* can be encrypted using the mutually derived symmetric ciphering key 218*a*, and (ii) the mutually derived symmetric ciphering key 218*a* is not normally transmitted in message 219 or from IDS server 103 to device 102. Note that secure session 108 can provide an additional layer of encryption of both ciphertext firmware key 106*a** and ciphertext firmware 106* though the authenticated and encrypted secure session 108. Also note that the data within the secure channel is transmitted as ciphertext or encrypted data, since components in device 102 other than TRE 113 may be insecure, and thus software operating within an operating system 102*h* for device 102 could normally read data from a secure session 108 after the first level of decryption from secure session 108. In this manner, only a TRE 113 with a PP 101 could read the plaintext of a ciphertext firmware key 106*a** and ciphertext firmware 106*.

Device 102 using secure session library 102*y* can receive message 210 and remove the first layer of encryption from secure session 108 using standard libraries such as for TLS, DTLS, IPsec, or similar protocols for establishing a secure session. The resulting "plaintext" after removing the first level of encryption can comprise ciphertext firmware key 106*a** and ciphertext firmware 106*, as well as a plaintext value for server one-time public key PK-OT1.IDS1 103*d*-1. In other words, device 102 can receive and read the bound image 114. Device 102 can then conduct a step 220 to write bound image 114 to device nonvolatile memory 102*s*, which is also depicted and described in connection with FIG. 1*c* above. Recording bound image 114 in device nonvolatile memory 102*s* can remain secure, since only TRE 113 with PP 101 could feasibly decrypt the bound image 114. As depicted in FIG. 2*a* and also FIG. 1*c* above, bound image 114 received in a message 219 can comprise server one-time public key PK-OT1.IDS1 103*d*-1, ciphertext firmware key 106*a**, and ciphertext firmware 106*.

Device 102 can then use PBL and PP agent 102*x* to write the data for bound image 114 from memory 102*s* to TRE 113 and PP 101 via a message 221. As contemplate herein, a message such as message 221 could comprise separate parts, datagrams, blocks, or segments of data transmitted, and the collection of separate parts, datagrams, blocks, or segments can comprise the message. As depicted in FIG. 2*a*, a message 221 can comprise at least the server one-time public key PK-OT1.IDS1 103*d*-1, ciphertext firmware key 106*a**, and ciphertext firmware 106*. PBL and PP agent 102*x* can operate in a secure manner, such as within a trusted execution environment (TEE) operating within device 102, and PBL and PP agent 102*x* can use a bus 109*d* in order to communicate with TRE 113. TRE 113 and PP 101 can receive the message 221 and conduct a series of steps in order to process the message 221.

At step 222, PP 101 can conduct a key validation step on server one-time public key PK-OT1.IDS1 103d-1. The key validation step 222 can be equivalent to a key validation step 212 depicted and described above for a server 103 with PK-OT1.PP 101d-1. Key validation step 222 can verify that PK-OT1.IDS1 103d-1 is a point on the ECC curve specified by cryptographic parameters 104 and also that the point is not the "point at infinity". Key validation step 222 by PP 101 can verify that PK-OT1.IDS1 103d-1 is not reused and has not been received before by PP 101, thereby increasing assurance that subsequent key exchanges such as key exchange 110b is resistant to replay attacks. For example, a step 222 could comprise PP 101 performing the steps for an ECC Full Public-Key Validation Routine in section 5.6.2.3.2 of FIPS publication SP 800-56A (revision 2). Alternatively, step 222 can comprise PP 101 performing the steps ECC Partial Public-Key Validation Routine in section 5.6.2.3.3 of the same FIPS publication. Other possibilities exist as well for evaluating and validating a received public key is cryptographically secure in a public key validation step 222, without departing from the scope of the present disclosure. Upon conclusion of a key validation step 222, PP 101 can accept and store server one-time public key PK-OT1.IDS1 103d-1 for use in subsequent steps.

PP 101 can then conduct a key exchange step 110b. Details and exemplary data for a key exchange step 110b by PP 101 are depicted and described in connection with FIG. 2c below. In summary, PP 101 can input at least (i) server static public key PK-IDS1 103b, (ii) server one-time public key PK-OT1.IDS1 103d-1, (iii) PP static private key SK-static.PP 101a, (iv) PP one-time private key SK-OT1.PP 101c-1, and (v) cryptographic parameters 104a into a key exchange 110b in order to generate, calculate, or derive at least a mutually derived symmetric ciphering key 218a. In exemplary embodiments, a key exchange step 110b could also derive a MAC key 218b. PP 101 could conduct an ECC point addition operation over (i) PK-IDS1 103b, (ii) PK-OT1.IDS1 103d-1 and input the resulting point into an ECDH key exchange algorithm 215 (shown in FIG. 2c below). PP 101 could calculate a sum over (iii) SK-static.PP 101a, and (iv) SK-OT1.PP 101c-1 and then calculate the modulus of the sum using the value n, where the value n can be defined or determined based upon the selected set of cryptographic parameters 104a. The modulus can then also be input into the ECDH key exchange algorithm as well in order to derive a mutually shared secret. The shared secret can be processed with a key derivation function (KDF) in order to obtain the mutually derived symmetric ciphering key 218a. Note that additional steps 223, 224, 215, 216, and 217 can be included in a key exchange step 110b, and these additional steps 223, 224, 215, 216, and 217 are depicted and described in connection with FIG. 2c below.

PP 101 can then conduct a decryption step 112a of ciphertext firmware key 106a* in order to convert ciphertext firmware key 106a* into a plaintext firmware key 106a and also the plaintext random number 208b. A decryption step 112a for PP 101 is also depicted and described in connection with FIG. 2c below. For a decryption step 112a, PP 101 can use at least the mutually derived symmetric ciphering key 218a from a key exchange step 110b above in order to decrypt the (i) ciphertext firmware key 106a* into a plaintext firmware key 106a and (ii) the encrypted random number 208b into a plaintext random number 208b. PP 101 can verify that the decrypted random number 208b from a step 112a equals the derived random number 208b from a step 208 above, in order to confirm that server 103 has received and used the random number 208b in the creation of ciphertext firmware key 106a*

PP 101 can then store the plaintext firmware key 106a for use in a decryption step 112b below over ciphertext firmware 106*. For embodiments where ciphertext firmware 106* is encrypted by server 103 using the mutually derived symmetric ciphering key 218a, then a decryption step 112a and the use of a separate firmware key 106a in a bound image 114 could be omitted. In other words, for embodiments where ciphertext firmware 106* is encrypted by server 103 using the mutually derived symmetric ciphering key 218a, then firmware key 106a could comprise the mutually derived symmetric ciphering key 218a, and the transmission of a ciphertext firmware key 106a* in message 219 and message 221 could be omitted.

PP 101 can then conduct a decryption step 112b of ciphertext firmware 106* using the plaintext firmware key 106a, where the plaintext firmware key 106a could be read and stored by PP 101 in a step 112a above. A decryption step 112b can convert the ciphertext firmware 106* into a plaintext firmware 106, which can subsequently be read, stored, and loaded into memory of PP 101. A decryption step 112b for PP 101 is also depicted and described in connection with FIG. 2c below. Note that plaintext firmware key 106a can include both a symmetric ciphering key and a MAC key. The symmetric ciphering key can be used for decryption and the MAC key can be used to verify data integrity (via comparing a received MAC code with a calculated MAC code), such as detecting bit errors or flipped bits in the received ciphertext firmware 106*. A MAC code and an initialization vector could be included in plaintext metadata received along with ciphertext firmware 106*. In some exemplary embodiments, the use of a MAC key within plaintext firmware key 106a could be omitted, and algorithms such as AES-SIV (e.g. with synthetic initialization vectors) could be used for detecting data integrity.

PP 101 can then conduct a step 225 in order to load plaintext firmware 106 and begin operating with the firmware 106. PP 101 could operate with configuration rules or logic that may be included in any of plaintext firmware 106, metadata for plaintext firmware 106, or PP boot configuration 123 in order to specify parameters or values for loading and operating with firmware 106. Firmware 106 could be associated with rules for PP 101 to operate firmware 106 as an image or "virtual machine" in PP 101 (where PP 101 using boot firmware 121 can operate as the host), including, but not limited to, a maximum amount of RAM 113e memory allocated, a maximum amount of nonvolatile memory iNVM 113s allocated, a maximum lifetime for firmware 106, a maximum number of supported or concurrent different firmware 106 that a PP 101 could operate at the same time, and other similar parameters as well.

In exemplary embodiments a step 225 can comprise PP 101 storing plaintext firmware 225 in RAM memory 101e, as depicted in FIG. 1c above. Note that RANI memory 101e could comprise a nonvolatile RAM memory or a persistent memory as well. A step 225 could also comprise a check or verification that firmware 106 properly loads and operates within PP 101, including with any parameters or security specifications for the firmware 106 or PP 101. Upon successful verification that firmware 106 loads and operates within PP 101, PP 101 could then deprecate or delete the PP one-time PKI keys 101e as well as deprecate the IDS server 103 one-time public key PK-OT1.IDS1 103d-1. In exemplary embodiments, PP 101 continues to record or store PK-OT1.IDS1 103d-1 in iNVM 113s after a step 225 in order for PP 101 to conduct a subsequent key validation step 222 on PK-OT1.IDS1 103d-1, in order to determine that PK-OT1.IDS1 103d-1 is not used again at a later time. At the conclusion of a step 225, PP 101 can begin operating with the firmware 106.

Note that firmware 106 operating in PP 101 can support applications running as device programs 102i in device 102, such as the exemplary applications of mobile payments, identification and authentication of device 102, secure key generation and storage for device 102, and other applications for device 102 using a firmware 106 in PP 101 exist as well without departing from the scope of the present disclosure. In other words, firmware 106 in PP 101 can provide a cryptographically secure platform for device 102 and may also operate as a "Smart Secure Platform" according to the ETSI 5G series of standards, including an iSSP, an eSSP, and/or a rSSP. From some embodiments, firmware 106 could operate as an embedded SIM or eUICC according to the GSMA series of standards for embedded SIMs.

After a step 225, PP 101 can then send PBL and PP agent 102x a message 226a, where message 226a can be a signal that PP 101 has successfully loaded plaintext firmware 106 and can operate with firmware 106. Message 226a can also include an updated firmware status 205c', which can be similar to a firmware status 205c above in message 205c, except with updated information for PP 101 that includes data regarding the firmware 106 which was loaded in a step 225. In an exemplary embodiment, firmware status 205c' can include the equivalent of an "OK" status or state for firmware 106 operating or loaded within PP 101. PBL and PP agent 102x can receive and process the message 226a from PP 101.

Device 102 can then use secure session library 102y to send IDS server 103 a message 226b via secure session 108. Message 226b can include the updated firmware status 205c' received by PBL and PP agent 102x in message 226a above. IDS server 103 can receive message 226b and conduct a step 227. IDS server 103 can store or record that firmware 106 has been successfully loaded by PP 101. In a step 227, IDS server 103 can also deprecate or delete the server one-time PKI keys 103e used in a FIG. 2a, in order to enhance forward secrecy. For embodiments where firmware status 205c' includes an error condition, such as firmware 106 does not properly load in PP 101, then IDS server 103 at a step 227 could conduct a subsequent series of steps to correct the error condition or error state. IDS server 103 could also notify other servers regarding the received firmware status 205c'. As depicted in FIG. 2a, IDS server 103 could send image maker 299 a message 227a with updated firmware status 205c' or a subset of data within firmware status 205c' that indicates the result or PP 101 loading and operating with the firmware 106.

The exemplary embodiment depicted in FIG. 2a also supports a server 103 generally encrypting a symmetric ciphering key for use by a device, where the device can (i) receive the encrypted symmetric ciphering key, (ii) conduct an ECDH key exchange with multiple PKI key pairs, (iii) decrypt the encrypted symmetric ciphering key into a plaintext symmetric ciphering key, and subsequently (iv) use the plaintext symmetric ciphering key in order to decrypt a ciphertext. In other words, the use of an encrypted firmware with the symmetric ciphering key is not required in order to obtain the benefits of the technology disclosed herein. Thus, in some exemplary embodiments a primary platform 101 could be omitted and the ciphertext could comprise data other than an encrypted firmware 106*. The encrypted symmetric ciphering key could comprise an encrypted key 106a* that could be used to decrypt ciphertext and the ciphertext does not need to be transferred from a server 103 with the encrypted key 106a*. As one example, the ciphertext 106* could be received by a device 102 from a different server than server 103, although server 103 could also send a ciphertext 106*.

For these embodiments where server 103 sends device 102 an encrypted symmetric key 106a*, the server could record a server static private key 103a and derive a server one-time private key 103c. The server could receive a device static public key 101b and a device one-time public key 101d. The server could conduct an ECDH key exchange step 110a from FIG. 2a and FIG. 2b below in order to mutually derive a second symmetric ciphering key K1 218a, where device 102 could also mutually derive the second symmetric ciphering key K1 218a with the corresponding PKI keys for those used by server 103 (such as the PKI keys depicted and described in connection with FIG. 2c). The server 103 could encrypt a plaintext symmetric key 106a into the encrypted symmetric key 106a* using the mutually derived second symmetric ciphering key K1 218a. Thus, a symmetric key 106a* could be used generally by a device for decrypting ciphertext and the symmetric key 106a* could be used for other purposes than encrypting and decrypting a firmware 106. The server could send the encrypted symmetric key 106a* to the device 102.

For these embodiments where server 103 sends device 102 an encrypted symmetric key 106a*, the device 102 could record a device static private key 101a and device a device one-time private key 101c. The device could receive or record a server static public key 103b and receive a server one-time public key 103d. The device could conduct and ECDH key exchange step 110b from FIG. 2a and FIG. 2c in order to mutually derive the second symmetric ciphering key K1 218a, where the server 103 also mutually derived the key K1 218a using the corresponding PKI keys for those used by device 102 (such as the PKI keys depicted and described in connection with FIG. 2b). The device 102 could decrypt an encrypted symmetric ciphering key 106a* into a plaintext symmetric ciphering key 106a using the mutually derived key K1 218a. The device 102 could subsequently decrypt a ciphertext using the plaintext symmetric ciphering key 106a.

Figure 2B:
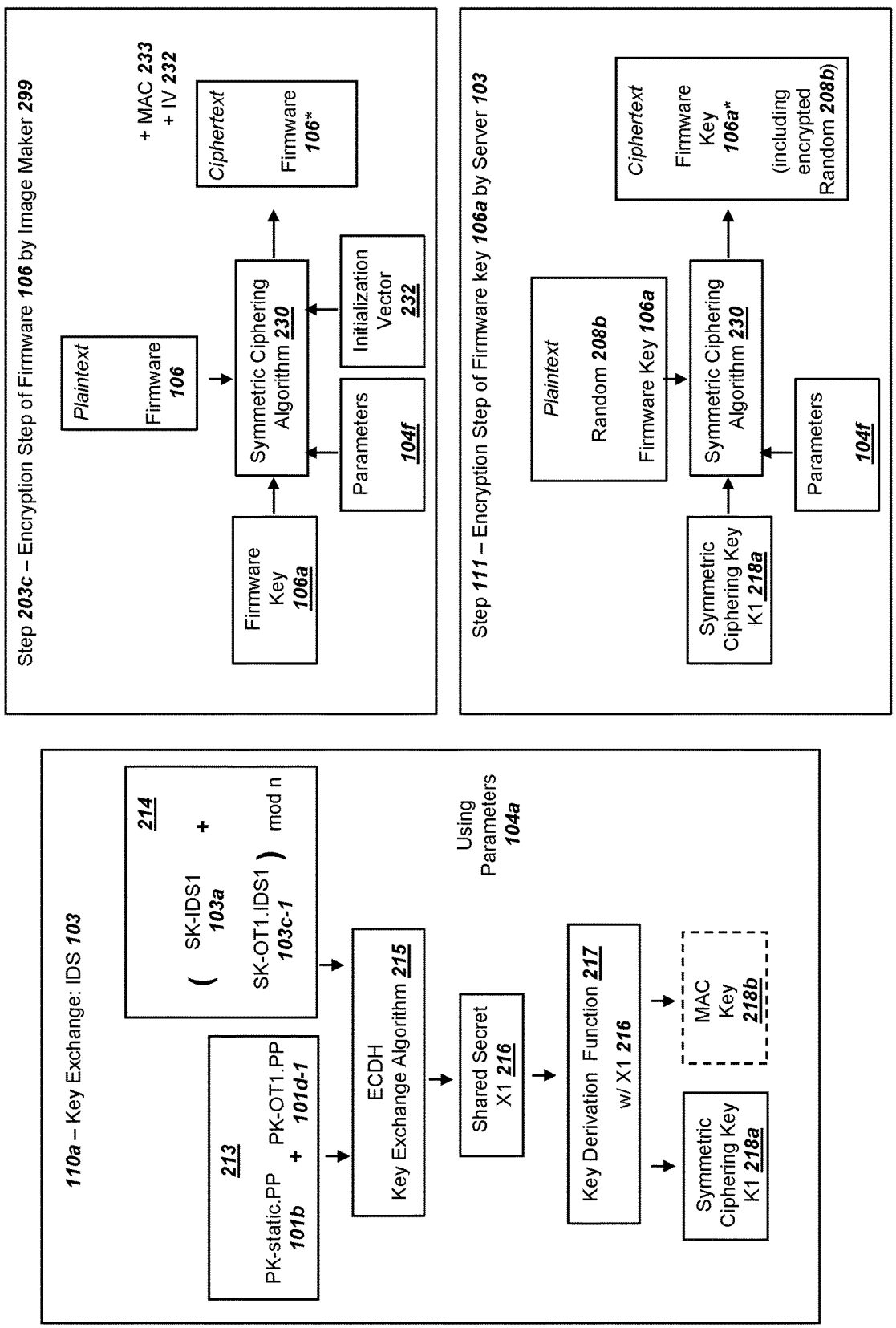
FIG. 2b is a flow chart illustrating exemplary steps for conducting a key exchange using PKI keys in order to derive a shared secret key, for encrypting firmware with a firmware key, and for using the derived shared secret key to encrypt the firmware key, in accordance with exemplary embodiments.
Figure 2C:
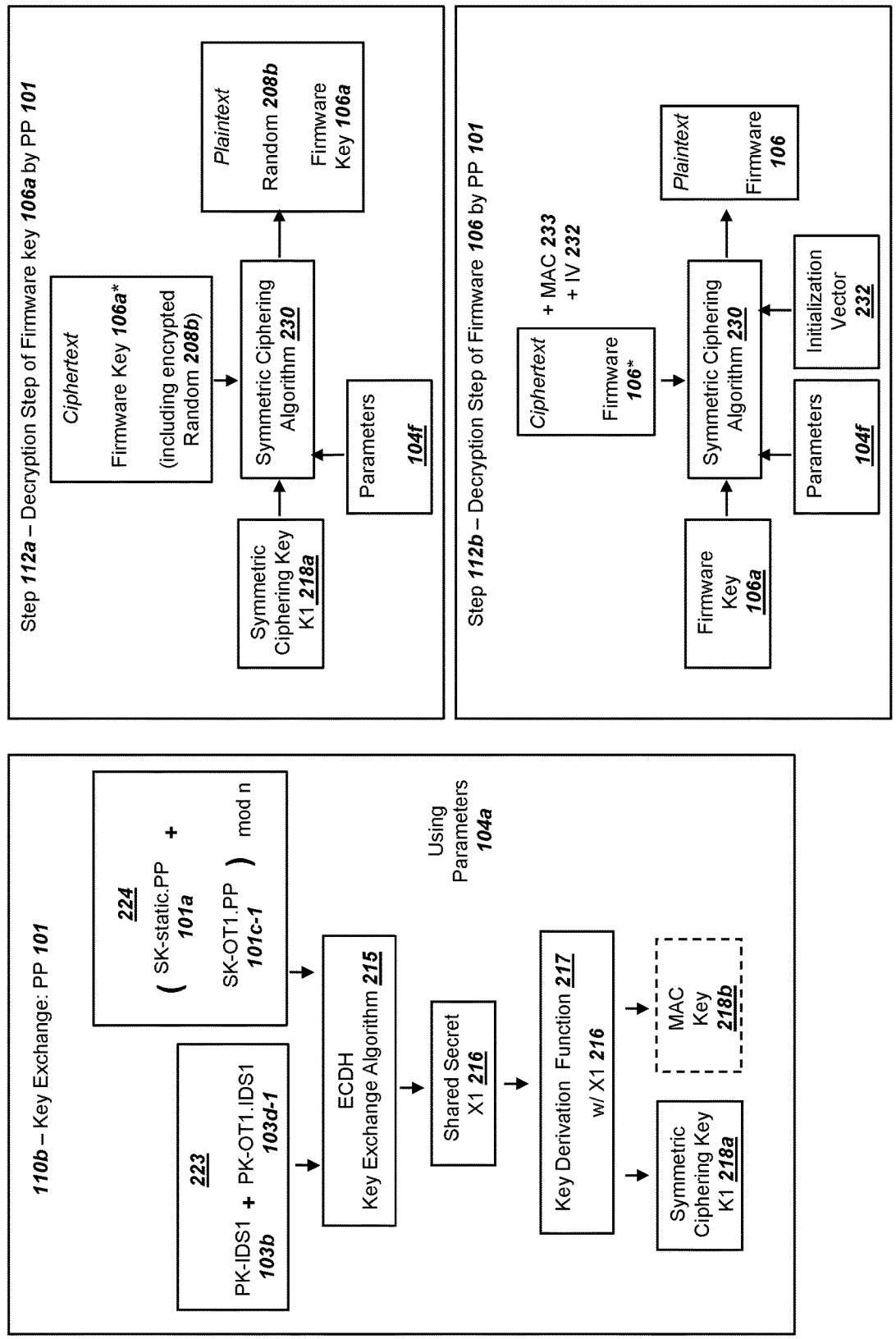
FIG. 2c is a flow chart illustrating exemplary steps for conducting a key exchange using PKI keys in order to derive a shared secret key, for decrypting a firmware key using the derived shared secret key, and for decrypting firmware using the decrypted firmware key, in accordance with exemplary embodiments.

In addition, although FIGS. 2a through 2c depict a server encrypting a symmetric ciphering key 106a into an encrypted symmetric ciphering key 106a*, the same static and one-time PKI key pairs could be used by both server 103 and device 102 in order for (i) device 102 to encrypt a symmetric ciphering key 106a into an encrypted symmetric ciphering key 106a* and (ii) server 103 to decrypt an encrypted symmetric ciphering key 106a* into a plaintext symmetric ciphering key 106a. Server 103 could then use the plaintext symmetric ciphering key 106a to decrypt a ciphertext received from device 102. In other words, device 102 could conduct a step 110b to derive key K1 218a and then device 102 could encrypt a plaintext key 106a into encrypted key 106a* using a step 203c (also depicted and described in FIG. 2b below), and then server 103 could decrypt the encrypted key 106a* into plaintext key 106a using a step 112a (also depicted and described in FIG. 2c below). Server 103 could then use a step 112b from FIG. 2c with the plaintext key 106a to decrypt ciphertext into plaintext.

FIG. 2b

FIG. 2b is a flow chart illustrating exemplary steps for conducting a key exchange using PKI keys in order to derive a shared secret key, for encrypting firmware with a firmware key, and for using the derived shared secret key to encrypt the firmware key, in accordance with exemplary embodiments. Exemplary steps for a server 103 to mutually derive a shared secret X1 216 and symmetric key 218a with PP 101 can comprise a key exchange step 110a. Exemplary steps in FIG. 2b for an image maker 299 to encrypt a plaintext firmware 106 using a firmware key 106a can comprise an encryption step 203c. Exemplary steps in FIG. 2b for a server 103 to encrypt a firmware key 106a into a ciphertext firmware key 106a* can comprise an encryption step 111. The use of the steps for a key exchange step 110a, encryption step 203c, and encryption step 111 were also depicted and described in connection with FIG. 2a above. Note that steps in FIG. 2b and the steps in FIG. 2c below can share some algorithms and values, and the descriptions for the algorithms and values in FIG. 2b can be applicable for FIG. 2c. For example, the key exchange algorithm 215 in FIG. 2b can comprise an ECDH key exchange equivalent to key exchange algorithm 215 in FIG. 2c (but with different numbers input for the algorithm in the two different Figures). The set of parameters 104a depicted and described in FIG. 2b can also be used in FIG. 2c.

The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present disclosure may comprise a computer program or hardware or a combination thereof which embodies the functions described herein and illustrated in the appended flow charts. However, it should be apparent that there could be many different ways of implementing the disclosure in computer programming or hardware design, and the disclosure should not be construed as limited to any one set of computer program instructions.

Further, a skilled programmer would be able to write such a computer program or identify the appropriate hardware circuits to implement the disclosed disclosure without difficulty based on the flow charts and associated description in the application text, for example. Therefore, disclosure of a particular set of program code instructions or detailed hardware devices is not considered necessary for an adequate understanding of how to make and use the disclosure. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present disclosure to function as described. However, the present disclosure is not limited to the order of the steps described if such order or sequence does not alter the functionality of the present disclosure. That is, it is recognized that some steps may be performed before, after, or in parallel other steps without departing from the scope and spirit of the present disclosure.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Image maker 299 can conduct an encryption step 203c, where the use for an encryption step 203c is depicted and described in connection with FIG. 2a above. Plaintext can comprise the firmware 106 processed or generated by image maker in a step 203b in FIG. 2a above. The firmware key 106a for an encryption step 203c can comprise a symmetric ciphering key for encryption/decryption and also a MAC key. The firmware key 106a can be input into a symmetric ciphering algorithm 230. Encryption step 203c in FIG. 2b and decryption step 112b in FIG. 2c can use a common symmetric ciphering algorithm 230, which could comprise the Advanced Encryption Standard with Synthetic Initialization Vectors (AES-SIV) (and deciphering algorithm) also with a common set of symmetric ciphering parameters 104f from a set of cryptographic parameters 104. Note that initialization vector 232 can also be input into symmetric ciphering algorithm 230 for symmetric ciphering algorithms 230 that utilize initialization vectors.

Other or different symmetric ciphering algorithms 230 besides AES-SIV could be utilized as well, such as, but not limited to such as AES, Triple Data Encryption Standard (3DES), Blowfish, or related algorithms. Symmetric ciphering parameters 104f can also specify the use of a block chaining mode such as cipher block chaining (CBC), counter mode (CTR), or Galois/Counter mode (GCM) and other possibilities exist as well. In addition, symmetric ciphering parameters 104f could specify a mode for message authentication, which could comprise a CMAC mode as specified in MST publication SP-800-38B. In some exemplary embodiments, a symmetric ciphering algorithm 230 can comprise the AES-SIV algorithm as specified in IETF RFC 5297. The output from an encryption step 203c using a symmetric ciphering algorithm 230 and the depicted values input can be ciphertext firmware 106*, as depicted in FIG. 2b. The output from an encryption step 203c using a symmetric ciphering algorithm 230 and the depicted values input can also include MAC code 233, where MAC code 233 can be used by the receiving party with a MAC key from firmware key 106a to verify message integrity. The initialization vector 232 can be sent along with the ciphertext firmware 106* in order for both sides to commonly initiate block chaining. In other words, a ciphertext firmware 106* can include plaintext metadata for the ciphertext that includes a MAC code 233 and an initialization vector 232.

An IDS server 103 can conduct a key exchange step 110a, and IDS server 103 will be subsequently referred to as server 103 in this description of FIG. 2b. Server 103 can conduct a step 213 to perform an ECC point addition operation on the (i) PP static public key PK-static.PP 101b, (ii) PP one-time public key PK-OT1.PP 101d-1 in order to obtain a point on the elliptic curve defined by the selected subset of cryptographic parameters 104a. Exemplary data for a step 213 will be shown below. At step 110a, server 103 can also use a step 214 to calculate the sum of (iii) server static secret key SK-IDS1 103a, (iv) and server one-time secret key SK-OT1.IDS1 103c-1, and then calculate the modulus of the sum using the value n, where the value n can be defined or determined based upon the selected set of cryptographic parameters 104a. Exemplary data for a step 214 will also be shown below.

The combination of output from step 213 and step 214 can be input can be input into an ECDH key exchange algorithm 215 using parameters 104a in order to calculate the shared secret X1 216. Note that in some exemplary embodiments, the use of a PP one time PKI key pair 101e could be omitted, which is depicted and described in connection with a step 301a in FIG. 3 below, and for these embodiments then ECC point addition for step 213 can be omitted and the public key input into an ECDH key exchange algorithm 215 can comprise the single value for PK-static.PP 101b. In other words, a shared secret X1 216 can be calculated without requiring a PP one-time public key for the embodiments in step 301a (where private key SK-OT1.PP 101c-1 would also be omitted from key exchange calculations by PP 101 in a step 301b), although the use of a PP one-time public key PK-OT1.PP 101d-1 can be preferred for a step 213 in other embodiments.

A summary of ECDH as a key exchange algorithm 215 is included in the Wikipedia article titled "Elliptic Curve Diffie-Hellman" from Mar. 9, 2018, which is herein incorporated by reference. An exemplary embodiment of key exchange algorithm 207 could comprise a "One-Pass Diffie-Hellman, C(1, 1, ECC CDH)" algorithm as described in section 6.2.2.2 on page 81 of the National Institute of Standards and Technology (NIST) document "NIST SP 800-56A, Recommendation for Pair-Wise Key Establishment Schemes Using Discrete Logarithm Cryptography" from March, 2007 which is hereby incorporated by reference its entirety. Other key exchange algorithms in MST SP 800-56A could be utilized as well for a key exchange algorithm 215 in FIG. 2b and FIG. 2c without departing from the scope of the present disclosure. Example calculations for an ECDH key exchange for a key exchange algorithm 215 are shown below. In exemplary embodiments, the key exchange algorithm 215 used by server 103 and PP 101 can comprise the equivalent key exchange algorithm 215.

Other algorithms to derive a secret keys using public keys and private keys may also be utilized in a key exchange algorithm 215, such as, but not limited to, the American National Standards Institute (ANSI) standard X-9.63. Cryptographic parameters 104a can also include information, values, or settings for conducting (i) a key exchange algorithm 215 in step 110a (and steps 110b in FIG. 2c below) and (ii) a key derivation function 217 in order to derive a commonly shared symmetric encryption key K1 218a. As contemplated herein, the terms "selected set of cryptographic parameters 104a" and "cryptographic parameters 104a", and "parameters 104a" can be equivalent, and can also comprise a subset of exemplary cryptographic parameters depicted and described in connection with FIG. 4 below.

Parameters 104a input into a key exchange algorithm 215 can include a time-to-live for a key K1 218a that is derived, a supported point formats extension, where the supported point formats extension could comprise uncompressed, compressed prime, or "compressed char2" formats, as specified in ANSI X-9.62 and related IETF standards. In other words, (i) an ECC keys input into a key exchange algorithm 215 and (ii) secret keys output from key exchange algorithm 215 may have several different formats and a set of parameters 104a can be useful to specify the format.

Exemplary data and numbers can be provided to demonstrate the calculations for (i) ECC point addition step 213, (ii) step 214 to combine private keys, and (iii) key exchange step 110a. Parameters 104a can comprise the elliptic of "secp128r1" with key lengths of 128 bit long keys. Although the exemplary numbers for keys, points, and a named curve are provided below, other values for keys, points, and named ECC curves could be utilized as well. Other example named curves and parameters 104a could comprise curve from IETF RFC 5480 and subsequent or related standards for ECDH key exchanges. Although depicted and described herein as "ECC point addition", the addition operation can comprise simply an elliptic curve point addition operation or calculation.

For a step 213, the PP static public key PK-static.PP 101b can comprise the exemplary values with X and Y numbers (or "coordinates") of:

X: 94171534984237685678256585618241417039
Y: 20394526946483572983869054708981329 2056

Note that the PP static public key PK-static.PP 101b corresponds to the PP static private key SK-static.PP 101a from FIG. 2c below. The PP one-time public key PK-OT1.PP 101d-1 can comprise the following exemplary values with X and Y numbers (or "coordinates") of:

X: 319423829544285733939020505180109110187
Y: 242179187598040154943588326777101424083

An ECC point addition 213 for a step 110a with the above two keys PK-static.PP 101b and PK-OT1.PP 101d-1 will result in the following exemplary point for input into an ECDH key exchange algorithm 215 in key exchange step 110a:

X: 157250524327743828409297614402748 32589
Y: 217317805140710190286653933543727803288

The above combination of both PK-static.PP 101b and PK-OT1.PP 101d-1 for a key exchange step 110a via an ECC point addition 213 is depicted in FIG. 2b with the "+" symbol between the public keys.

The server one-time secret key SK-OT1.IDS1 103c-1 can comprise the exemplary following number, and can be recorded in server 103 after a key pair generation step 103e' from FIG. 2a above:

330225223315954763304200471137380016969

The server static secret key SK-IDS1 103a can comprise the exemplary following number, and can be recorded in server 103 before key pair generation step 103e', such as during initial configuration of server 103 (such that the resulting public key PK-IDS1 103*b* could be made available to a manufacturer of TRE 113 for a step 202 in FIG. 2*a*):
2091221351745015130629842451016204 20255

Note that the private keys SK-OT1.IDS1 103*c*-1 and SK-IDS1 103*a* above correspond to the public keys PK-OT1.IDS1 103*d*-1 and PK-IDS1 103*b* used by a PP 101 in FIG. 2*c* below.

Server 103 can conduct step 214 to calculate the sum of server static secret key SK-IDS1 103*a* and the server one-time secret key SK-OT1.IDS1 103*c*-1, and then calculate the modulus of the sum using the value n, where the value n can be defined or determined based upon the selected set of cryptographic parameters 104*a*. For the exemplary values for keys above, when using the named elliptic curve secp128r1, the value of n can comprise the decimal number:
340282366762482138443322565580356624661

Consequently the modulus of (i) the sum of server static secret key SK-IDS1 103*a* and the server one-time secret key SK-OT1.IDS1 103*c*-1 and (ii) the value n above will equal the following number for a step 214:
199064991727974137923862150658643812563

The output of the above ECC point addition 213 for public keys PK-static.PP 101*b* and PK-OT1.PP 101*d*-1 can be input into ECDH key exchange algorithm 215 using parameters 104*a*. An ECDH key exchange algorithm 215 in key exchange step 110*a* can input (i) the point calculated above from the ECC point addition 213 on the public keys 101*b* and 101*d*-1 and (ii) the value calculated from a step 214 (e.g. (103*a*+103*c*-1) mod n). The output of ECDH key exchange algorithm 215 in key exchange step 110*a* can be the shared secret value or point X1 216. Note that the secret X1 216 as derived by server 103 in a key exchange step 110*a* equals or is the same numeric value as the secret X1 216 derived by PP 101 in a key derivation step 110*b* below. An exemplary number or value for secret X1 216 calculated by server 103 using a key exchange step 110*a* and ECDH key exchange algorithm using the above exemplary numeric values for (i) PP static public key PK-static.PP 101*b*, (ii) PP one-time public key PK-OT1.PP 101*d*-1, (iii) server static secret key SK-IDS1 103*a*, and (iv) and server one-time secret key SK-OT1.IDS1 103*c*-1 would be:

X: 192457465648897421085529769283600671459
Y: 126144984806909677418281 30967599964269

For a key exchange step 110*a*, derived shared secret key X1 216 can be input into a key derivation function 217 where the key derivation function 217 can be equivalent to the key derivation function 217 depicted and described in connection with FIG. 2*c* below for a key exchange step 110*b*. Note that for key derivation steps in the present disclosure, the X coordinate of a derived shared secret can be taken or used as input into the key derivation function 217, although other possibilities exist as well. The output of a key derivation function 217 can comprise both (i) a symmetric ciphering key K1 218*a* and (ii) a MAC key 218*b*. MAC key 218*b* can be used with a symmetric ciphering algorithm in order to generate a MAC code, such that the other party using the same key K1 218*a* and MAC key 218*b* can process the ciphertext and calculate the same MAC code 233 in order to verify message integrity. The use of key K1 218*a* and MAC key 218*b* are described in connection with encryption step 203*c* and decryption step 112*b*.

Key derivation function 217 can use a secure hash algorithm such as, but not limited to, SHA-256, SHA-384, SHA-3, etc. and additional values such as a shared (between server 103 and PP 101) text string with secret X1 216. The specification of a secure hash algorithm and the text string for use with a key derivation function 217 could be commonly shared between server 103 and PP 101 by commonly shared parameters 104*a*. The output of a secure hash algorithm within a key derivation function 217 could have a subset of bits selected or possibly a secure hash expanded in order to obtain the number of bits required for a symmetric key with a symmetric ciphering algorithm, such as key K1 218*a*. A key derivation function (KDF) 217 could comprise a KDF compatible with or specified by ANSI standards for "X9.63 Key Derivation Function". Other possibilities exist for a key derivation function 217 to convert a secret X1 216 into a symmetric ciphering key K1 218*a* and a MAC key 218*b* without departing from the scope of the present disclosure. As contemplated in the present disclosure, although an ECC key such as secret X1 216 can comprise a coordinate with an X value and a Y value, in exemplary embodiments a single number comprising the X value can be selected and input into a key derivation function 217.

Server 103 can conduct an encryption step 111 of firmware key 106*a*, where the use for an encryption step 111 is depicted and described in connection with FIG. 2*a* above. Plaintext in a step 111 can comprise the firmware key 106*a*, where the firmware key 106*a* can be received by server 103 in a message 206*e* in FIG. 2*a*, along with the ciphertext firmware 106\*. Although not depicted for a step 111 in FIG. 2*b*, other, additional data could be included in the plaintext for an encryption step 111, and as a minimum the plaintext for an encryption step 111 includes a plaintext firmware key 106*a*\*. Or, in some exemplary embodiments, an encryption step 203*c* above could be omitted and server 103 could receive plaintext firmware 106 and encrypt the plaintext firmware 106 (instead of a plaintext firmware key 106*a*) with key 218*a* in order to generate a ciphertext 106\*.

The symmetric ciphering key for encryption step 111 can comprise symmetric key K1 218*a* from a key exchange step 110*a* above. Although not depicted for an encryption step 111, a MAC key 218*b* from step 110*a* can be input into a symmetric ciphering algorithm 230 as well. Encryption step 111 in FIG. 2*b* and decryption step 112*a* in FIG. 2*c* can use a common symmetric ciphering algorithm 230, which could comprise the Advanced Encryption Standard with Synthetic Initialization Vectors (AES-SIV) (and deciphering algorithm) also with a common set of symmetric ciphering parameters 104*f* from a set of cryptographic parameters 104. Note that MAC key 218*b* can also be input into symmetric ciphering algorithm 230 along with an initialization vector 232 (as depicted and described above for an encryption step 203*c*).

Other or different symmetric ciphering algorithms 230 could be utilized as well, such as, but not limited to such as AES, Triple Data Encryption Standard (3DES), Blowfish, or related algorithms. Symmetric ciphering parameters 104*f* can also specify the use of a block chaining mode such as cipher block chaining (CBC), counter mode (CTR), or Galois/Counter mode (GCM) and other possibilities exist as well. In addition, symmetric ciphering parameters 104*f* could specify a mode for message authentication, which could comprise a CMAC mode as specified in NIST publication SP-800-38B. In some exemplary embodiments, a symmetric ciphering algorithm 230 can comprise the AES-SIV algorithm as specified in IETF RFC 5297. The output from an encryption step 111 using a symmetric ciphering algorithm 230 and symmetric key 218*a* and the depicted values input can be ciphertext firmware key 106*a*\*, as depicted in FIG. 2*b*.

As contemplated herein, an elliptic curve point addition operation could also be calculated after a scalar multiplication of the private keys in order to mutually derive the shared secret. In other words, the point X1 216 could also equal (i) a first point of {(PP static public key PK-static.PP 101b) multiplied by (the sum of server static secret key SK-IDS1 103a and the server one-time secret key SK-OT1.IDS1 103c-1 mod n)} added to (ii) a second point of (PP one-time public key PK-OT1.PP 101d-1 multiplied by (the sum of server static secret key SK-IDS1 103a and the server one-time secret key SK-OT1.IDS1 103c-1 mod n)}. Thus, the shared secret X1 216 could be calculated from an elliptic curve point addition operation using PP static public key PK-static.PP 101b and PP one-time public key PK-OT1.PP 101d-1. In other words, shared secret X1 216 can be calculated from two points and one point addition operation over the two points, where the two points are determined using at least PP static public key PK-static.PP 101b and PP one-time public key PK-OT1.PP 101d-1.

Further, the same value of point X1 216 could be calculated as (PK-static.PP 101b*SK-IDS1 103a)+(PK-static.PP 101b*SK-OT1.IDS1 103c-1)+(PK-OT1.PP 101d-1*SK-IDS1 103a)+(PK-OT1.PP 101d-1*SK-OT1.IDS1 103c-1). Thus, a mutually derived shared secret could be calculated by server 103 using at least one point addition operations and at least two points, where the at least two points are determined using at least PP static public key PK-static.PP 101b and PP one-time public key PK-OT1.PP 101d-1. Note that a mutually derived point X1 216 as calculated by server 103 could also use additional public keys for PP 101 or additional public keys associated with PP 101, such as from a device owner.

FIG. 2c

FIG. 2c is a flow chart illustrating exemplary steps for conducting a key exchange using PKI keys in order to derive a shared secret key, for decrypting a firmware key using the derived shared secret key, and for decrypting firmware using the decrypted firmware key, in accordance with exemplary embodiments. Exemplary steps for a primary platform 101 to mutually derive a shared secret X1 216 and symmetric key 218a with server 103 can comprise a key exchange step 110b. Exemplary steps for a PP 101 to decrypt a ciphertext firmware key 106a* using the derived symmetric key 218a can comprise a decryption step 112a. Exemplary steps for a PP 101 to decrypt a ciphertext firmware 106* using the plaintext firmware key 106a can comprise a decryption step 112b. The use of the steps for a key exchange step 110b, decryption step 112a, and decryption step 112b were also depicted and described in connection with FIG. 2a above.

A PP 101 can conduct a key exchange step 110b. PP 101 can conduct a step 223 to perform an ECC point addition operation on the (i) server static public key PK-IDS1 103b, and (ii) server one-time public key PK-OT1.IDS1 103d-1 in order to obtain a point on the elliptic curve defined by the selected subset of cryptographic parameters 104a. Exemplary data for a step 223 will be shown below. At step 110b, PP 101 can also use a step 224 to calculate the sum of (iii) PP static secret key SK-static.PP 101a, (iv) PP one-time secret key SK-OT1.PP 101c-1, and then calculate the modulus of the sum using the value n, where the value n can be defined or determined based upon the selected set of cryptographic parameters 104a. Exemplary data for a step 224 will also be shown below.

The combination of output from step 223 and step 224 can be input can be input into an ECDH key exchange algorithm 215 using parameters 104a in order to calculate the shared secret X1 216. Note that in some exemplary embodiments, the use of a server one-time public key PK-OT1.IDS1 103d-1 could be omitted, which is depicted and described in connection with a step 309b in FIG. 3 below, and for these embodiments then ECC point addition for step 223 can be omitted and the public key input into an ECDH key exchange algorithm 215 can comprise the single value for server static public key PK-IDS1 103b. In other words, a shared secret X1 216 can be calculated without requiring a server one-time public key PK-OT1.IDS1 103d-1 for the embodiments in step 309b (where private key SK-OT1.IDS1 103c-1 would also be omitted from key exchange calculations by server 103 in a step 309a), although the use of a IDS one-time public key PK-OT1.IDS1 103d-1 can be preferred for a step 213 in other embodiments.

Exemplary data and numbers can be provided to demonstrate the calculations for (i) ECC point addition step 223, (ii) step 224 to combine private keys, and (iii) key exchange step 110b. Parameters 104a can comprise the elliptic of "secp128r1" with key lengths of 128 bit long keys. Although the exemplary numbers for keys, points, and a named curve are provided below, other values for keys, points, and named ECC curves could be utilized as well. Other example named curves and parameters 104a could comprise curve from IETF RFC 5480 and subsequent or related standards for ECDH key exchanges.

The server one-time public key PK-OT1.IDS1 103d-1 can comprise the following exemplary values with X and Y numbers (or "coordinates") of:

X: 239356896551017663412726672579682627094
Y: 209570745539973929739512070961905802250

Note that the above server one-time public key PK-OT1.IDS1 103d-1 corresponds to the server one-time private key SK-OT1.IDS1 103c-1 above from FIG. 2b. The server static public key PK-IDS1 103b can comprise the following exemplary values with X and Y numbers (or "coordinates") of:

X: 203473426612520506812902270038827201196
Y: 64318327833120582836973711848343026891

Note that the above server static public key PK-IDS1 103b corresponds to the server static private key SK-IDS1 103a above from FIG. 2b. ECC point addition step 223 by PP 101 can combine the server one-time public key PK-OT1.IDS1 103d-1 and the server static public key PK-IDS1 103b in order to output the following value input into ECDH key exchange algorithm 215 in a step 110b:

X: 59121922812458579600446751790662160796
Y: 304934509235778268978955867170200917057

The above combination of both server static public key PK-IDS1 103b and server one-time public key PK-OT1.IDS1 103d-1 for a key exchange step 110b via an ECC point addition 223 is depicted in FIG. 2c with the "+" symbol between the public keys.

The PP static secret key SK-static.PP 101a can comprise the exemplary following number, and can be recorded in PP 101:

221902394438765368991155818063875293908

The PP one-time secret key SK-OT1.PP 101c-1 can comprise the exemplary following number, and can be recorded or stored by PP 101 in keys 101e:

246768250079261690512638148137618184294

Note that the private keys SK-static.PP 101a and PP one-time secret key SK-OT1.PP 101c-1 above correspond to the public keys PK-static.PP 101b and PK-OT1.PP 101d-1 used by a server 103 in FIG. 2b above.

PP 101 can conduct step 224 to calculate the sum of PP static secret key SK-static.PP 101a and the PP one-time secret key SK-OT1.PP 101c-1, and then calculate the modulus of the sum using the value n, where the value n can be defined or determined based upon the selected set of cryptographic parameters 104a. For the exemplary values for keys above, when using the named elliptic curve secp128r1, the value of n can comprise the decimal number:

340282366762482138443322565580356624661

Consequently the modulus of (i) the sum of PP static secret key SK-static.PP 101*a* and the PP one-time secret key SK-OT1.PP 101*c*-1 and (ii) the value n above will equal the following number for a step 224:

128388277755544921060471400621136853541

The output of the above ECC point addition 223 for the server one-time public key PK-OT1.IDS1 103*d*-1 and the server static public key PK-IDS1 103*b* can be input into ECDH key exchange algorithm 215 in a step 110*b* using parameters 104*a*. An ECDH key exchange algorithm 215 in key exchange step 110*b* can input (i) the point calculated above from the ECC point addition 223 on the public keys 103*b* and 103*d*-1 and (ii) the value calculated from a step 224 (e.g. (101*a*+101*c*-1) mod n). The output of ECDH key exchange algorithm 215 in key exchange step 110*b* can be the shared secret value or point X1 216. Note that the secret X1 216 as derived by PP 101 in a key exchange step 110*b* equals or is the same numeric value as the secret X1 216 derived by server 103 in a key exchange step 110*a* above. An exemplary number or value for secret X1 216 calculated by PP 101 using a key exchange step 110*b* and ECDH key exchange algorithm using the above exemplary numeric values for (i) server static public key PK-IDS1 103*b*, and (ii) server one-time public key PK-OT1.IDS1 103*d*-1, (iii) PP static secret key SK-static.PP 101*a*, and (iv) PP one-time secret key SK-OT1.PP 101*c*-1 would be:

X: 192457465648897421085529769283600671459
Y: 126144984806909677418281309675999964269

As contemplated herein, an elliptic curve point addition operation could also be calculated after a scalar multiplication of the private keys in order to mutually derive the shared secret. In other words, the point X1 216 could also equal (i) a first point of {(server one-time public key PK-OT1.IDS1 103*d*-1) multiplied by (the sum of PP static secret key SK-static.PP 101*a* and the PP one-time secret key SK-OT1.PP 101*c*-1 mod n)} added to (ii) a second point of (server static public key PK-static.IDS1 103*b*) multiplied by (the sum of PP static secret key SK-static.PP 101*a* and the PP one-time secret key SK-OT1.PP 101*c*-1 mod n)}. Thus, the shared secret X1 216 could be calculated from an elliptic curve point addition operation using server one-time public key PK-OT1.IDS1 103*d*-1 and server static public key PK-static.IDS1 103*b*. In other words, shared secret X1 216 can be calculated from two points and one point addition operation over the two points, where the two points are determined using at least server static public key PK-static.IDS1 103*b* and server one-time public key PK-OT1.IDS1 103*d*-1.

Further, the same value of point X1 216 could be calculated as (PK-static.IDS1 103*bSK-static.PP 101***a*)+(PK-static.IDS 103*bSK-OT1.PP 101***c*-1)+(PK-OT1.IDS 103*d*-1*SK-static.PP 101*a*)+(PK-OT1.IDS 103*d*-1*SK-static.PP 101*a*). Thus, a mutually derived shared secret could be calculated by PP 101 using at least one point addition operations and at least two points, where the at least two points are determined using at least IDS static public key PK-static.IDS1 103*b* and IDS one-time public key PK-OT1.IDS1 103*d*-1. Note that a mutually derived point X1 216 as calculated by PP 101 could also use additional public keys for server 103 or a network or other servers associated with server 103.

For a key exchange step 110*b*, derived shared secret key X1 216 can be input into a key derivation function 217 where the key derivation function 217 can be equivalent to the key derivation function 217 depicted and described in connection with FIG. 2*b* above for a key exchange step 110*a*. Note that for key derivation steps in the present disclosure, the X coordinate of a derived shared secret can be taken or used as input into the key derivation function 217, although other possibilities exist as well. The output of a key derivation function 217 can comprise both (i) a symmetric ciphering key K1 218*a* and (ii) a MAC key 218*b*. MAC key 218*b* can be used with a symmetric ciphering algorithm in order to generate a MAC code 233, such that the other party using the same key K1 218*a* and MAC key 218*b* can process the ciphertext and calculate the same MAC code 233 in order to verify message integrity. The use of key K1 218*a* and MAC key 218*b* are described in connection with encryption step 203*c* and decryption step 112*b*.

Key derivation function 217 can use a secure hash algorithm such as, but not limited to, SHA-256, SHA-384, SHA-3, etc. and additional values such as a shared (between server 103 and PP 101) text string with secret X1 216. The specification of a secure hash algorithm and the text string for use with a key derivation function 217 could be commonly shared between server 103 and PP 101 by commonly shared parameters 104*a*. The output of a secure hash algorithm within a key derivation function 217 could have a subset of bits selected or possibly a secure hash expanded in order to obtain the number of bits required for a symmetric key with a symmetric ciphering algorithm, such as key K1 218*a*. A key derivation function (KDF) 217 could comprise a KDF compatible with or specified by ANSI standards for "X9.63 Key Derivation Function". Other possibilities exist for a key derivation function 217 to convert a secret X1 216 into a symmetric ciphering key K1 218*a* and a MAC key 218*b* without departing from the scope of the present disclosure. As contemplated in the present disclosure, although an ECC key such as secret X1 216 can comprise a coordinate with an X value and a Y value, in exemplary embodiments a single number comprising the X value can be selected and input into a key derivation function 217.

PP 101 can conduct a decryption step 112*a* of ciphertext firmware key 106*a and random number 208***b*, where the use for a decryption step 112*a* is depicted and described in connection with FIG. 2*a* above. Although not depicted for a step 112*a* in FIG. 2*c*, other, additional data could be included as the ciphertext for a decryption step 112*a*, and as a minimum the ciphertext for a decryption step 112*a* includes a ciphertext firmware key 106*a. Ciphertext in a step 112***a* can comprise the ciphertext firmware key 106*a and a ciphertext of random number 208***b*, where the ciphertext firmware key 106*a and ciphertext random number 208***b* can be received by PP 101 in a message 221 in FIG. 2*a*, along with the ciphertext firmware 106\*. Or, in some exemplary embodiments, a decryption step 112*a* above could be omitted and PP 101 could receive ciphertext firmware 106\* and decrypt the ciphertext firmware 106\* using symmetric ciphering key 218*a* (instead of a first decrypting ciphertext firmware key 106*a*\*) in order to read a plaintext firmware 106.

The symmetric ciphering key for decryption step 112*a* can comprise symmetric key K1 218*a* from a key exchange step 110*b* above. Although not depicted for a decryption step 112*a*, a MAC key 218*b* from step 110*b* can be input into a symmetric ciphering algorithm 230 as well. Decryption step 112*a* in FIG. 2*c* and encryption step 111 in FIG. 2*b* can use a common symmetric ciphering algorithm 230, which could comprise the Advanced Encryption Standard with Synthetic Initialization Vectors (AES-SIV) (and deciphering algorithm) also with a common set of symmetric ciphering parameters 104f from a set of cryptographic parameters 104. Note that MAC key 218b can also be input into symmetric ciphering algorithm 230 along with an initialization vector 232 (as depicted and described above for an encryption step 203c).

Other or different symmetric ciphering algorithms 230 could be utilized as well, such as, but not limited to such as AES, Triple Data Encryption Standard (3DES), Blowfish, or related algorithms. Symmetric ciphering parameters 104f can also specify the use of a block chaining mode such as cipher block chaining (CBC), counter mode (CTR), or Galois/Counter mode (GCM) and other possibilities exist as well. In addition, symmetric ciphering parameters 104f could specify a mode for message authentication, which could comprise a CMAC mode as specified in NIST publication SP-800-38B. In some exemplary embodiments, a symmetric ciphering algorithm 230 can comprise the AES-SIV algorithm as specified in IETF RFC 5297. The output from a decryption step 112a using a symmetric ciphering algorithm 230 and symmetric key 218a and the depicted values input can be plaintext firmware key 106a and the random number 208b, as depicted in FIG. 2c. PP 101 can then compare the random number 208b from a decryption step 112a with the random number 208b sent in a message 209 to verify the two values for random number 208b are equal (thereby increasing security). For some exemplary embodiments, the use of a random number 208b could be optionally omitted.

PP 101 can then conduct a decryption step 112b, where the use for a decryption step 112b is depicted and described in connection with FIG. 2a above. Ciphertext can comprise the ciphertext firmware 106* received by PP 101 in a message 221. The plaintext firmware key 106a for a decryption step 112a can comprise the firmware key 106a decrypted in a step 112a above. The firmware key 106a can be input into a symmetric ciphering algorithm 230. Decryption step 112b in FIG. 2c and decryption step 203c in FIG. 2b can use a common symmetric ciphering algorithm 230, which could comprise the Advanced Encryption Standard with Synthetic Initialization Vectors (AES-SIV) (and deciphering algorithm) also with a common set of symmetric ciphering parameters 104f from a set of cryptographic parameters 104. Note that initialization vector 232 can also be input into symmetric ciphering algorithm 230 for symmetric ciphering algorithms 230 that utilize initialization vectors.

The output from a decryption step 112b using a symmetric ciphering algorithm 230 and the depicted values input, including a plaintext firmware key 106a from step 112a, can be plaintext firmware 106, as depicted in FIG. 2c. The output from a decryption step 112b using a symmetric ciphering algorithm 230 and the depicted values input can also include MAC code 233, where MAC code 233 can be used by the PP 101 with a MAC key from firmware key 106a to verify message integrity. The initialization vector 232 can be sent along with the ciphertext firmware 106* in order for both sides to commonly initiate block chaining. In other words, a ciphertext firmware 106* can include plaintext metadata for the ciphertext that includes a MAC code 233 and an initialization vector 232.

FIG. 3

FIG. 3 is a flow chart illustrating exemplary steps for conducting a key exchange using PKI keys in order to derive a shared secret key, in accordance with exemplary embodiments. Although key exchange steps 110a and 110b depicted and described the use of one-time PKI key pairs by both PP 101 and IDS server 103, a key exchange step could omit the use of one-time PKI keys by either PP 101 or IDS server 103. For a key exchange step 301a by IDS server 103 and a corresponding key exchange step 301b by PP 101, the use of PP one-time PKI keys could be omitted. For these embodiments, an ECDH key exchange algorithm 215 for IDS server 103 in a step 301a could use (i) PP static public key PK-static.PP 101b, (ii) server static secret key SK-IDS1 103a, and (iii) server one-time secret key SK-OT1.IDS1 103c-1. The corresponding ECDH key exchange algorithm 215 for PP 101 in a step 301b could use (i) server static public key PK-IDS1 103b, and (ii) server one-time public key PK-OT1.IDS1 103d-1, and (iii) PP static secret key SK-static.PP 101a. The output of an ECDH key exchange algorithm 215 for both key exchange step 301a and 301b can comprise a mutually derived shared secret key X1 216 as depicted and described in connection with FIG. 2b and FIG. 2c. The exemplary calculations remain equivalent to the calculations depicted and described in connection with FIG. 2b and FIG. 2c, except the use of PP one-time PKI keys 101e could be omitted.

For a key exchange step 309a by IDS server 103 and a corresponding key exchange step 309b by PP 101, the use of IDS one-time PKI keys could be omitted. For these embodiments, an ECDH key exchange algorithm 215 for IDS server 103 in a step 309a could use (i) PP static public key PK-static.PP 101b, (ii) server static secret key SK-IDS1 103a, and (iii) PP one-time public key PK-OT1.PP 101d-1. The corresponding ECDH key exchange algorithm 215 for PP 101 in a step 309b could use (i) server static public key PK-IDS1 103b, and (ii) PP one-time secret key SK-OT1.PP 101c-1, and (iii) PP static secret key SK-static.PP 101a. The output of an ECDH key exchange algorithm 215 for both key exchange step 309a and 309b can comprise a mutually derived shared secret key X1 216 as depicted and described in connection with FIG. 2b and FIG. 2c. The exemplary calculations remain equivalent to the calculations depicted and described in connection with FIG. 2b and FIG. 2c, except the use of IDS one-time PKI keys 103e could be omitted.

FIG. 4

FIG. 4 is an illustration of an exemplary set of cryptographic parameters, in accordance with exemplary embodiments. Cryptographic parameters 104 can specify sets of cryptographic parameters that are supported by PP 101, server 103, and image maker 299 in order conduct the series of steps and message flows depicted in FIG. 2a, as well as other figures above. Cryptographic parameters 104 can be recorded in nonvolatile memory in each of PP 101, server 103, and image maker 299. As depicted in FIG. 1a for server 103 and PP 101, nodes in a system 100 or system 200 can record and operate with a set of cryptographic parameters 104. Cryptographic parameters 104 can record an identified collection of cryptographic algorithms or specifications such as a set identifier 104a, a key length 104b, an ECC curve name 104c, a hash algorithm 104d, symmetric ciphering key length 104e, settings for a symmetric ciphering algorithm 104f, and a random number length 104g.

As contemplated herein, when using the words or description "parameters 104a" or "cryptographic parameters 104a" can specify a row of parameters or values in a set of cryptographic parameters 104. In this manner, a set of cryptographic parameters 104a can refer to a specific row identified by the column in "set A" with a collection of values in the row to be used with key pair generation functions (such as with IDS one-time PKI keys 103e and/or PP one-time PKI keys 101e), ECDH key exchange 215, ECC point addition operations for steps 213 and steps 223, key exchange steps 110a and 110b, symmetric ciphering algorithms 230, secure hash algorithms, and other cryptographic operations and steps as contemplated herein. Set identifier 104a can be an identity for a row or set of values for cryptographic parameters 104. Key length 104b can be the length of keys in bits for PKI keys used in system 100 and system 200. ECC Curve name 104c can be a name for an ECC curve used with PKI keys and key exchange algorithms in system 100, system 200, and other systems herein.

Hash algorithm 104d in cryptographic parameters 104 can be the name of a secure hash algorithm, such as the exemplary SHA-256 algorithm depicted, which may also be referred to as "SHA-2". Hash algorithm 104d can also be used in a key derivation function (e.g. KDF 217 above in FIG. 2b and FIG. 2c) and also with secure hash computation in for message 207b and step 208. Settings for a symmetric ciphering algorithm 104f can specify (i) the identity or name of a symmetric ciphering algorithm 230 such as "AES", "AES-SIV", 3DES, Blowfish, (ii) the length of symmetric ciphering keys used with the symmetric ciphering algorithm 230, (iii) a cipher chaining mode such as, but not limited to CBC, etc, and (iv) parameters for using a MAC code 233 and/or an initialization vector 232.

Random length 104g can specify the length in bits for random numbers or "nonces" generated by both PP 101 and/or server 103 such as with random number 208b. A random number can comprise nonces to prevent replay attacks with the result that messages transmitted and received with the random number can be unique. Other possibilities exist as well for data within cryptographic parameters 104, such as the specification of point compression, encoding rules such as distinguished encoding rules (DER), ASN or CSN syntax notation, padding rules, byte or bit orders such as big endian, little endian, etc. In addition, a set of cryptographic parameters 104 could include an identity or name of a key derivation function for use with a KDF 217.

The invention claimed is:

1. A wireless device for operating an integrated universal integrated circuit card (iUICC), the wireless device comprising:
1) One or more first processors;
2) A first non-transitory computer-readable memory operatively connected to the one or more processors, the first non-transitory computer-readable memory having stored thereon:
   (i) an agent for communicating with a tamper resistant element (TRE) within the wireless device and a server system; and
   (ii) first machine-readable instructions that, when executed by the one or more first processors, using the agent, cause the one or more first processors to perform the steps of:
   (a) querying the TRE for (i) a set of cryptographic parameters and (ii) a firmware version supported by the TRE;
   (b) establishing a transport layer security (TLS) session with the server system, wherein the server system is authenticated using a first certificate for the server system;
   (c) sending (i) the set of cryptographic parameters and (ii) the firmware version to the server system through the TLS session;
   (d) receiving, through the TLS session, a second certificate of a server static public key for an elliptic curve Diffie-Hellman (ECDH) key exchange algorithm and the set of cryptographic parameters;
   (e) sending, to the TRE, the second certificate;
   (f) receiving, from the TRE, a primary platform ephemeral public key for the set of cryptographic parameters and a random number;
   (g) sending, to the server system, the primary platform ephemeral public key and the random number;
   (h) receiving, from the server system, a server ephemeral public key and a ciphertext of firmware for the iUICC, wherein the firmware includes a private key SK.EUICC.ECDSA; and
   (i) sending, to the TRE, the server ephemeral public key and the ciphertext;
3) One or more second processors for the TRE; and
4) a second non-transitory computer-readable memory operatively connected to the one or more second processors and internal to the TRE, the second non-transitory computer-readable memory having stored thereon
   (i) a certificate authority public key for the set of cryptographic parameters;
   (ii) a symmetric ciphering key; and
   (ii) second machine-readable instructions that, when executed by the one or more second processors cause the one or more second processors to perform steps of:
   (a) verifying the second certificate using the certificate authority public key;
   (b) generating a shared secret using the ECDH key exchange algorithm with the server ephemeral public key, the server static public key, and a primary platform ephemeral private key corresponding to the primary platform ephemeral public key;
   (c) decrypting the ciphertext using the shared secret key in order to read the random number and the firmware for the iUICC;
   (d) encrypting the firmware with the symmetric ciphering key;
   (e) storing the encrypted firmware in the first non-transitory computer-readable memory which is external to the TRE; and
   (f) storing a key K, a subscriber permanent identifier (SUPI), and the private key SK.EUICC.ECDSA for the firmware in the second non-transitory computer-readable memory.

2. The wireless device of claim 1, wherein the first non-transitory computer-readable memory comprises a first nonvolatile memory connected to a first memory bus, and wherein the first memory bus is external to the TRE.

3. The wireless device of claim 2, wherein the second non-transitory computer-readable memory comprises a second nonvolatile memory connected to a second memory bus, and wherein the second memory bus is internal to the TRE.

4. The wireless device of claim 3, wherein the second nonvolatile memory comprises an internal nonvolatile memory (iNVM) for the TRE.

5. The wireless device of claim 1, wherein the one or more first processors cannot read from the second non-transitory computer-readable memory.

6. The wireless device of claim 1, wherein the first non-transitory computer-readable memory includes at least a portion of the second non-transitory computer-readable memory.

7. The wireless device of claim 6, wherein the one or more second processors access the second non-transitory computer-readable memory using a memory controller operating within the TRE.

8. The wireless device of claim 1, wherein a nonvolatile memory within the wireless device includes both the first non-transitory computer-readable memory and the second non-transitory computer-readable memory, and wherein first blocks for the nonvolatile memory are assigned to the first non-transitory computer-readable memory, and wherein second blocks are assigned to the second non-transitory computer-readable memory.

9. The wireless device of claim 8, wherein the one or more second processors access the second blocks using a memory controller operating within the TRE.

10. The wireless device of claim 1, wherein the one or more second processors communicate with the one or more first processors using an interface controller within the TRE and a system bus within the wireless device.

11. The wireless device of claim 1, wherein the TRE comprises a Smart Secure Platform (SSP), and wherein the TRE includes a primary platform.

12. The wireless device of claim 11, wherein the primary platform operates within a Trusted Execution Environment (TEE) for the one or more first processors.

13. The wireless device of claim 1, wherein the TRE comprises a secure enclave for the wireless device.

14. The wireless device of claim 1, further comprising, in step f) for the one or more first processors, receiving, from the TRE, a primary platform identity, and, in step g) for the one or more first processors, sending, to the server system, the primary platform identity.

15. The wireless device of claim 1, further comprising for the one or more second processors, (g) conducting an authenticated key agreement (AKA) with a wireless network using the key K.

16. The wireless device of claim 1, wherein, after reading the firmware for the iUICC in step (c) for the one or more second processors, the TRE operates as an embedded universal integrated circuit card (eUICC).

17. The wireless device of claim 1, further comprising the second non-transitory computer-readable memory having stored thereon (iv) third machine-readable instructions for a java virtual machine, wherein the firmware comprises a Java applet for the java virtual machine.

* * * * *